US011114110B2

(12) United States Patent
Fuchs et al.

(10) Patent No.: US 11,114,110 B2
(45) Date of Patent: Sep. 7, 2021

(54) NOISE ATTENUATION AT A DECODER

(71) Applicant: Fraunhofer-Gesellschaft zur Förderung der angewandten Forschung e.V., München (DE)

(72) Inventors: Guillaume Fuchs, Erlangen (DE); Tom Bäckström, Espoo (FI); Sneha Das, Espoo (FI)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/856,537

(22) Filed: Apr. 23, 2020

(65) Prior Publication Data

US 2020/0251123 A1 Aug. 6, 2020

Related U.S. Application Data

(63) Continuation of application No. PCT/EP2018/071943, filed on Aug. 13, 2018.

(30) Foreign Application Priority Data

Oct. 27, 2017 (EP) .................................... 17198991

(51) Int. Cl.
*H04B 1/707* (2011.01)
*H04B 7/26* (2006.01)
(Continued)

(52) U.S. Cl.
CPC ........ *G10L 21/0232* (2013.01); *G10L 19/032* (2013.01)

(58) Field of Classification Search
CPC ... G10L 21/0232; G10L 19/032; G10L 19/24; G10L 19/26; G10L 21/0264
(Continued)

(56) References Cited

U.S. PATENT DOCUMENTS 6,678,647 B1 1/2004 Edler et al.
8,271,287 B1 * 9/2012 Kermani .......... H04N 21/42222 704/275

(Continued)

FOREIGN PATENT DOCUMENTS

JP 2011-514557 A 5/2011
JP 2013-521540 A 6/2013
RU 2592412 C2 7/2016

OTHER PUBLICATIONS

J. Porter et al., Optimal estimators for spectral restoration of noisy speech, ICASSP, (19840300), vol. 9, pp. 53-56.

(Continued)

*Primary Examiner* — Akwasi M Sarpong
(74) *Attorney, Agent, or Firm* — Novick, Kim & Lee, PLLC; Jae Youn Kim; Jihun Kim

(57) ABSTRACT

There are provided examples of decoders and decoding methods. One decoder includes: a bitstream reader to provide a version of an input signal as a sequence of frames, each frame subdivided into a plurality of bins, each bin having a sampled value; a context definer to define a context for one bin under process, the context including at least one additional bin in a predetermined positional relationship with the bin under process; a statistical relationship and information estimator to provide statistical relationships between the bin under process and the at least one additional bin; and a value estimator to process and acquire an estimate of the value of the bin. There is included a noise relationship and information estimator providing statistical relationships and information regarding noise, which includes a noise matrix estimating relationships among noise signals among the bin under process and the at least one additional bin.

64 Claims, 26 Drawing Sheets

(51) Int. Cl.
*H04B 7/005* (2006.01)
*G10L 21/0232* (2013.01)
*G10L 19/032* (2013.01)

(58) Field of Classification Search
USPC .......................................... 704/230, 503, 205
See application file for complete search history.

(56) References Cited

U.S. PATENT DOCUMENTS

| | | | | |
|---|---|---|---|---|
| 8,826,444 | B1 * | 9/2014 | Kalle | G06F 21/552 726/26 |
| 9,728,188 | B1 * | 8/2017 | Rosen | G10L 25/51 |
| 10,142,578 | B2 * | 11/2018 | Du | H04N 21/42204 |
| 10,365,620 | B1 * | 7/2019 | Raeber | H04W 4/80 |
| RE48,423 | E * | 2/2021 | Lee | H04N 21/42221 |
| 2002/0035470 | A1 | 3/2002 | Gao | |
| 2003/0187663 | A1 | 10/2003 | Truman et al. | |
| 2003/0200092 | A1 | 10/2003 | Benyassine et al. | |
| 2006/0009985 | A1 * | 1/2006 | Ko | H04S 3/00 704/500 |
| 2007/0086579 | A1 * | 4/2007 | Lorello | H04M 3/42263 379/45 |
| 2008/0033731 | A1 | 2/2008 | Seefeldt et al. | |
| 2008/0089534 | A1 * | 4/2008 | Park | H04N 21/42215 381/105 |
| 2009/0306992 | A1 | 12/2009 | Kovesi et al. | |
| 2010/0070270 | A1 | 3/2010 | Gao | |
| 2011/0046947 | A1 | 2/2011 | Malenvoskyt et al. | |
| 2011/0081026 | A1 | 4/2011 | Ramakrishnan et al. | |
| 2011/0289541 | A1 * | 11/2011 | Yen | H04N 7/163 725/110 |
| 2012/0065965 | A1 | 3/2012 | Choo et al. | |
| 2012/0314597 | A1 * | 12/2012 | Singh | H04L 65/80 370/252 |
| 2012/0328090 | A1 * | 12/2012 | Macwan | H04W 4/24 379/114.03 |
| 2013/0101049 | A1 | 4/2013 | Fukui et al. | |
| 2013/0117015 | A1 | 5/2013 | Baeckstroem et al. | |
| 2013/0152092 | A1 * | 6/2013 | Yadgar | G10L 15/22 718/102 |
| 2013/0218577 | A1 | 8/2013 | Briand et al. | |
| 2013/0219087 | A1 * | 8/2013 | Du | G09G 5/006 710/16 |
| 2014/0240593 | A1 * | 8/2014 | Tsinberg | H04N 7/015 348/474 |
| 2014/0249807 | A1 | 9/2014 | Jelinek et al. | |
| 2015/0010021 | A1 | 1/2015 | Liu et al. | |
| 2015/0066479 | A1 * | 3/2015 | Pasupalak | G06F 40/40 704/9 |
| 2015/0154972 | A1 | 6/2015 | Feng et al. | |
| 2015/0154975 | A1 | 6/2015 | Choo et al. | |
| 2015/0179182 | A1 | 6/2015 | Vinton | |
| 2015/0379455 | A1 * | 12/2015 | Munzer | G06F 3/04842 705/7.15 |
| 2016/0140974 | A1 | 5/2016 | Helmrich et al. | |
| 2016/0163315 | A1 * | 6/2016 | Choi | H04L 41/22 704/275 |
| 2016/0379632 | A1 * | 12/2016 | Hoffmeister | G10L 25/87 704/253 |
| 2017/0024465 | A1 * | 1/2017 | Yeh | G10L 25/54 |
| 2017/0116990 | A1 * | 4/2017 | Faaborg | G10L 15/1815 |
| 2018/0152557 | A1 * | 5/2018 | White | G10L 15/26 |
| 2018/0167762 | A1 * | 6/2018 | Hatambeiki | H04N 21/482 |
| 2018/0182389 | A1 * | 6/2018 | Devaraj | H04L 51/046 |
| 2019/0019504 | A1 * | 1/2019 | Hatambeiki | G10L 15/20 |
| 2019/0033446 | A1 * | 1/2019 | Bultan | G01S 15/66 |

OTHER PUBLICATIONS

Y. Huang et al., A multi-frame approach to the frequency-domain single-channel noise reduction problem, IEEE Transactions on Audio, Speech, and Language Processing, vol. 20, No. 4, pp. 1256-1269, 2012.
T. Bäckström et al., Blind recovery of perceptual models in distributed speech and audio coding, Interspeech. 1em plus 0.5em minus 0.4em ISCA, 2016, pp. 2483-2487.
EVS codec detailed algorithmic description; 3GPP technical specification, http://www.3gpp.org/DynaReport/26445.htm.
T. Bäckström, Estimation of the probability distribution of spectral fine structure in the speech source,Interspeech, 2017.
T. Bäckström et al., "Dithered quantization for frequency-domain speech and audio coding," in Interspeech, 2018.
S. Das et al., Postfiltering using log-magnitude spectrum for speech and audio coding, Interspeech, 2018.
G. Fuchs et al., Efficient context adaptive entropy coding for real-time applications, ICASSP. IEEE, 2011, pp. 493-496.
M. Neuendorf et al., A novel scheme for low bitrate unified speech and audio coding—MPEG RM0, Audio Engineering Society Convention 126. Audio Engineering Society, 2009.
T. Bäckström et al, "Fast randomization for distributed low-bitrate coding of speech and audio," IEEE/ACM Trans. Audio, Speech, Lang. Process., 2018.
J.-M Valin et al., High-quality, low-delay music coding in the OPUS codec,, in Audio Engineering Society Convention 135. Audio Engineering Society, 2013.
3GPP, TS 26.445, EVS Codec Detailed Algorithmic Description; 3GPP Technical Specification (Release 12), 2014.
R. Martin, Noise power spectral density estimation based on optimal smoothing and minimum statistics, IEEE Transactions on Speech Ano Auoio Processing., vol. 9, No. 5, Jul. 1, 2001 (Jul. 1, 2001 ), pp. 504-512, XP055223631; US ISSN: 1063-6676, 001: 10.1109/89.928915.
S. Korse et al., GMM-based iterative entropy coding for spectral envelopes of speech and audio, in ICASSP. 1em plus 0.5em minus 0.4em IEEE, 2018.
Sorami Nakamura, "Office Action for JP Application No. 2020-523364", dated May 24, 2021, JPO, Japan.

* cited by examiner

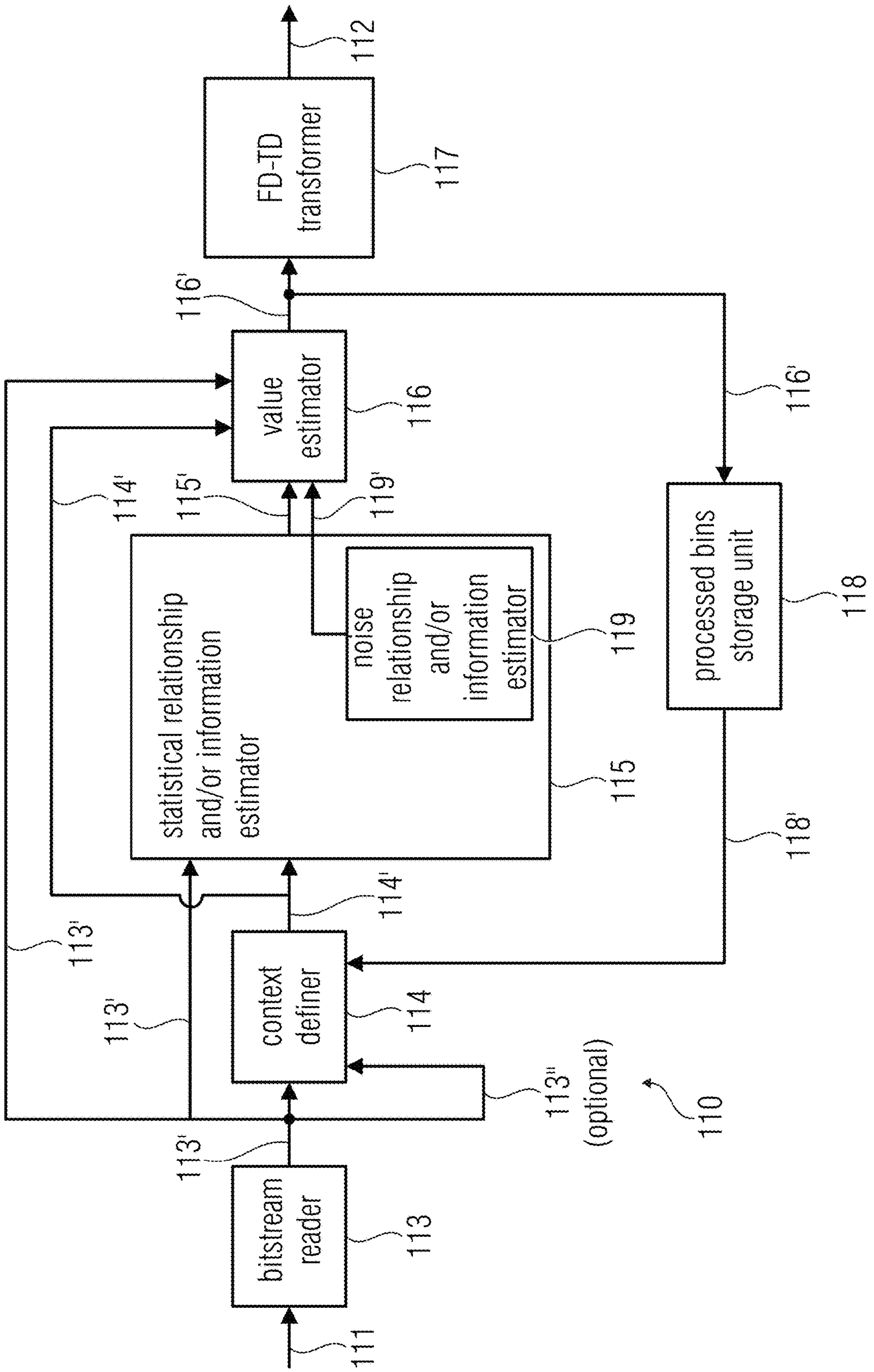
Fig. 1.1

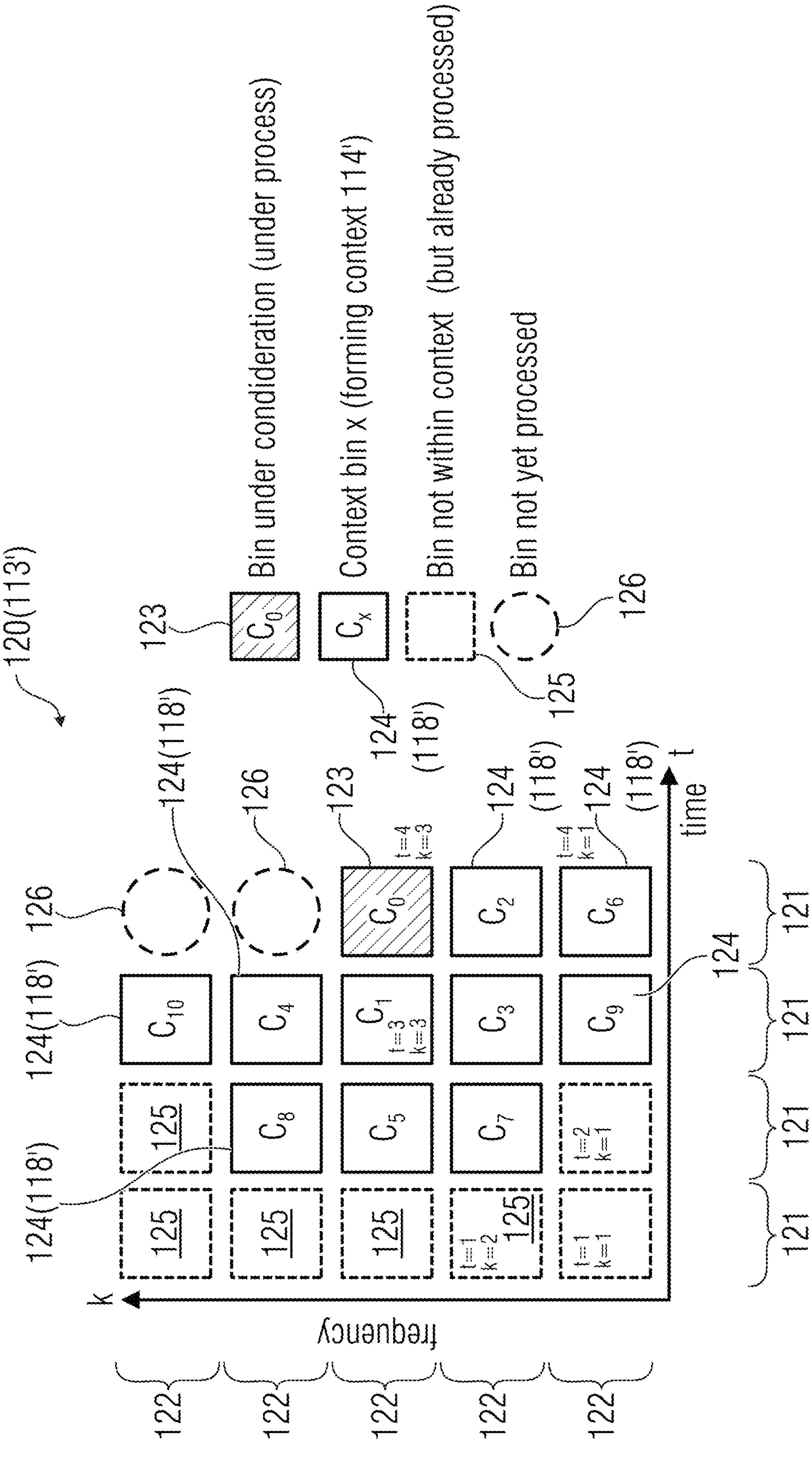
Fig. 1.2

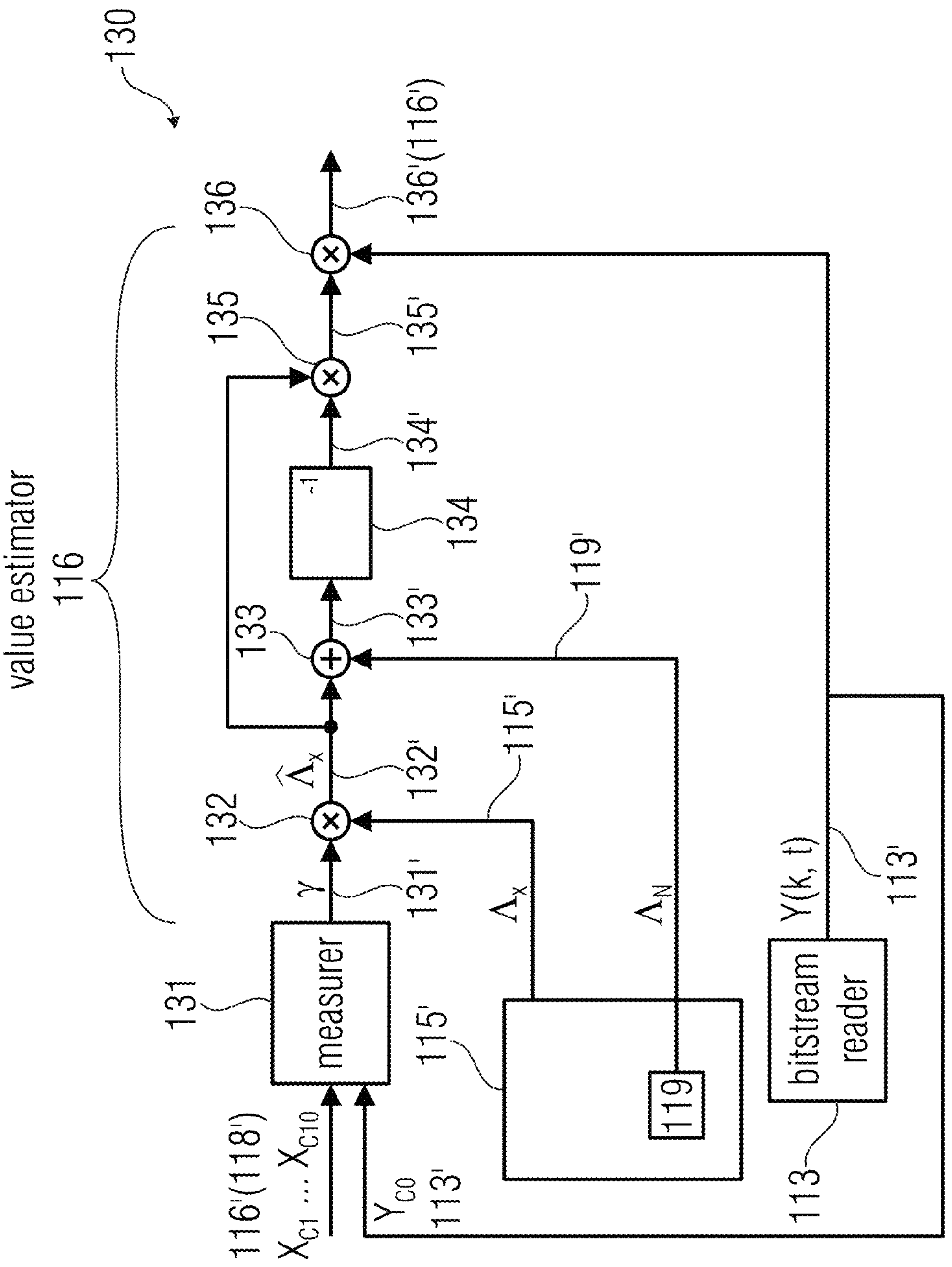
Fig. 1.3

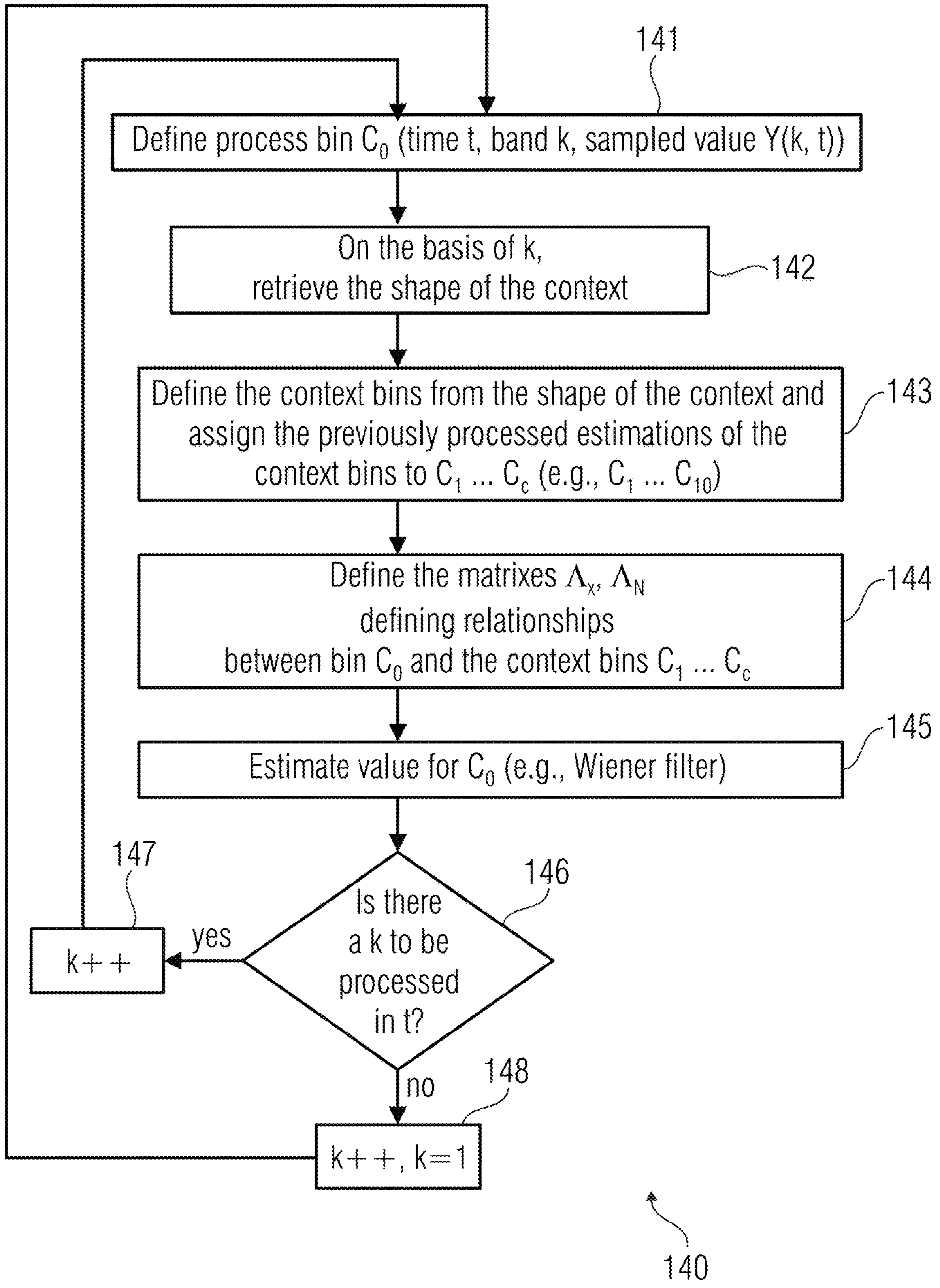
Fig. 1.4

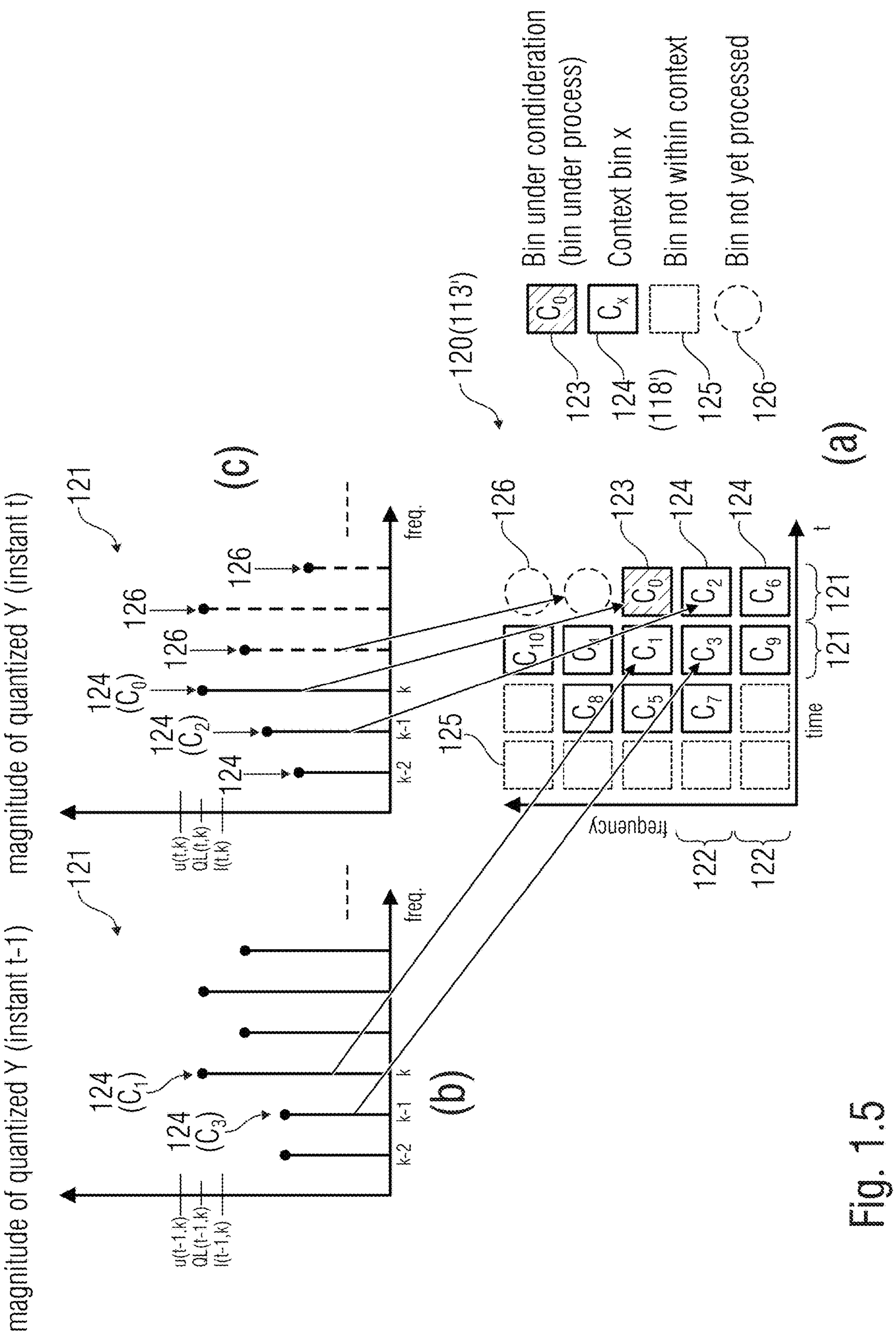
Fig. 1.5

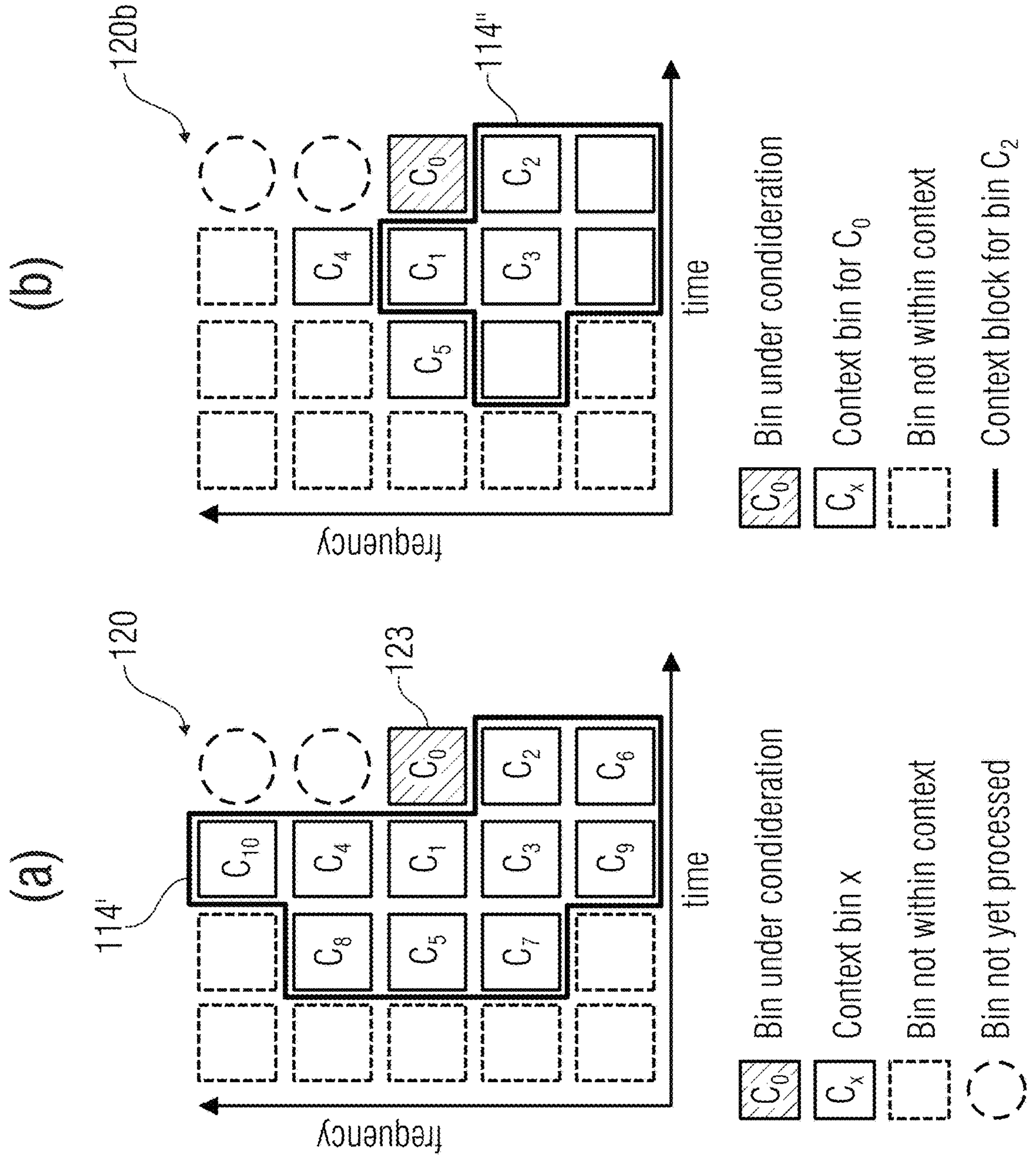
Fig. 2.1

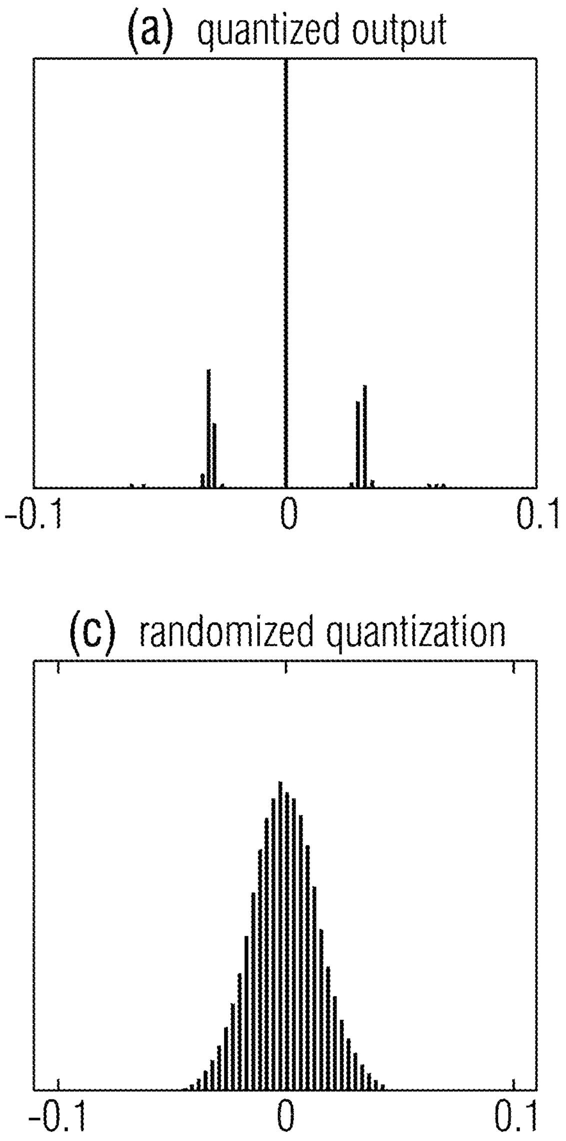
Fig. 2.2

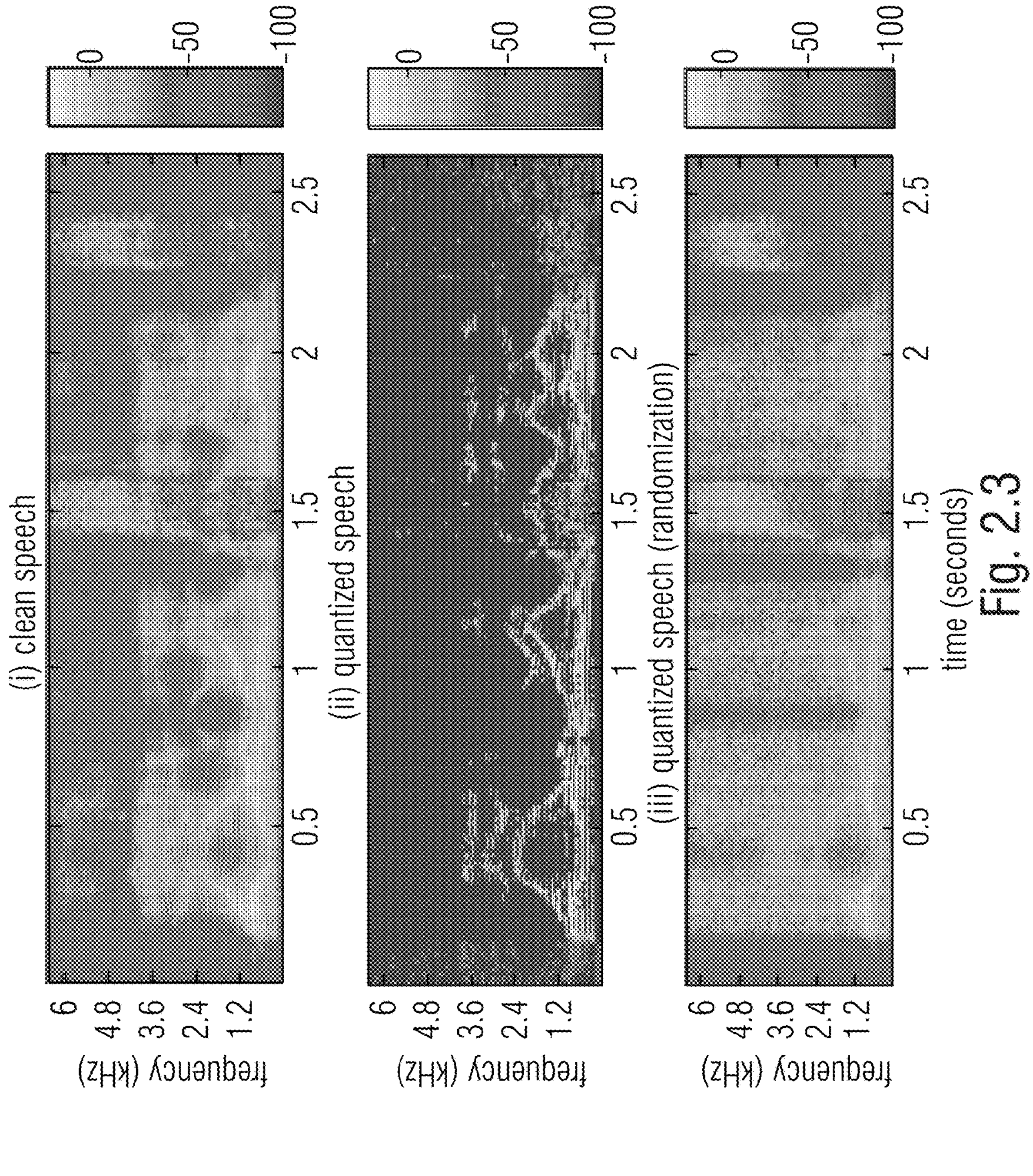
Fig. 2.3

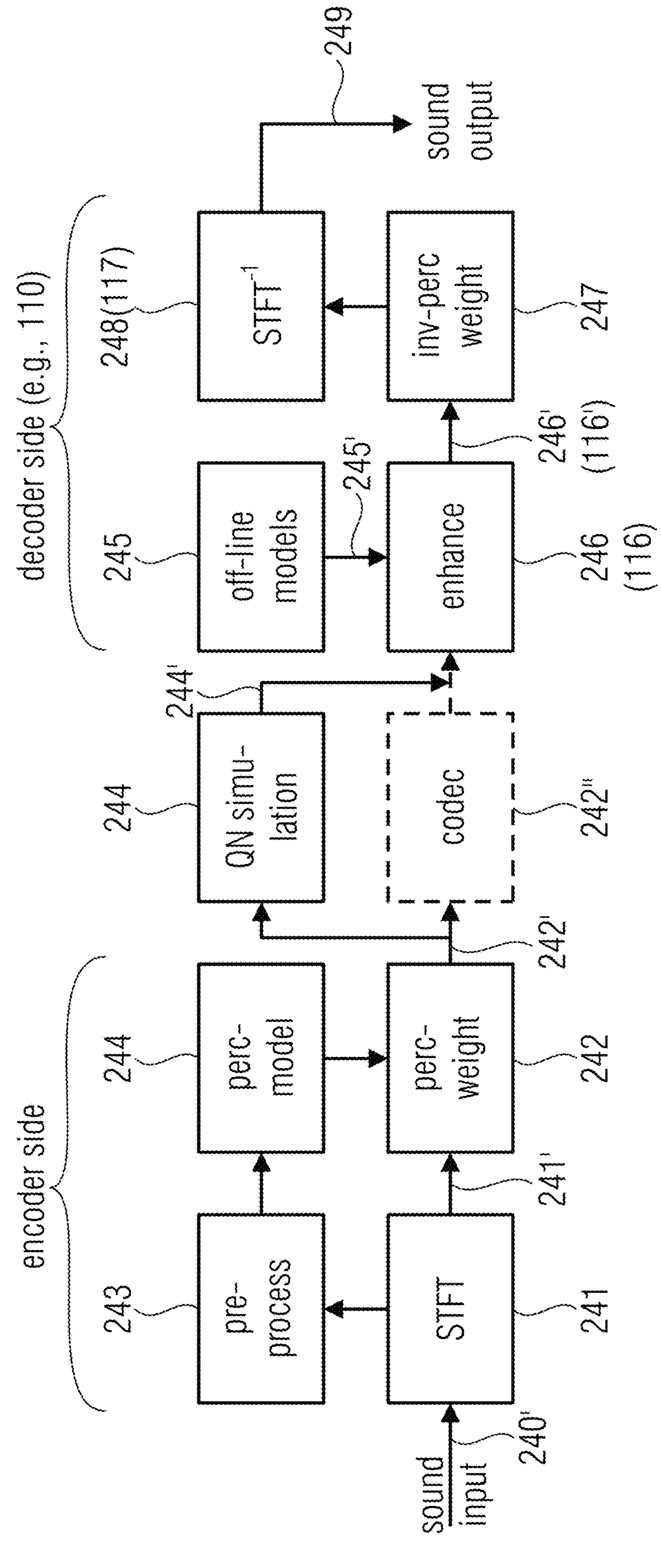
Fig. 2.4

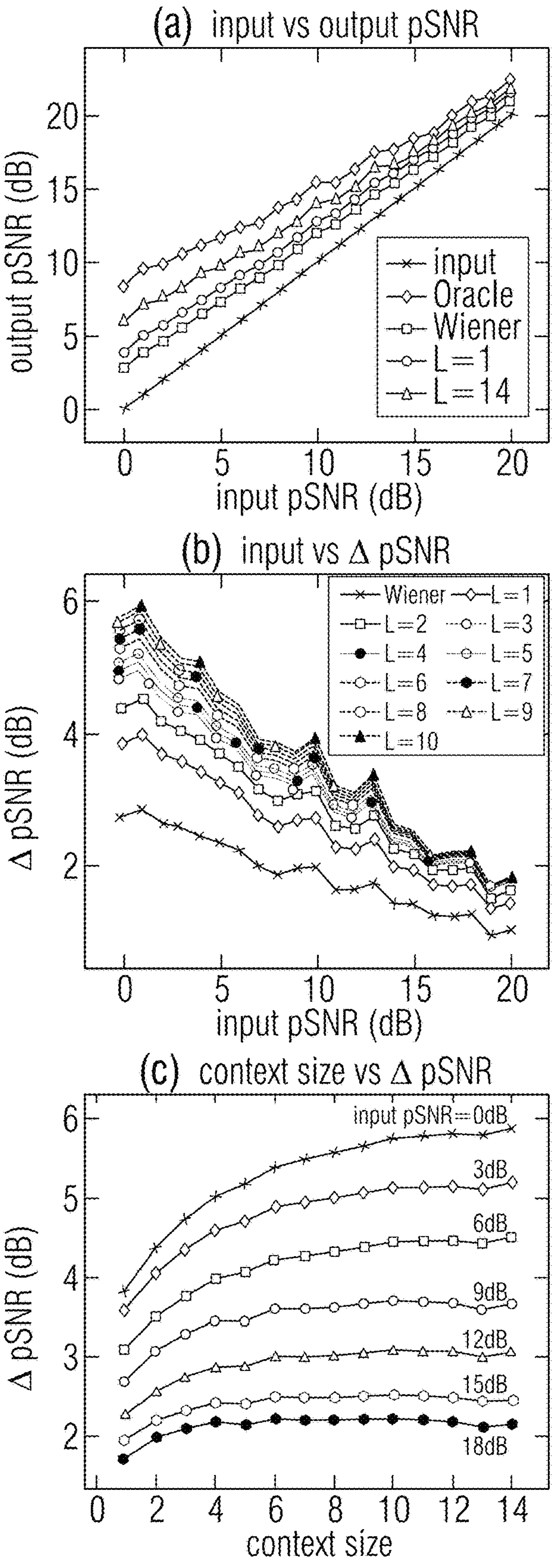
Fig. 2.5

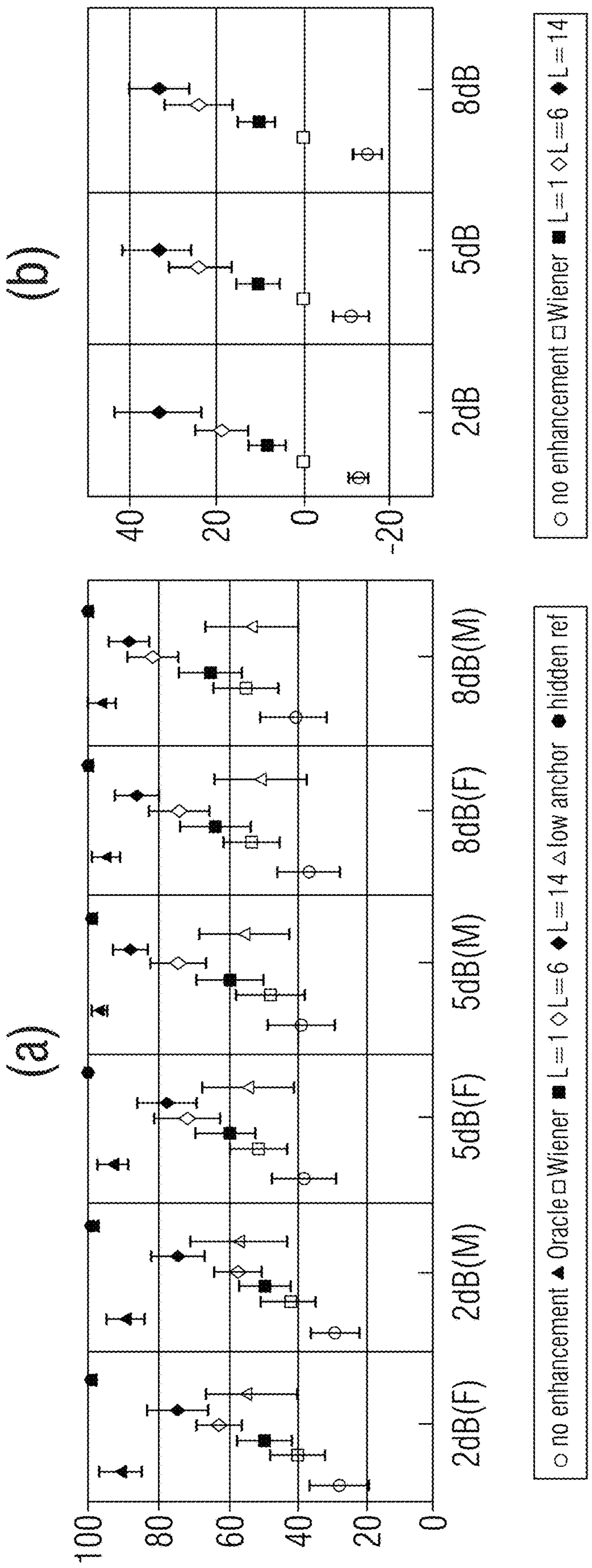
Fig. 2.6

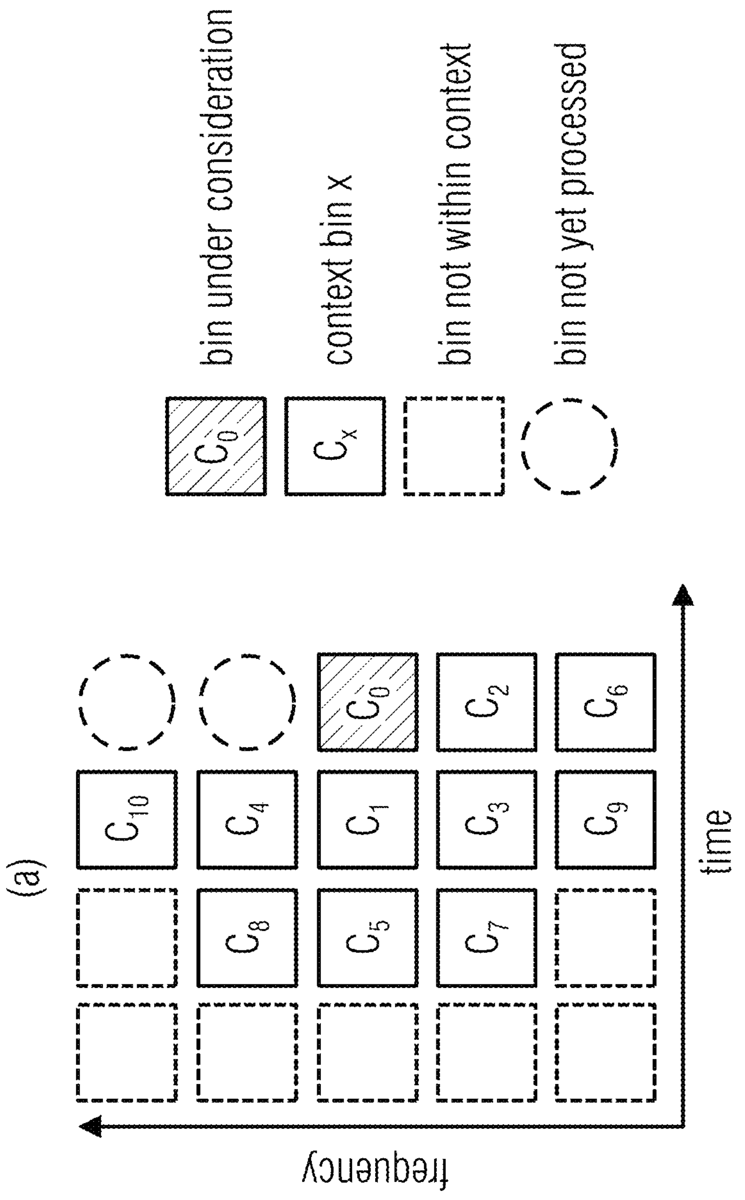
Fig. 3.1

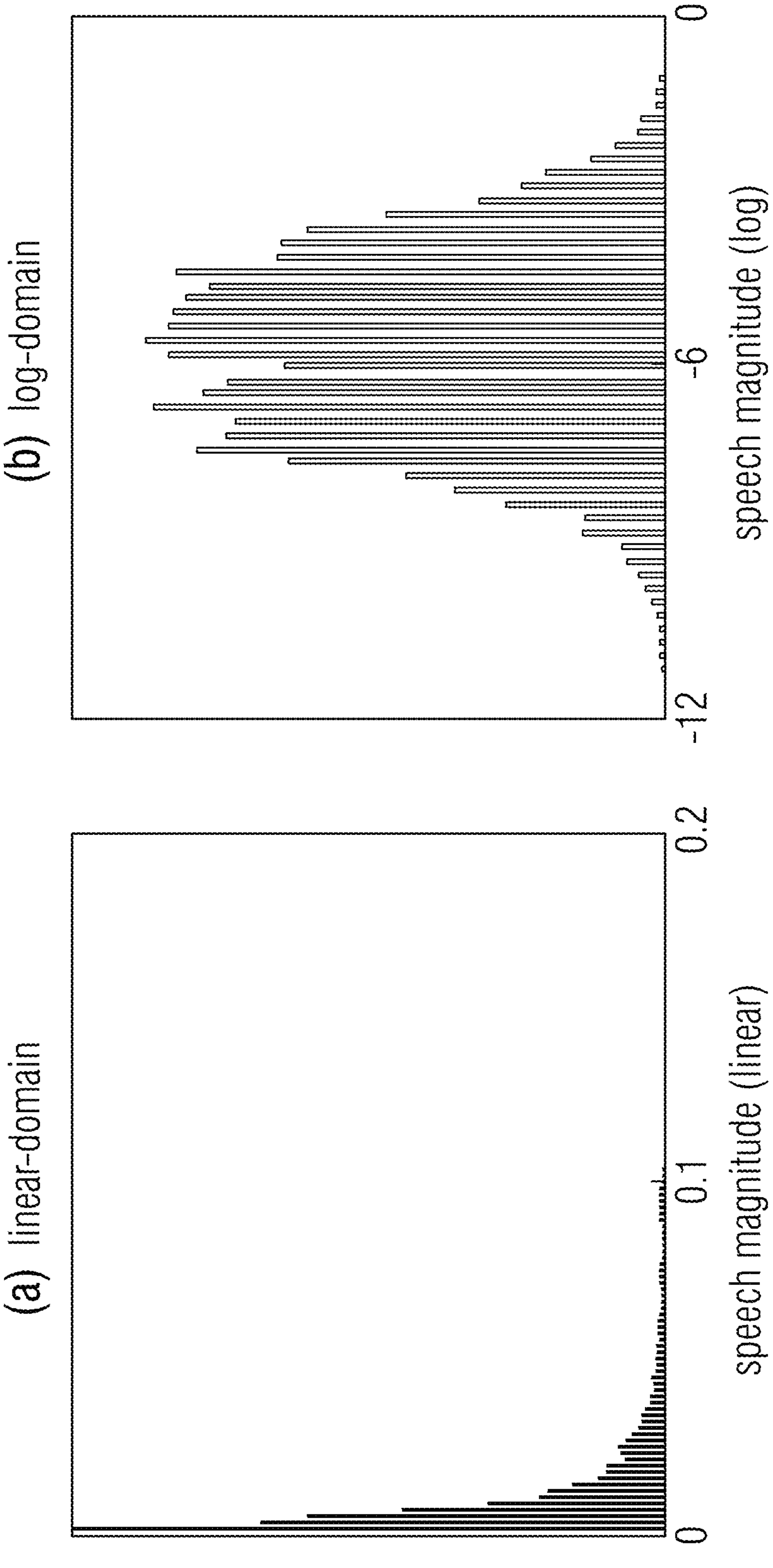
Fig. 3.2

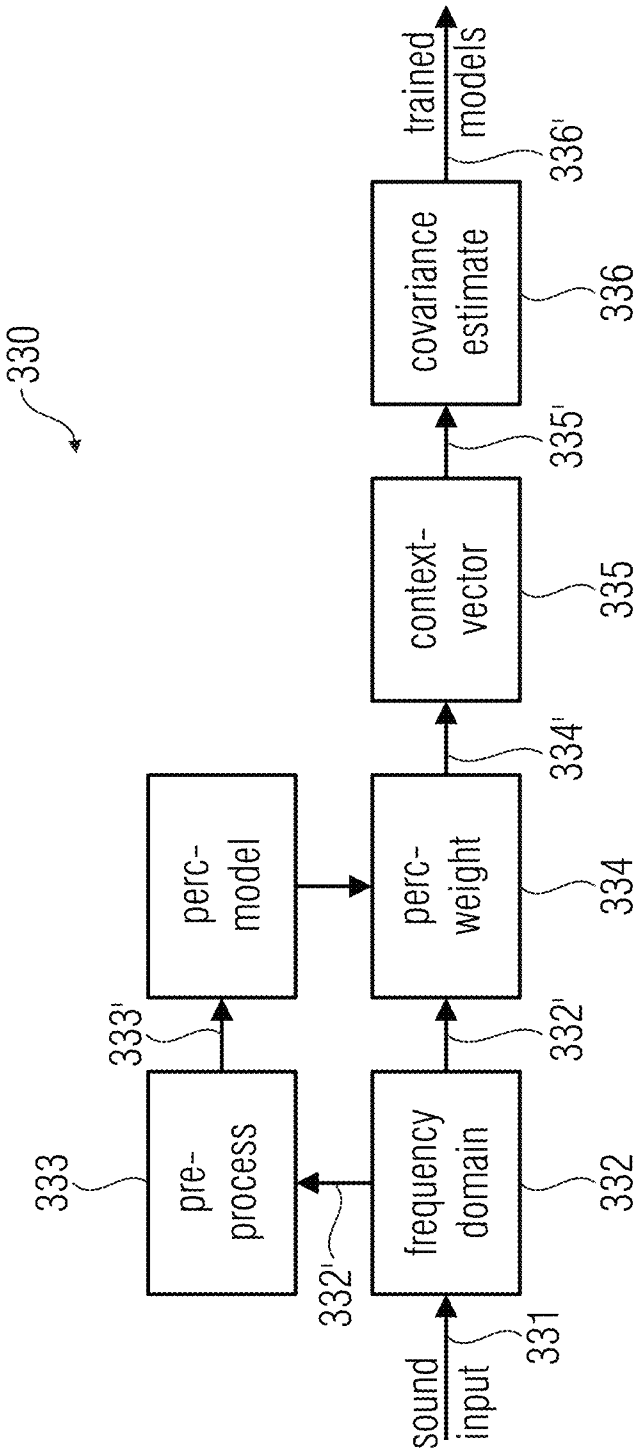
Fig. 3.3

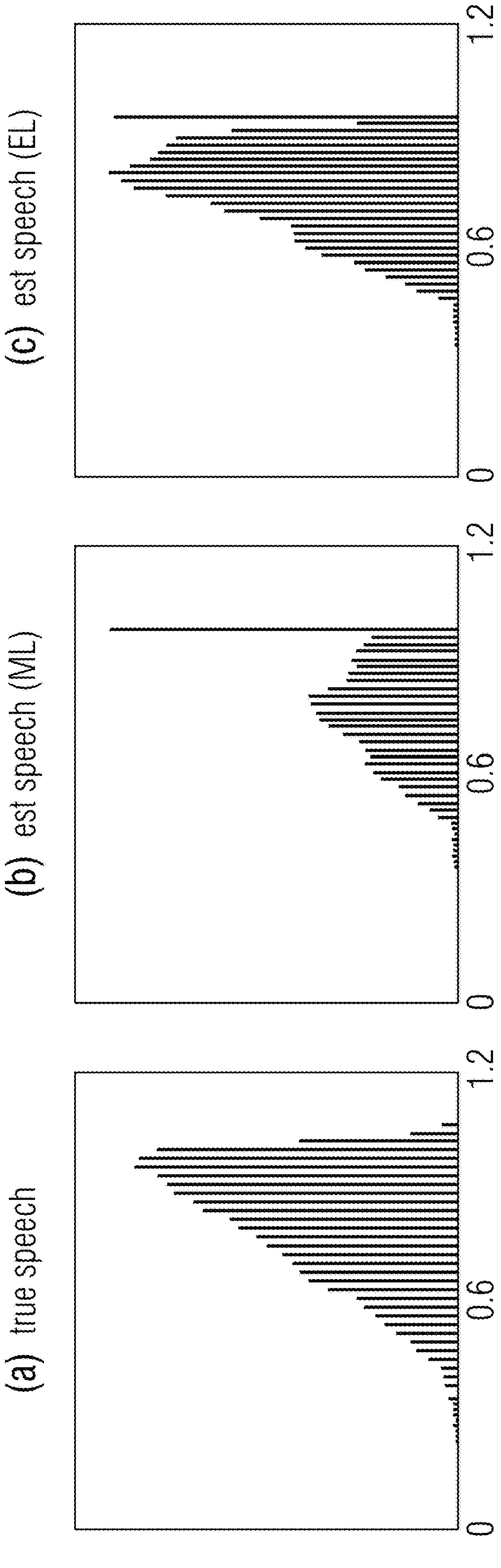
Fig. 3.4

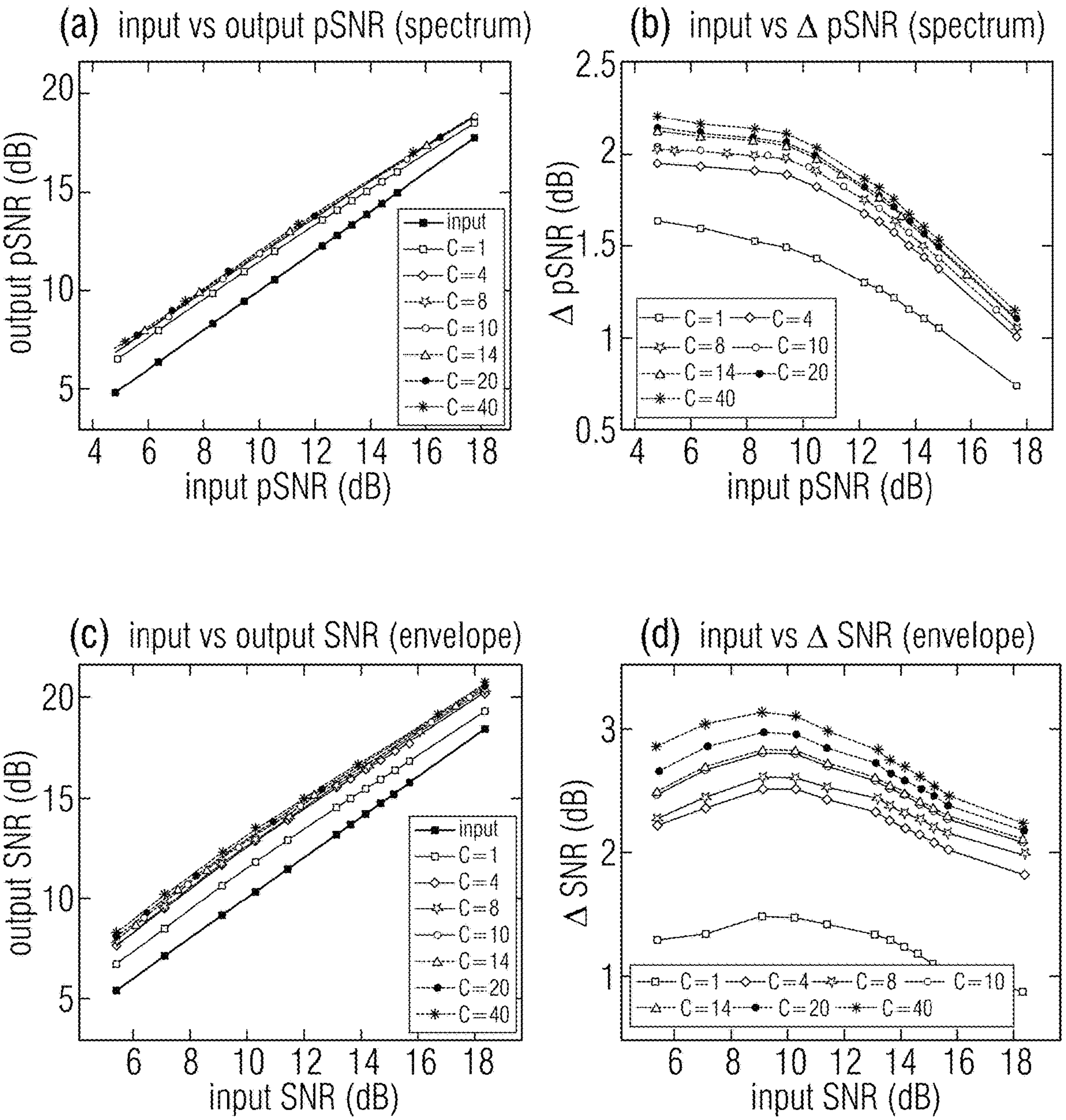
Fig. 3.5

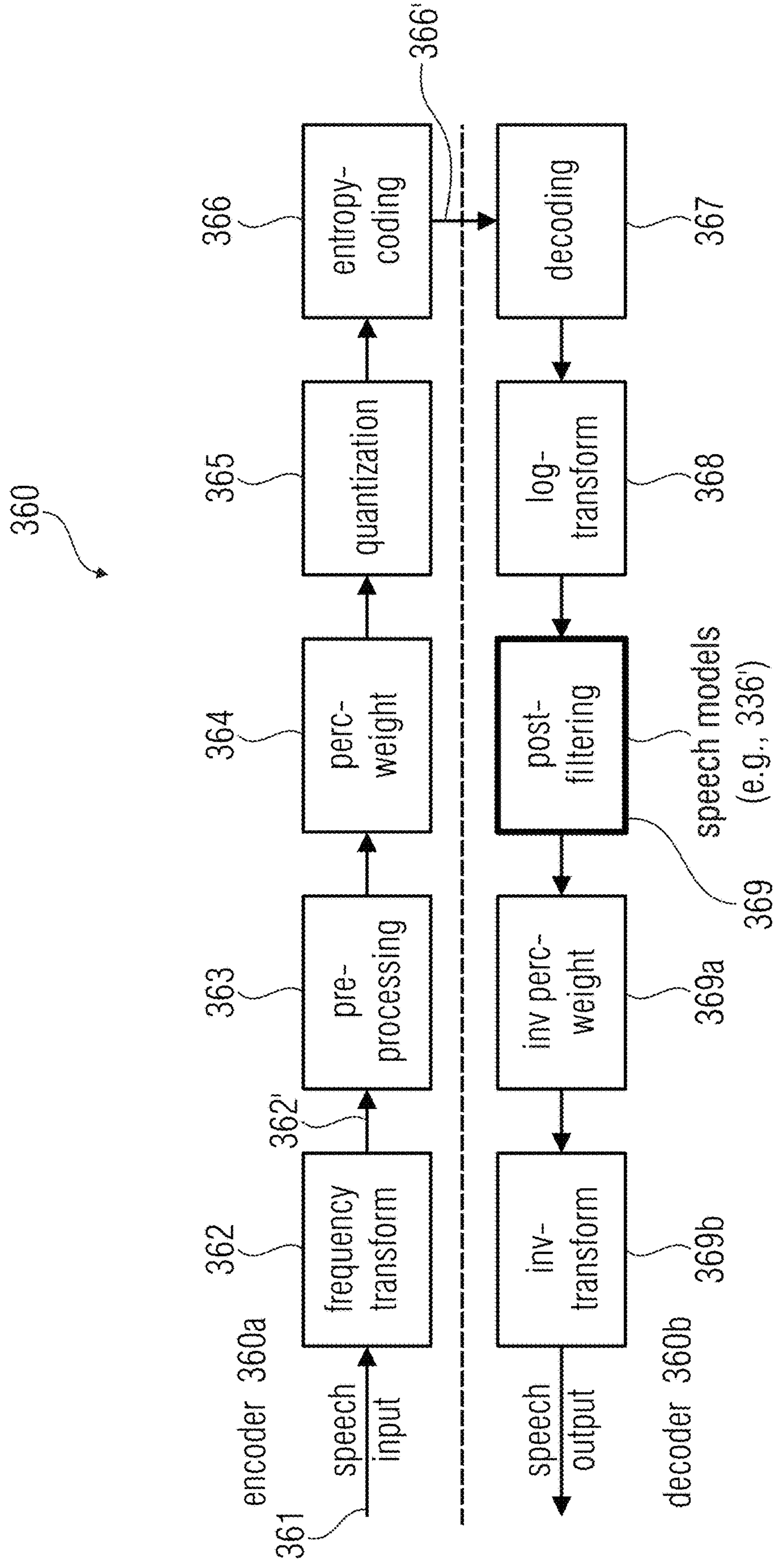
Fig. 3.6

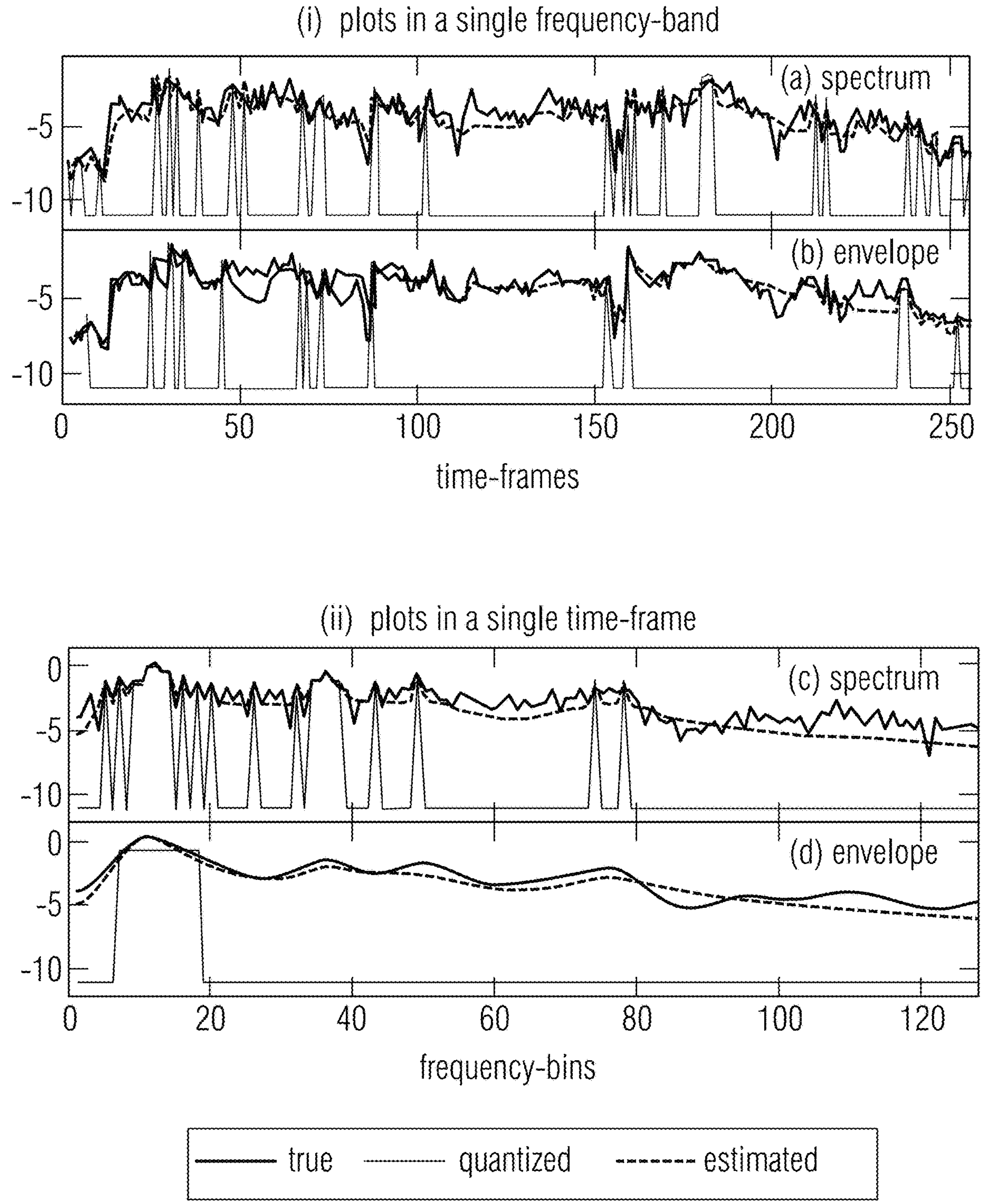
Fig. 3.7

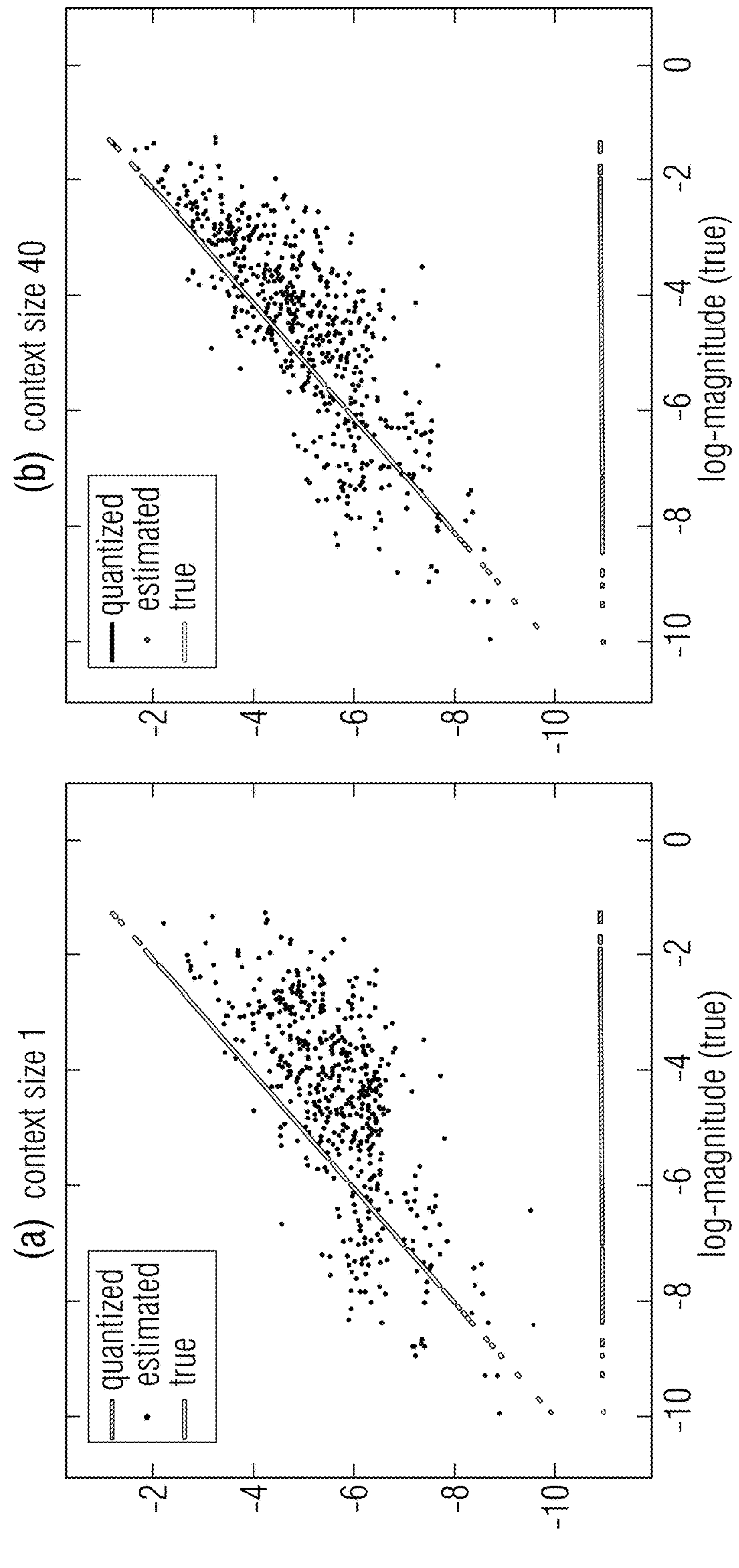
Fig. 3.8

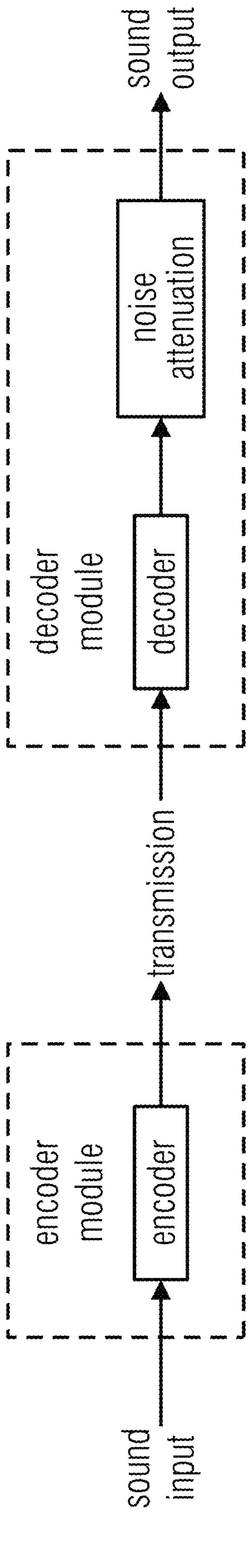
Fig. 4.1

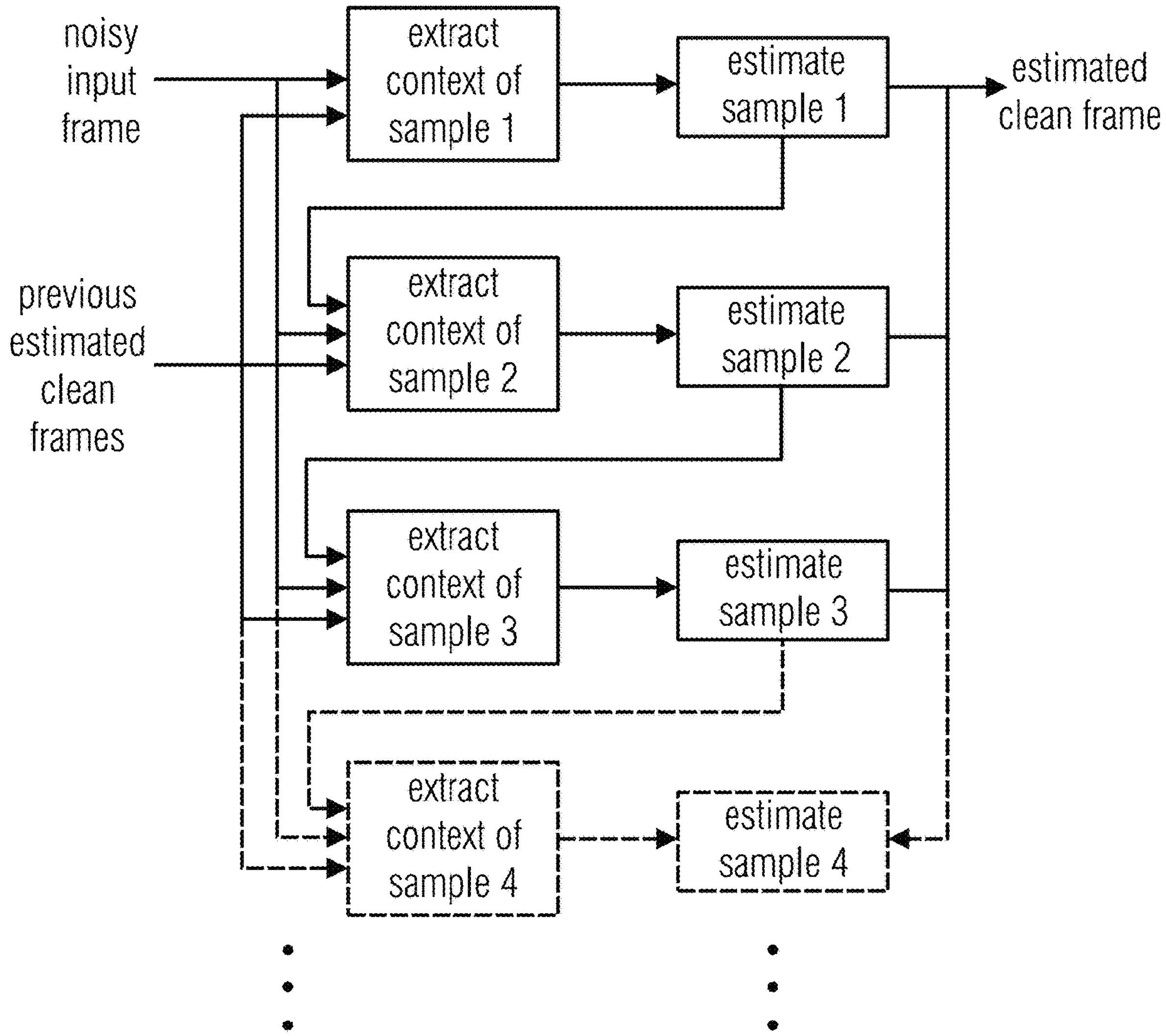
Fig. 4.2

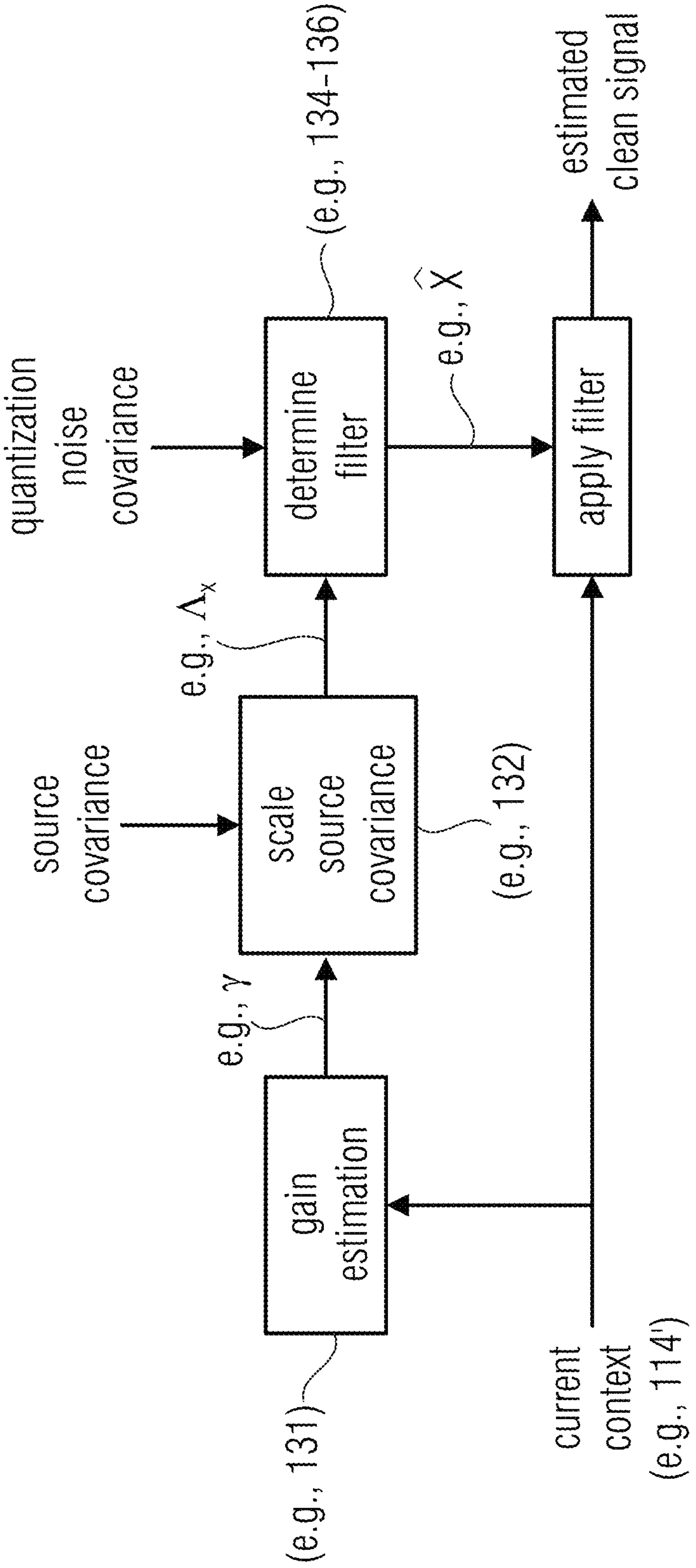
Fig. 4.3

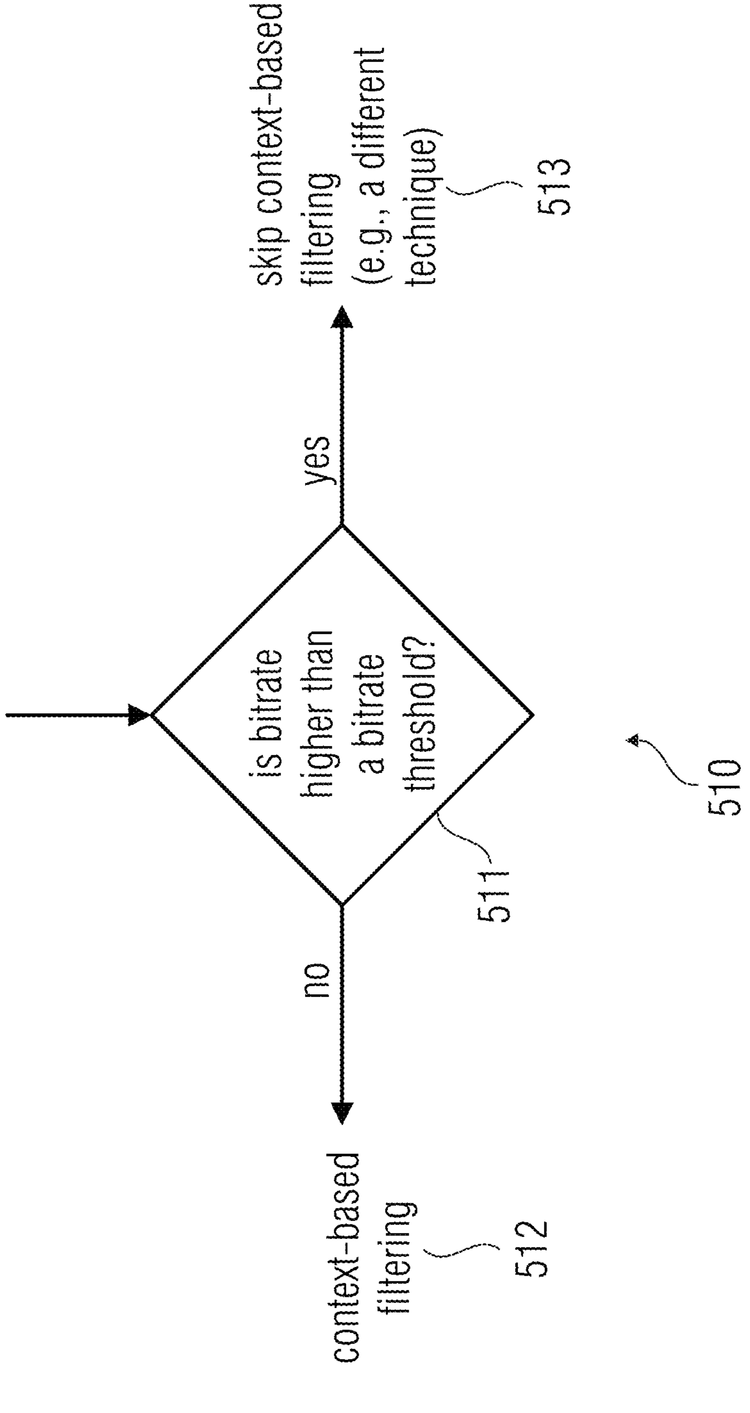
Fig. 5.1

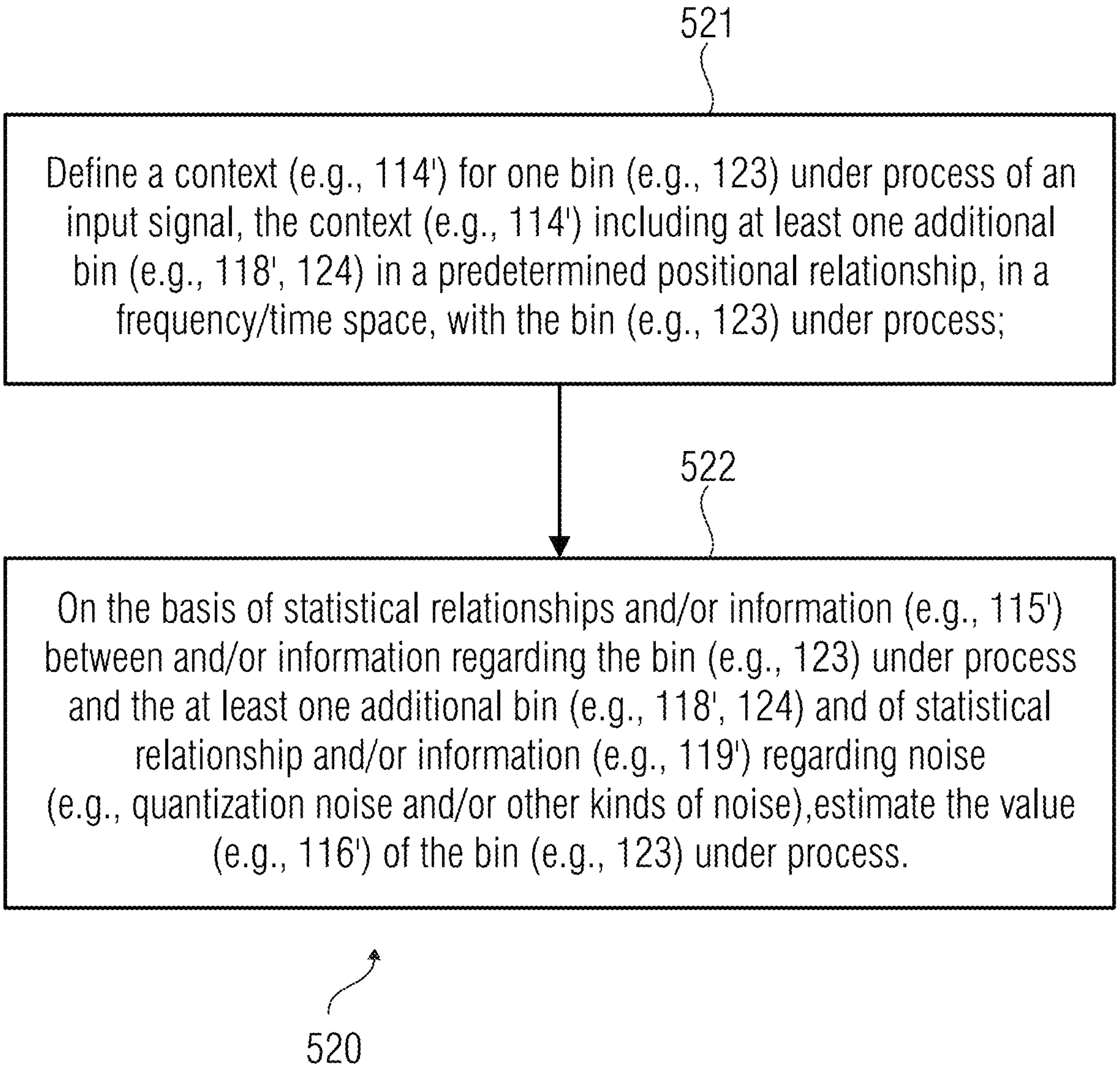
Fig. 5.2

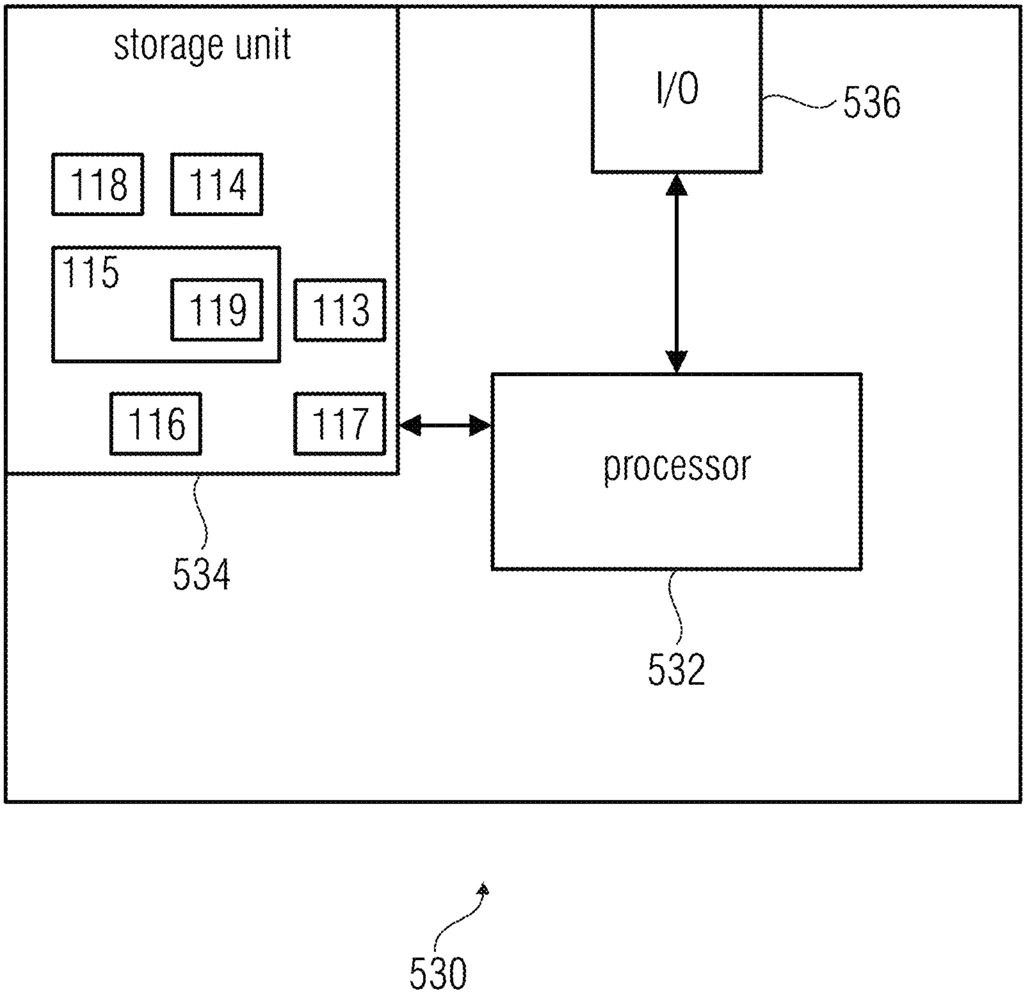
Fig. 5.3

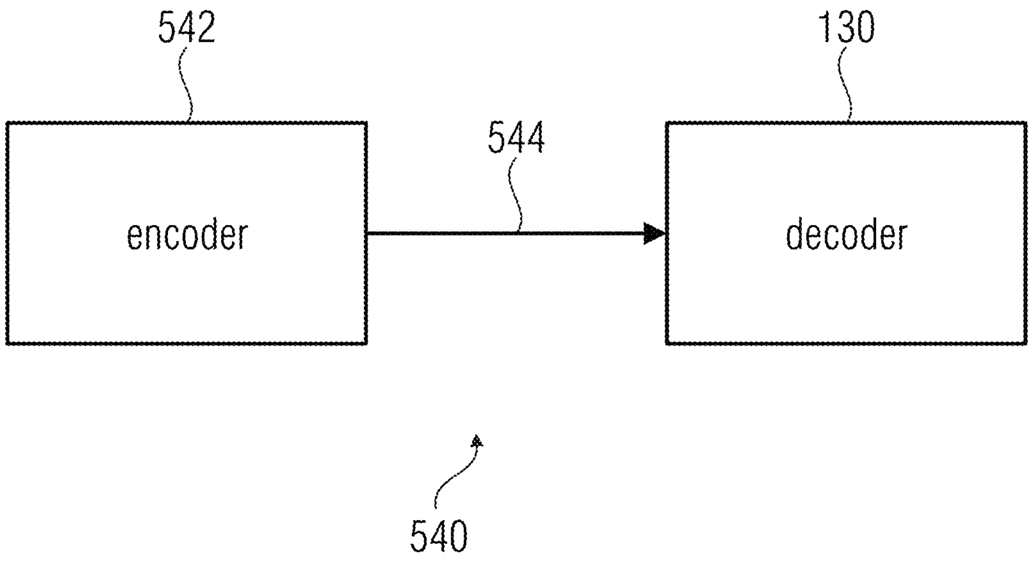
Fig. 5.4

NOISE ATTENUATION AT A DECODER

CROSS-REFERENCES TO RELATED APPLICATIONS

This application is a continuation of copending International Application No. PCT/EP2018/071943, filed Aug. 13, 2018, which is incorporated herein by reference in its entirety, and additionally claims priority from European Application No. EP 17198991.6, filed Oct. 27, 2017, which is incorporated herein by reference in its entirety.

1. BACKGROUND OF THE INVENTION

A decoder is normally used to decode a bitstream (e.g., received or stored in a storage device). The signal may notwithstanding be subjected to noise, such as for example, quantization noise. Attenuation of this noise is therefore an important goal.

2. SUMMARY

According to an embodiment, a decoder for decoding a frequency-domain input signal defined in a bitstream, the frequency-domain input signal being subjected to noise, may have:

- a bitstream reader to provide, from the bitstream, a version of the frequency-domain input signal as a sequence of frames, each frame being subdivided into a plurality of bins, each bin having a sampled value;
- a context definer configured to define a context for one bin under process, the context including at least one additional bin in a predetermined positional relationship with the bin under process;
- a statistical relationship and information estimator configured to provide:
  - statistical relationships between the bin under process and the at least one additional bin, the statistical relationships being provided in form of covariances or correlations; and
  - information regarding the bin under process and the at least one additional bin, the information being provided in form of variances or autocorrelations,
- wherein the statistical relationship and information estimator includes a noise relationship and information estimator configured to provide statistical relationships and information regarding noise, wherein the statistical relationships and information regarding noise include a noise matrix estimating relationships among noise signals among the bin under process and the at least one additional bin;
- a value estimator configured to process and obtain an estimate of the value of the bin under process on the basis of the estimated statistical relationships between the bin under process and the at least one additional bin and the information regarding the bin under process and the at least one additional bin, and the statistical relationships and information regarding noise, and
- a transformer to transform the estimate into a time-domain signal.

According to another embodiment, a decoder for decoding a frequency-domain input signal defined in a bitstream, the frequency-domain input signal being subjected to noise, may have:

- a bitstream reader to provide, from the bitstream, a version of the frequency-domain input signal as a sequence of frames, each frame being subdivided into a plurality of bins, each bin having a sampled value;
- a context definer configured to define a context for one bin under process, the context including at least one additional bin in a predetermined positional relationship with the bin under process;
- a statistical relationship and information estimator configured to provide statistical relationships between the bin under process and the at least one additional bin and information regarding the bin under process and the at least one additional bin, wherein the relationships and information include a variance-related and/or standard-deviation-value-related value on the basis of variance-related and covariance-related relationships between the bin under process and the at least one additional bin of the context to a value estimator,
- wherein the statistical relationship and information estimator includes a noise relationship and information estimator configured to provide statistical relationships and information regarding noise, wherein the statistical relationships and information regarding noise include, for each bin, a ceiling value and a floor value for estimating the signal on the basis of the expectation of the signal to be between the ceiling value and the floor value;
- the value estimator being configured to process and obtain an estimate of the value of the bin under process on the basis of the estimated statistical relationships between the bin under process and the at least one additional bin and the information regarding the bin under process and the at least one additional bin, and the statistical relationships and information regarding noise; and
- the decoder further including a transformer to transform the estimate into a time-domain signal.

According to another embodiment, a method for decoding a frequency-domain input signal defined in a bitstream, the frequency-domain input signal being subjected to noise, may have the steps of:

- providing, from a bitstream, a version of a frequency-domain input signal as a sequence of frames, each frame being subdivided into a plurality of bins, each bin having a sampled value;
- defining a context for one bin under process of the frequency-domain input signal, the context including at least one additional bin in a predetermined positional relationship, in a frequency/time space, with the bin under process;
- on the basis of statistical relationships between the bin under process and the at least one additional bin, information regarding the bin under process and the at least one additional bin, statistical relationships and information regarding noise, wherein the statistical relationships is provided in form of covariances or correlations and the information is provided in form of variances or autocorrelations, wherein the statistical relationships and information regarding noise include a noise matrix estimating relationships among noise signals among the bin under process and the at least one additional bin;
- estimating the value of the bin under process; and
- transforming the estimate into a time-domain signal.

According to yet another embodiment, a method for decoding a frequency-domain input signal defined in a bitstream, the frequency-domain input signal being subjected to noise, may have the steps of:

providing, from a bitstream, a version of a frequency-domain input signal as a sequence of frames, each frame being subdivided into a plurality of bins, each bin having a sampled value;

defining a context for one bin under process of the frequency-domain input signal, the context including at least one additional bin in a predetermined positional relationship, in a frequency/time space, with the bin under process;

on the basis of statistical relationships between the bin under process and the at least one additional bin, information regarding the bin under process and the at least one additional bin, statistical relationships and information regarding noise, wherein the statistical relationships and information include a variance-related and/or standard-deviation-value-related value provided on the basis of variance-related and covariance-related relationships between the bin under process and at least one additional bin of the context, wherein the statistical relationships and information regarding noise include, for each bin, a ceiling value and a floor value for estimating the signal on the basis of the expectation of the signal to be between the ceiling value and the floor value;

estimating the value of the bin under process; and transforming the estimate into a time-domain signal.

According to yet another embodiment, a non-transitory digital storage medium may have a computer program stored thereon to perform the inventive methods, when said computer program is run by a computer.

In accordance to an aspect, there is here provided a decoder for decoding a frequency-domain signal defined in a bitstream, the frequency-domain input signal being subjected to quantization noise, the decoder comprising:

a bitstream reader to provide, from the bitstream, a version of the input signal as a sequence of frames, each frame being subdivided into a plurality of bins, each bin having a sampled value;

a context definer configured to define a context for one bin under process, the context including at least one additional bin in a predetermined positional relationship with the bin under process;

a statistical relationship and/or information estimator configured to provide statistical relationships and/or information between and/or information regarding the bin under process and the at least one additional bin, wherein the statistical relationship estimator includes a quantization noise relationship and/or information estimator configured to provide statistical relationships and/or information regarding quantization noise;

a value estimator configured to process and obtain an estimate of the value of the bin under process on the basis of the estimated statistical relationships and/or information and statistical relationships and/or information regarding quantization noise; and a transformer to transform the estimated signal into a time-domain signal.

In accordance to an aspect, there is here disclosed a decoder for decoding a frequency-domain signal defined in a bitstream, the frequency-domain input signal being subjected to noise, the decoder comprising:

a bitstream reader to provide, from the bitstream, a version of the input signal as a sequence of frames, each frame being subdivided into a plurality of bins, each bin having a sampled value;

a context definer configured to define a context for one bin under process, the context including at least one additional bin in a predetermined positional relationship with the bin under process;

a statistical relationship and/or information estimator configured to provide statistical relationships and/or information between and/or information regarding the bin under process and the at least one additional bin, wherein the statistical relationship estimator includes a noise relationship and/or information estimator configured to provide statistical relationships and/or information regarding noise;

a value estimator configured to process and obtain an estimate of the value of the bin under process on the basis of the estimated statistical relationships and/or information and statistical relationships and/or information regarding noise; and a transformer to transform the estimated signal into a time-domain signal.

3. BRIEF DESCRIPTION OF THE DRAWINGS

Embodiments of the present invention will be detailed subsequently referring to the appended drawings, in which:

FIG. 1.1 shows a decoder according to an example.

FIG. 1.2 shows a schematization in a frequency/time-space graph of a version of a signal, indicating the context.

FIG. 1.3 shows a decoder according to an example.

FIG. 1.4 shows a method according to an example.

FIG. 1.5 shows schematizations in a frequency/time space graph and magnitude/frequency graphs of a version of a signal.

FIG. 2.1 shows schematizations of frequency/time space graphs of a version of a signal, indicating the contexts.

FIG. 2.2 shows histograms obtained with examples.

FIG. 2.3 shows spectrograms of speech according to examples.

FIG. 2.4: shows an example of decoder and encoder.

FIG. 2.5: shows plots with results obtained with examples.

FIG. 2.6 shows test results obtained with examples.

FIG. 3.1 shows a schematization in a frequency/time space graph of a version of a signal, indicating the context.

FIG. 3.2 shows histograms obtained with examples.

FIG. 3.3 shows a bock diagram of the training of speech models.

FIG. 3.4 shows histograms obtained with examples.

FIG. 3.5 shows plots representing the improvement in SNR with examples

FIG. 3.6 shows an example of decoder and encoder.

FIG. 3.7 shows plots regarding examples.

FIG. 3.8 shows a correlation plot.

FIG. 4.1 shows a system according to an example.

FIG. 4.2 shows a scheme according to an example.

FIG. 4.3 shows a scheme according to an example.

FIG. 5.1 shows a method step according to examples.

FIG. 5.2 shows a general method.

FIG. 5.3 shows a processor-based system according to an example.

FIG. 5.4 shows an encoder/decoder system according to an example.

DETAILED DESCRIPTION OF THE INVENTION

According to an aspect, the noise is noise which is not quantization noise. According to an aspect, the noise is quantization noise.

According to an aspect, the context definer is configured to choose the at least one additional bin among previously processed bins.

According to an aspect, the context definer is configured to choose the at least one additional bin based on the band of the bin.

According to an aspect, the context definer is configured to choose the at least one additional bin, within a predetermined threshold, among those which have already been processed.

According to an aspect, the context definer is configured to choose different contexts for bins at different bands.

According to an aspect, the value estimator is configured to operate as a Wiener filter to provide an optimal estimation of the input signal.

According to an aspect, the value estimator is configured to obtain the estimate of the value of the bin under process from at least one sampled value of the at least one additional bin.

According to an aspect, the decoder further comprises a measurer configured to provide a measured value associated to the previously performed estimate(s) of the least one additional bin of the context, wherein the value estimator is configured to obtain an estimate of the value of the bin under process on the basis of the measured value.

According to an aspect, the measured value is a value associated to the energy of the at least one additional bin of the context.

According to an aspect, the measured value is a gain associated to the at least one additional bin of the context.

According to an aspect, the measurer is configured to obtain the gain as the scalar product of vectors, wherein a first vector contains value(s) of the at least one additional bin of the context, and the second vector is the transpose conjugate of the first vector.

According to an aspect, the statistical relationship and/or information estimator is configured to provide the statistical relationships and/or information as pre-defined estimates and/or expected statistical relationships between the bin under process and the at least one additional bin of the context.

According to an aspect, the statistical relationship and/or information estimator is configured to provide the statistical relationships and/or information as relationships based on positional relationships between the bin under process and the at least one additional bin of the context.

According to an aspect, the statistical relationship and/or information estimator is configured to provide the statistical relationships and/or information irrespective of the values of the bin under process and/or the at least one additional bin of the context.

According to an aspect, the statistical relationship and/or information estimator is configured to provide the statistical relationships and/or information in the form of variance, covariance, correlation and/or autocorrelation values.

According to an aspect, the statistical relationship and/or information estimator is configured to provide the statistical relationships and/or information in the form of a matrix establishing relationships of variance, covariance, correlation and/or autocorrelation values between the bin under process and/or the at least one additional bin of the context.

According to an aspect, the statistical relationship and/or information estimator is configured to provide the statistical relationships and/or information in the form of a normalized matrix establishing relationships of variance, covariance, correlation and/or autocorrelation values between the bin under process and/or the at least one additional bin of the context.

According to an aspect, the matrix is obtained by offline training.

According to an aspect, the value estimator is configured to scale elements of the matrix by an energy-related or gain value, so as to keep into account the energy and/or gain variations of the bin under process and/or the at least one additional bin of the context.

According to an aspect, the value estimator is configured to obtain the estimate of the value of the bin under process on the basis of a relationship $$\hat{x}=\Lambda_X(\Lambda_X+\Lambda_N)^{-1}y,$$

where $\Lambda_X, \Lambda_N \in \mathbb{C}^{(c+1)\times(c+1)}$ are noise and covariance matrices, respectively, and $y \in \mathbb{C}^{c+1}$ is a noisy observation vector with c+1 dimensions, c being the context length.

According to an aspect, value estimator is configured to obtain the estimate of the value of the bin (123) under process on the basis of a relationship $$\hat{x}=\gamma\Lambda_X(\gamma\Lambda_X+\lambda_N)^{-1}y,$$

where $\Lambda_N \in \mathbb{C}^{(c+1)\times(c+1)}$ is a normalized covariance matrix, $\Lambda_N \in \mathbb{C}^{(c+1)\times(c+1)}$ is the noise covariance matrix, $y \in \mathbb{C}^{c+1}$ is a noisy observation vector with c+1 dimensions and associated to the bin under process and the addition bins of the context, c being the context length, $\gamma$ being a scaling gain.

According to an aspect, the value estimator is configured to obtain the estimate of the value of the bin under process provided that the sampled values of each of the additional bins of the context correspond to the estimated value of the additional bins of the context.

According to an aspect, the value estimator is configured to obtain the estimate of the value of the bin under process provided that the sampled value of the bin under process is expected to be between a ceiling value and a floor value.

According to an aspect, the value estimator is configured to obtain the estimate of the value of the bin under process on the basis of a maximum of a likelihood function.

According to an aspect, the value estimator is configured to obtain the estimate of the value of the bin under process on the basis of an expected value.

According to an aspect, the value estimator is configured to obtain the estimate of the value of the bin under process on the basis of the expectation of a multivariate Gaussian random variable.

According to an aspect, the value estimator is configured to obtain the estimate of the value of the bin under process on the basis of the expectation of a conditional multivariate Gaussian random variable.

According to an aspect, the sampled values are in the Log-magnitude domain.

According to an aspect, the sampled values are in the perceptual domain.

According to an aspect, the statistical relationship and/or information estimator is configured to provide an average value of the signal to the value estimator.

According to an aspect, the statistical relationship and/or information estimator is configured to provide an average value of the clean signal on the basis of variance-related and/or covariance-related relationships between the bin under process and at least one additional bin of the context.

According to an aspect, the statistical relationship and/or information estimator is configured to provide an average value of the clean signal on the basis of the expected value of the bin (123) under process.

According to an aspect, the statistical relationship and/or information estimator is configured to update an average value of the signal based on the estimated context.

According to an aspect, the statistical relationship and/or information estimator is configured to provide a variance-related and/or standard-deviation-value-related value to the value estimator.

According to an aspect, the statistical relationship and/or information estimator is configured to provide a variance-related and/or standard-deviation-value-related value on the basis of variance-related and/or covariance-related relationships between the bin under process and at least one additional bin of the context to the value estimator.

According to an aspect, the noise relationship and/or information estimator is configured to provide, for each bin, a ceiling value and a floor value for estimating the signal on the basis of the expectation of the signal to be between the ceiling and the floor value.

According to an aspect, the version of the input signal has a quantized value which is a quantization level, the quantization level being a value chosen from a discrete number of quantization levels.

According to an aspect, the number and/or values and/or scales of the quantization levels are signaled by the encoder and/or signaled in the bitstream.

According to an aspect, the value estimator is configured to obtain the estimate of the value of the bin under process in terms of $$\hat{x}=E[P(X|X_c=\hat{x}_c)]_{l\le X\le u}{}^{subjectto}.$$

where $\hat{x}$ is the estimate of the bin under process, l and u are the lower and upper limits of the current quantization bins, respectively, and $P(a_1|a_2)$ is the conditional probability of $a_1$, given $a_2$, $\hat{x}_c$ being an estimated context vector.

According to an aspect, the value estimator is configured to obtain the estimate of the value of the bin under process on the basis of the expectation $$E(X \mid l < X < u) = \mu - \sigma\sqrt{\frac{2}{\pi}}\left[\frac{f_1(u) - f_1(l)}{f_2(u) - f_2(l)}\right]$$

wherein X is a particular value [X] of the bin under process expressed as a truncated Gaussian random variable, with $l<X<u$, where l is the floor value and u is the ceiling value, $$f_1(a) = e^{-\frac{(a-\mu)^2}{2\sigma^2}} \text{ and } f_2(a) = \text{erf}\left(\frac{a-\mu}{\sigma\sqrt{2}}\right),$$

$\mu=E(X)$, $\mu$ and $\sigma$ are mean and variance of the distribution.

According to an aspect, the predetermined positional relationship is obtained by offline training.

According to an aspect, at least one of the statistical relationships and/or information between and/or information regarding the bin under process and the at least one additional bin are obtained by offline training.

According to an aspect, at least one of the quantization noise relationships and/or information are obtained by offline training.

According to an aspect, the input signal is an audio signal.

According to an aspect, the input signal is a speech signal.

According to an aspect, at least one among the context definer, the statistical relationship and/or information estimator, the noise relationship and/or information estimator, and the value estimator is configured to perform a post-filtering operation to obtain a clean estimation of the input signal.

According to an aspect, the context definer is configured to define the context with a plurality of additional bins.

According to an aspect, the context definer is configured to define the context as a simply connected neighbourhood of bins in a frequency/time graph.

According to an aspect, the bitstream reader is configured to avoid the decoding of inter-frame information from the bitstream.

According to an aspect, the decoder is further configured to determine the bitrate of the signal, and, in case the bitrate is above a predetermined bitrate threshold, to bypass at least one among the context definer, the statistical relationship and/or information estimator, the noise relationship and/or information estimator, the value estimator.

According to an aspect, the decoder further comprises a processed bins storage unit storing information regarding the previously proceed bins,

- the context definer being configured to define the context using at least one previously proceed bin as at least one of the additional bins.

According to an aspect, the context definer is configured to define the context using at least one non-processed bin as at least one of the additional bins.

According to an aspect, the statistical relationship and/or information estimator is configured to provide the statistical relationships and/or information in the form of a matrix establishing relationships of variance, covariance, correlation and/or autocorrelation values between the bin under process and/or the at least one additional bin of the context,

- wherein the statistical relationship and/or information estimator is configured to choose one matrix from a plurality of predefined matrixes on the basis of a metrics associated to the harmonicity of the input signal.

According to an aspect, the noise relationship and/or information estimator is configured to provide the statistical relationships and/or information regarding noise in the form of a matrix establishing relationships of variance, covariance, correlation and/or autocorrelation values associated to the noise,

- wherein the statistical relationship and/or information estimator is configured to choose one matrix from a plurality of predefined matrixes on the basis of a metrics associated to the harmonicity of the input signal.

There is also provided a system comprising an encoder and a decoder according to any of the aspects above and/or below, the encoder being configured to provide the bitstream with encoded the input signal.

In examples, there is provided a method comprising:

- defining a context for one bin under process of an input signal, the context including at least one additional bin in a predetermined positional relationship, in a frequency/time space, with the bin under process;
- on the basis of statistical relationships and/or information between and/or information regarding the bin under process and the at least one additional bin and of statistical relationships and/or information regarding quantization noise, estimating the value of the bin under process.

In examples, there is provided a method comprising:

- defining a context for one bin under process of an input signal, the context including at least one additional bin in a predetermined positional relationship, in a frequency/time space, with the bin under process;

on the basis of statistical relationships and/or information between and/or information regarding the bin under process and the at least one additional bin and of statistical relationships and/or information regarding noise which is not quantization noise, estimating the value of the bin under process.

One of the methods above may use the equipment of any of any of the aspects above and/or below.

In examples, there is provide a non-transitory storage unit storing instructions which, when executed by a processor, causes the processor to perform any of the methods of any of the aspects above and/or below.

4.1. DETAILED DESCRIPTIONS

4.1.1. Examples

FIG. 1.1 shows an example of a decoder 110. FIG. 1.2 shows a representation of a signal version 120 processed by the decoder 110.

The decoder 110 may decode a frequency-domain input signal encoded in a bitstream 111 (digital data stream) which has been generated by an encoder. The bitstream 111 may have been stored, for example, in a memory, or transmitted to a receiver device associated to the decoder 110.

When generating the bitstream, the frequency-domain input signal may have been subjected to quantization noise. In other examples, the frequency-domain input signal may be subjected to other types of noise. Hereinbelow are described techniques which permit to avoid, limit or reduce the noise.

The decoder 110 may comprise a bitstream reader 113 (communication receiver, mass memory reader, etc.). The bitstream reader 113 may provide, from the bitstream 111, a version 113' of the original input signal (represented with 120 in FIG. 1.2 in a time/frequency two-dimensional space). The version 113', 120 of the input signal may be seen as a sequence of frames 121. In example, each frame 121 may be a frequency domain, FD, representation of the original input signal for a time slot. For example, each frame 121 may be associated to a time slot of 20 ms (other lengths may be defined). Each of the frames 121 may be identified with an integer number "t" of a discrete sequence of discrete slots. For example, the $(t+1)^{th}$ frame is immediately subsequent to the $t^{th}$ frame. Each frame 121 may be subdivided into a plurality of spectral bins (here indicated as 123-126). For each frame 121, each bin is associated to a particular frequency and/or a particular frequency band. The bands may be predetermined, in the sense that each bin of the frame may be pre-assigned to a particular frequency band. The bands may be numbered in discrete sequences, each band being identified by a progressive numeral "k". For example, the $(k+1)^{th}$ band may be higher in frequency than the $k^{th}$ band.

The bitstream 111 (and the signal 113', 120, consequently) may be provided in such a way that each time/frequency bin is associated to a particular value (e.g., sampled value). The sampled value is in general expressed as Y(k, t) and may be, in some cases, a complex value. In some examples, the sampled value Y(k, t) may be the unique knowledge that the decoder 110 has regarding the original at the time slot t at the band k. Accordingly, the sampled value Y(k, t) is in general impaired by quantization noise, as the necessity of quantizing the original input signal, at the encoder, has introduced errors of approximation when generating the bitstream and/or when digitalizing the original analog signal. (Other types of noise may also be schematized in other examples.) The sampled value Y(k, t) (noisy speech) may be understood as being expressed in terms of $$Y(k,t)=X(k,t)+V(k,t),$$

with X(k, t) being the clean signal (which would be advantageously obtained) and V(k, t), which is quantization noise signal (or other type of noise signal). It has been noted that it is possible to arrive at an appropriated, optimal estimate of the clean signal with techniques described here.

Operations may provide that each bin is processed at one particular time, e.g. recursively. At each iteration, a bin to be processed is identified (e.g., bin 123 or $C_0$, in FIG. 1.2, associated to instant t=4 and band k=3, the bin being referred to as "bin under process"). With respect to the bin 123 under process, the other bins of the signal 120 (113') may be divided into two classes:

a first class of non-processed bins 126 (indicated with a dashed circle in FIG. 1.2), e.g., bins which are to be processed at future iterations; and a second class of already-processed bins 124, 125 (indicated with squares in FIG. 1.2), e.g., bins which have been processed at previous iterations.

It is possible to obtain, for one bin 123 under process, an optimal estimate on the basis of at least one additional bin (which may be one of the squared bins in FIG. 1.2). The at least one additional bin may be a plurality of bins.

The decoder 110 may comprise a context definer 114 which defines a context 114' (or context block) for one bin 123 ($C_0$) under process. The context 114' includes at least one additional bin (e.g., a group of bins) in a predetermined positional relationship with the bin 123 under process. In the example of FIG. 1.2, the context 114' of bin 123 ($C_0$) is formed by ten additional bins 124 (118') indicated with $C_1$-$C_{10}$ (the generic number of additional bins forming one context is here indicated with "c": in FIG. 1.2, c=10). The additional bins 124 ($C_1$-$C_{10}$) may be bins in a neighborhood of the bin 123 ($C_0$) under process and/or may be already processed bins (e.g., their value may have already been obtained during previous iterations). The additional bins 124 ($C_1$-$C_{10}$) may be those bins (e.g., among the already processed ones) which are the closest to the bin 123 ($C_0$) under process (e.g., those bins which have a distance from $C_0$ less than a predetermined threshold, e.g., three positions). The additional bins 124 ($C_1$-$C_{10}$) may be the bins (e.g., among the already proceed ones) which are expected to have the highest correlation with the bin 123 ($C_0$) under process. The context 114' may be defined in a neighbourhood so as to avoid "holes", in the sense that in the frequency/time representation all the context bins 124 are immediately adjacent to each other and to the bin 123 under process (the context bins 124 forming thereby a "simply connected" neighbourhood). (The already processed bins, which notwithstanding are not chosen for the context 114' of the bin 123 under process, are shown with dashed squares and are indicated with 125). The additional bins 124 ($C_1$-$C_{10}$) may in a numbered relationship with each other (e.g., $C_1, C_2, \ldots, C_c$ with c being the number of bins in the context 114', e.g., 10). Each of the additional bins 124 ($C_1$-$C_{10}$) of the context 114' may be in a fixed position with respect to the bin 123 ($C_0$) under process. The positional relationships between the additional bins 124 ($C_1$-$C_{10}$) and the bin 123 ($C_0$) under process may be based on the particular band 122 (e.g., on the basis of the frequency/band number k). In the example of FIG. 1.2, the bin 123 ($C_0$) under process is in the $3^{rd}$ band (k=3) and at an instant t (in this case, t=4). In this case, it may be provided that:

- the first additional bin $C_1$ of the context 114' is the bin at instant t−1=3, at band k=3;
- the second additional bin $C_2$ of the context 114' is the bin at instant t=4, at band k−1=2;
- the third additional bin $C_3$ of the context 114' is the bin at instant t−1=3, at band k−1=2;
- the fourth additional bin $C_4$ of the context 114' is the bin at instant t−1=3, at band k+1=4;
- and so on.

(In the subsequent parts of the present document, "context bin" may be used to indicate an "additional bin" 124 of the context.)

In examples, after having processed all the bins of a generic $t^{th}$ frame, all the bins of the subsequent $(t+1)^{th}$ frame may be processed. For each generic $t^{th}$ frame, all the bins of the $t^{th}$ frame may be iteratively processed. Other sequences and/or paths may notwithstanding be provided.

For each $t^{th}$ frame, the positional relationships between the bin 123 ($C_0$) under process and the additional bins 124 forming the context 114' (120) may therefore be defined on the basis of the particular band k of the bin 123 ($C_0$) under process. When, during a previous iteration, the under-process bin was the bin currently indicated as $C_6$ (t=4, k=1), a different shape of the context had been chosen, as there are no bands defined under k=1. However, when the under-process bin bin was the bin at t=3, k=3 (currently indicated as $C_1$) the context had the same shape of the context of FIG. 1.2 (but staggered of one time instant toward left). For example, in FIG. 2.1, the context 114' for the bin 123 ($C_0$) of FIG. 2.1(*a*) is compared with the context 114" for the bin $C_2$ as previously used when $C_2$ had been the under-process bin: the contexts 114' and 114" are different from each other.

Therefore, the context definer 114 may be a unit which iteratively, for each bin 123 ($C_0$) under process, retrieves additional bins 124 (118', $C_1$-$C_{10}$) to form a context 114' containing already-processed bins having an expected high correlation with the bin 123 ($C_0$) under process (in particular, the shape of the context may be based on the particular frequency of the bin 123 under process).

The decoder 110 may comprise a statistical relationship and/or information estimator 115 to provide statistical relationships and/or information 115', 119' between the bin 123 ($C_0$) under process and the context bins 118', 124. The statistical relationship and/or information estimator 115 may include a quantization noise relationship and/or information estimator 119 to estimate relationships and/or information regarding the quantization noise 119' and/or statistical noise-related relationships between the noise affecting each bin 124 ($C_1$-$C_{10}$) of the context 114' and/or the bin 123 ($C_0$) under process.

In examples, an expected relationship 115' may comprise a matrix (e.g., a covariance matrix) containing expected covariance relationships (or other expected statistical relationships) between bins (e.g., the bin $C_0$ under process and the additional bins of the context $C_1$-$C_{10}$). The matrix may be a square matrix for which each row and each column is associated to a bin. Therefore, the dimensions of the matrix may be (c+1)×(c+1) (e.g., 11 in the example of FIG. 1.2). In examples, each element of the matrix may indicate an expected covariance (and/or correlation, and/or another statistical relationship) between the bin associated to the row of the matrix and the bin associated to the column of the matrix. The matrix may be Hermitian (symmetric in case of Real coefficients). The matrix may comprise, in the diagonal, a variance value associated to each bin. In example, instead of a matrix, other forms of mappings may be used.

In examples, an expected noise relationship and/or information 119' may be formed by a statistical relationship. In this case, however, the statistical relationship may refer to the quantization noise. Different covariances may be used for different frequency bands.

In examples, the quantization noise relationship and/or information 119' may comprise a matrix (e.g., a covariance matrix) containing expected covariance relationships (or other expected statistical relationships) between the quantization noise affecting the bins. The matrix may be a square matrix for which each row and each column is associated to a bin. Therefore, the dimensions of the matrix may be (c+1)×(c+1) (e.g., 11). In examples, each element of the matrix may indicate an expected covariance (and/or correlation, and/or another statistical relationship) between the quantization noise impairing the bin associated to the row and the bin associated to the column. The covariance matrix may be Hermitian (symmetric in case of Real coefficients). The matrix may comprise, in the diagonal, a variance value associated to each bin. In example, instead of a matrix, other forms of mappings may be used.

It has been noted that, by processing the sampled value Y(k, t) using expected statistical relationships between the bins, a better estimation of the clean value X(k, t) may be obtained.

The decoder 110 may comprise a value estimator 116 to process and obtain an estimate 116' of the sampled value X(k, t) (at the bin 123 under process, $C_0$) of the signal 113' on the basis of the expected statistical relationships and/or information and/or statistical relationships and/or information 119' regarding quantization noise 119'.

The estimate 116', which is a good estimate of the clean value X(k, t), may therefore be provided to an FD-to-TD transformer 117, to obtain an enhanced TD output signal 112.

The estimate 116' may be stored onto a processed bins storage unit 118 (e.g., in association with the time instant t and/or the band k). The stored value of the estimate 116' may, in subsequent iterations, provide the already processed estimate 116' to the context definer 114 as additional bin 118' (see above), so as to define the context bins 124.

FIG. 1.3 shows particulars of a decoder 130 which, in some aspects, may be the decoder 110. In this case, the decoder 130 operates, at the value estimator 116, as a Wiener filter.

In examples, the estimated statistical relationship and/or information 115' may comprise a normalized matrix $\Lambda_X$. The normalized matrix may be a normalized correlation matrix and may be independent from the particular sampled value Y(k, t). The normalized matrix $\Lambda_X$ may be a matrix which contains relationships among the bins $C_0$-$C_{10}$, for example. The normalized matrix $\Lambda_X$ may be static and may be stored, for example, in a memory.

In examples, the estimated statistical relationship and/or information regarding quantization noise 119' may comprise a noise matrix $\Lambda_N$. This matrix may be a correlation matrix and may represent relationships regarding the noise signal V(k, t), independent from the value of the particular sampled value Y(k, t). The noise matrix $\Lambda_N$ may be a matrix which estimates relationships among noise signals among the bins $C_0$-$C_{10}$, for example, independent of the clean speech value Y(k, t).

In examples, a measurer 131 (e.g., gain estimator) may provide a measured value 131' of the previously performed estimate(s) 116'. The measured value 131' may be, for example, an energy value and/or gain $\gamma$ of the previously performed estimate(s) 116' (the energy value and/or gain $\gamma$ may therefore be dependent on the context 114'). In general terms, the estimate 116' and the value 113' of bin under process 123 may be seen as a vector $u_{k,t}=[Y_{C_0}\ \hat{X}_{C_1}\ \hat{X}_{C_2}\ \hat{X}_{C_3}\ \ldots\ \hat{X}_{C_{10}}]$, where $Y_{C_0}$ is the sampled value of the bin 123 ($C_0$) currently under process and $\hat{X}_{C_1}\ \ldots\ \hat{X}_{C_{10}}$ are the previously obtained values for the context bins 124 ($C_1$-$C_{10}$). It is possible to normalize the vector $u_{k,t}$ so as to obtain the normalized vector $$z_{k,t} = \frac{u_{k,t}}{\|u_{k,t}\|}.$$

It is also possible to obtain the gain $\gamma$ as the scalar product of the normalized vector by its transpose, e.g., to obtain $\gamma=z_{k,t}z_{k,t}^H$ (where $z_{k,t}^H$ is the transpose of $z_{k,t}$, so that $\gamma$ is a scalar Real number).

A scaler 132 may be used to scale the normalized matrix $\Lambda_x$ by the gain $\gamma$, to obtain a scaled matrix 132' which keeps into account energy measurement (and/or gain $\gamma$) associated to the contest of the bin 123 under process. This is to keep into account that speech signals have large fluctuations in gain. A new matrix $\hat{\Lambda}_x$, which keeps into account the energy, may therefore be obtained. Notably, while matrix $\Lambda_x$ and matrix $\Lambda_N$ may be predefined (and/or containing elements pre-stored in a memory), the matrix $\hat{\Lambda}_x$ is actually calculated by processing. In alternative examples, instead of calculating the matrix $\hat{\Lambda}_x$, a matrix $\hat{\Lambda}_x$ may be chosen from a plurality of pre-stored matrixes $\hat{\Lambda}_x$, each pre-stored matrix $\hat{\Lambda}_x$ being associated to a particular range of measured gain and/or energy values.

After having calculated or chosen the matrix $\hat{\Lambda}_x$, an adder 133 may be used to add, element by element, the elements of the matrix $\hat{\Lambda}_x$ with elements of the noise matrix $\Lambda_N$, to obtain an added value 133' (summed matrix $\hat{\Lambda}_x+\Lambda_N$). In alternative examples, instead of being calculated, the summed matrix $\hat{\Lambda}_x+\Lambda_N$ may be chosen, on the basis of the measured gain and/or energy values, among a plurality of pre-stored summed matrixes.

At inversion block 134, the summed matrix $\hat{\Lambda}_x+\Lambda_N$ may be inverted to obtain $(\hat{\Lambda}_x+\Lambda_N)^{-1}$ as value 134'. In alternative examples, instead of being calculated, the inversed matrix $(\hat{\Lambda}_x+\Lambda_N)^{-1}$ may be chosen, on the basis of the measured gain and/or energy values, among a plurality of pre-stored inversed matrixes.

The inversed matrix $(\hat{\Lambda}_x+\Lambda_N)^{-1}$ (value 134') may be multiplied by $\hat{\Lambda}_x$ to obtain a value 135' as $\hat{\Lambda}_x(\hat{\Lambda}_x+\Lambda_N)^{-1}$. In alternative examples, instead of being calculated, the matrix $\hat{\Lambda}_x(\hat{\Lambda}_x+\Lambda_N)^{-1}$ may be chosen, on the basis of the measured gain and/or energy values, among a plurality of pre-stored matrixes.

At this point, at a multiplier 136 the value 135' may be multiplied to the vector input signal y. The vector input signal may be seen as a vector $y=[y_{C_0}\ y_{C_1}\ y_{C_2}\ y_{C_3}\ \ldots\ y_{C_{10}}]$ which comprises the nosy inputs associated to the bin 123 to be processed ($C_0$) and the context bins ($C_1$-$C_{10}$).

The output 136' of the multiplier 136 may therefore be $\hat{x}=\hat{\Lambda}_x(\hat{\Lambda}_x+\Lambda_N)^{-1}y$, as for a Wiener filter.

In FIG. 1.4 there is shown a method 140 according to an example (e.g., one of the examples above). At step 141, the bin 123 ($C_0$) under process (or process bin) is defined as the bin at the instant t, band k, and sampled value Y(k, t). At step 142 (e.g., processed by the context definer 114), the shape of the context is retrieved on the basis of the band k (the shape, dependent on the band k, may be stored in a memory). The shape of the context also defines the context 114' after that the instant t and the band k have been taken into consideration. At step 143 (e.g., processed by the context definer 114), the context bins $C_1$-$C_{10}$ (118', 124) are therefore defined (e.g., the previously processed bins which are in the context) and numbered according to a predefined order (which may be stored in the memory together with the shape and may also be based on the band k). At step 144 (e.g., processed by the estimator 115), matrixes may be obtained (e.g., normalized matrix $\Lambda_x$, noise matrix $\Lambda_N$, or another of the matrixes discussed above etc.). At step 145 (e.g., processed by the value estimator 116), the value for the process bin $C_0$ may be obtained, e.g., using the Wiener filter. In examples, an energy value associated to the energy (e.g., the gain $\gamma$ above) may be used as discussed above. At step 146, it is verified if there are other bands associated to the instant t with another bin 126 not processed yet. If there are other bands (e.g., band k+1) to be processed, then at step 147 the value of the band is updated (e.g., k++) and a new process bin $C_0$ is chosen at instant t and band k+1, to reiterate the operations from step 141. If at step 146 it is verified that no other bands are to be processed (e.g., as there is no other bin to be processed at a band k+1), then at step 148 the time instant t is updated (e.g., or t++) and a first band (e.g., k=1) is chosen, to reiterate the operations from step 141.

Reference is made to FIG. 1.5. While FIG. 1.5(*a*) corresponds to FIG. 1.2 and shows a sequence of sampled values Y(k, t) (each associated to a bin) in a frequency/time space. FIG. 1.5(*b*) shows a sequence of sampled values in a magnitude/frequency graph for the time instant t−1 and FIG. 1.5(*c*) shows a sequence of sampled values in a magnitude/frequency graph for the time instant t, which is the time instant associated to the bin 123 ($C_0$) currently under process. The sampled values Y(k, t) are quantized and are indicated in FIGS. 1.5(*b*) and 1.5(*c*). For each bin, a plurality of quantization levels QL(t, k) may be defined (for example, the quantization level may be one of a discrete number of quantization levels, and the number and/or values and/or scales of the quantization levels may be signaled by the encoder, for example, and/or may be signaled in the bitstream 111). The sampled value Y(k, t) will be one of the quantization levels. The sampled values may be in the Log-domain. The sampled values may be in the perceptual domain. Each of the values of each bin may be understood as one of the quantized levels (which are in discrete number) that can be selected (e.g., as written in the bitstream 111). An upper floor u (ceiling value) and a lower floor l (floor value) are defined for each k and t (the notations u(k, t) and u(k, t) are here avoided for brevity). These ceiling and floor values may be defined by the noise relationship and/or information estimator 119. The ceiling and floor values are indeed information related to the quantization cell employed for quantizing the value X(k, t) and give information about the dynamic of quantization noise.

It possible to establish an optimal estimation of the value 116' of each bin as the expectation of the conditional likelihood of the value X being between the ceiling value u and the floor value 1, provided that the quantized sampled value of the bin 123 ($C_0$) under process and the context bins 124 are equal to the estimated values of the bin under process and of the estimated values of the additional bins of the context, respectively. In this way, it is possible to estimate the magnitude of the bin 123 ($C_0$) under process. It is possible to obtain the expectation value on the basis of mean values ($\mu$) of the clean values X and the standard deviation value (σ) which may be provided by the statistical relationship and/or information estimator, for example.

It is possible to obtain the mean values (μ) of the clean values X and the standard deviation values (σ) on the basis of an procedure, discussed in detail below, which may be iterative.

For example (see also 4.1.3 and its subsections), the mean value of the clean signal X may be obtained by updating a non-conditional average value ($\mu_1$) calculated for the bin 123 under process without considering any context, to obtain a new average value ($\mu_{up}$) which considers the context bins 124 ($C_1$-$C_{10}$). At each iteration, the non-conditional calculated average value ($\mu_1$) may be modified using a difference between estimated values (expressed with the vector $\hat{x}_c$) for the bin 123 ($C_0$) under process and the context bins and the average values (expressed with the vector $\mu_2$) of the context bins 124. These values may be multiplied by values associated to the covariance and/or variance between the bin 123 ($C_0$) under process and the context bins 124 ($C_1$-$C_{10}$).

The standard deviation value (σ) may be obtained from variance and covariance relationships (e.g., the covariance matrix $\Sigma \in \mathbb{R}^{(C+1)\times(C+1)}$) between the bin 123 ($C_0$) under process and the context bins 124 ($C_1$-$C_{10}$).

An example of a method for obtaining the expectation (and therefore for estimating the X value 116') may be provided by the following pseudocode:

```
function estimation (k,t)
        // regarding Y(k,t) for obtaining an estimate X (116')
for t=1 to maxInstants
        // sequentially choosing the instant t
    for k=1 to Number_of bins_at_instant_t
        // cycle all the bins
    QL <- GetQuantizationLevels(Y(k,t))
        // to determine how many quantization levels are provided
        for Y(k,t)
    1,u <- GetQuantizationLimits(QL,Y(k,t))
        // obtaining the quantized limits u and 1 (e.g., from noise
        relationship // and/or information estimator 119)
    μ_up , σ_up ← UpdateStatistics(k,t,X̂_prev)
        // μ_up and σ_up (updated values) are obtained
    pdf ← truncatedGaussian(mu_up,sigma_up,l,u)
        // the probability distribution function is calculated
    X̂ ← expectation(pdf)
        // the expectation is calculated
 end for
 end for
endfunction
```

4.1.2. Postfiltering with Complex Spectral Correlations for Speech and Audio Coding Examples in this section and in its subsections mainly relate to techniques for postfiltering with complex spectral correlations for speech and audio coding.

In the present examples, the following figures are mentioned:

FIG. 2.1: (a) Context block of size L=10 (b) Recurrent context-block of the context bin $C_2$.

FIG. 2.2: Histograms of (a) Conventional quantized output (b) Quantization error (c) Quantized output using randomization (d) Quantization error using randomization. The input was a an uncorrelated Gaussian distributed signal.

FIG. 2.3: Spectrograms of (i) true speech (ii) quantized speech and, (iii) speech quantized after randomization.

FIG. 2.4: Block diagram of the proposed system including simulation of the codec for testing purposes.

FIG. 2.5: Plots showing (a) the pSNR and (b) pSNR improvement after postfiltering, and (c) pSNR improvement for different contexts.

FIG. 2.6: MUSHRA listening test results a) Scores for all items over all the conditions b) Difference scores for each input pSNR condition averaged over male and female. Oracle, lower anchor and hidden reference scores have been omitted for clarity.

Examples in this section and in the subsection may also refer to and/or explain in detail examples of FIGS. 1.3 and 14, and, more in general, FIGS. 1.1, 1.2., and 1.5

Present speech codecs achieve a good compromise between quality, bitrate and complexity. However, retaining performance outside the target bitrate range remains challenging. To improve performance, many codecs use pre- and post-filtering techniques to reduce the perceptual effect of quantization-noise. Here, we propose a postfiltering method to attenuate quantization noise which uses the complex spectral correlations of speech signals. Since conventional speech codecs cannot transmit information with temporal dependencies as transmission errors could result in severe error propagation, we model the correlation offline and employ them at the decoder, hence removing the need to transmit any side information. Objective evaluation indicates an average 4 dB improvement in the perceptual SNR of signals using the context-based post-filter, with respect to the noisy signal, and an average 2 dB improvement relative to the conventional Wiener filter. These results are confirmed by an improvement of up to 30 MUSHRA points in a subjective listening test.

4.1.2.1 Introduction

Speech coding, the process of compressing speech signals for efficient transmission and storage, is an essential component in speech processing technologies. It is employed in almost all devices involved in the transmission, storage or rendering of speech signals. While standard speech codecs achieve transparent performance around target bitrates, the performance of codecs suffer in terms of efficiency and complexity outside the target bitrate range [5].

Specifically at lower bitrates the degradation in performance is because large parts of the signal are quantized to zero, yielding a sparse signal which frequently toggles between zero and non-zero. This gives a distorted quality to the signal, which is perceptually characterized as musical noise. Modern codecs like EVS, USAC [3, 15] reduce the effect of quantization noise by implementing postprocessing methods [5, 14]. Many of these methods have to be implemented both at the encoder and decoder, hence involving changes to the core structure of the codec, and sometimes also the transmission of additional side information. Moreover, most of these methods focus on alleviating the effect of distortions rather than the cause for distortions.

The noise reduction techniques widely adopted in speech processing are often employed as pre-filters to reduce background noise in speech coding. However, application of these methods for the attenuation of quantization noise have not been fully explored yet. The reasons for this are (i) information from zero-quantized bins cannot be restored by using conventional filtering techniques alone, and (ii) quantization noise is highly correlated to speech at low bitrates, thus discriminating between speech and quantization-noise distributions for noise reduction is difficult; these are further discussed in Sec. 4.1.2.2.

Fundamentally, speech is a slowly varying signal, whereby it has a high temporal correlation [9]. Recently, MVDR and Wiener filters using the intrinsic temporal and frequency correlation in speech were proposed and showed significant noise reduction potential [1, 9, 13]. However, speech codecs refrain from transmitting information with such temporal dependency to avoid error propagation as a consequence of information loss. Therefore, application of speech correlation for speech coding or the attenuation of quantization noise has not been sufficiently studied, until recently; an accompanying paper [10] presents the advantages of incorporating the correlations in the speech magnitude spectrum for quantization noise reduction.

The contributions of this work are as follows: (i) modeling the complex speech spectrum to incorporate the contextual information intrinsic in speech, (ii) formulating the problem such that the models are independent of the large fluctuations in speech signals and the correlation recurrence between samples enables us to incorporate much larger contextual information, (iii) obtaining an analytical solution such that the filter is optimal in minimum mean square error sense. We begin by examining the possibility of applying conventional noise reduction techniques for the attenuation of quantization noise, and then model the complex speech spectrum and use it at the decoder to estimate speech from an observation of the corrupted signal. This approach removes the need for the transmission of any additional side information.

4.1.2.2 Modeling and Methodology

At low bitrates conventional entropy coding methods yield a sparse signal, which often causes a perceptual artifact known as musical noise. Information from such spectral holes cannot be recovered by conventional approaches like Wiener filtering, because they mostly modify the gain. Moreover, common noise reduction techniques used in speech processing model the speech and noise characteristics and perform reduction by discriminating between them. However, at low bitrates quantization noise is highly correlated with the underlying speech signal, hence making it difficult to discriminate between them. FIGS. 2.2-2.3 illustrate these problems; FIG. 2.2(*a*) shows the distribution of the decoded signal, which is extremely sparse, and FIG. 2.2(*b*) shows the distribution of the quantization noise, for a white Gaussian input sequence. FIGS. 2.3(*i*) & 2.3(*ii*) depict the spectrogram of the true speech and the decoded speech simulated at a low bitrate, respectively.

To mitigate these problems, we can apply randomization before encoding the signal [2, 7, 18]. Randomization is a type of dithering [11] which has been previously used in speech codecs [19] to improve perceptual signal quality, and recent works [6, 18] enable us to apply randomization without increase in bitrate. The effect of applying randomization in coding is demonstrated in FIG. 2.2(*c*) & (d) and FIG. 2.3(*c*); the illustrations clearly show that randomization preserves the decoded speech distribution and prevents signal sparsity. Additionally, it also lends the quantization noise a more uncorrelated characteristic, thus enabling the application of common noise reduction techniques from speech processing literature [8].

Due to dithering, we can assume that the quantization noise is an additive and uncorrelated normally distributed process, $$Y_{k,t}=X_{k,t}+V_{k,t}, \tag{2.1}$$

where Y, X and V are the complex-valued short-time frequency domain values of the noisy, clean-speech and noise signals, respectively. k denotes the frequency bin in the time-frame t. In addition, we assume that X and V are zero-mean Gaussian random variables. Our objective is to estimate $X_{k,t}$ from an observation $Y_{k,t}$ as well as using previously estimated samples of $\hat{x}_c$. We call $\hat{x}_c$ the context of $X_{k,t}$ The estimate of the clean speech signal, $\hat{x}$, known as the Wiener filter [8], is defined as:

$$\hat{x}=\Lambda_X(\Lambda_X+\Lambda_N)^{-1}y, \tag{2.2}$$

where $\Lambda_X, \Lambda_N\in\mathbb{C}^{(c+1)\times(c+1)}$ are the speech and noise covariance matrices, respectively, and $y\in\mathbb{C}^{C+1}$ is the noisy observation vector with c+1 dimensions, c being the context length. The covariances in Eq. 2.2 represent the correlation between time-frequency bins, which we call the context neighborhood. The covariance matrices are trained off-line from a database of speech signals. Information regarding the noise characteristics is also incorporated in the process, by modeling the target noise-type (quantization noise), similar to the speech signals. Since we know the design of the encoder, we know exactly the quantization characteristics, hence it is a straightforward task to construct the noise covariance $\Lambda_N$.

Context Neighborhood:

An example of the context neighborhood of size 10 is presented in FIG. 2.1(*a*). In the figure, the block $C_0$ represents the frequency bin under consideration. Blocks $C_i$, $i\in\{1, 2, \ldots, 10\}$ are the frequency bins considered in the immediate neighborhood. In this particular example, the context bins span the current time-frame and two previous time-frames, and two lower and upper frequency-bins. The context neighborhood includes only those frequency bins in which the clean speech has already been estimated. The structuring of the context neighborhood here is similar to the coding application, wherein contextual information is used to improve the efficiency of entropy coding [12]. In addition to incorporating information from the immediate context neighborhood, the context neighborhood of the bins in the context block are also integrated in the filtering process, resulting in the utilization of a larger context information, similar to IIR filtering. This is depicted in FIG. 2.1(*b*), where the blue line depicts the context block of the context bin $C_2$. The mathematical formulation of the neighborhood is elaborated in the following section.

Normalized Covariance and Gain Modeling:

Speech signals have large fluctuations in gain and spectral envelope structure. To model the spectral fine structure efficiently [4], we use normalization to remove the effect of this fluctuation. The gain is computed during noise attenuation from the Wiener gain in the current bin and the estimates in the previous frequency bins. The normalized covariance and the estimated gain are employed together to obtain the estimate of the current frequency sample. This step is important as it enables us to use the actual speech statistics for noise reduction despite the large fluctuations.

Define the context vector as $u_{k,t}=[X_{k,t}\ X_{C_1}\ X_{C_2}\ X_{C_3} \ldots X_{C_{10}}]$, thus the normalized context vector is $z_{k,t}=u_{k,t}/\|u_{k,t}\|$. The speech covariance is defined as $\hat{\Lambda}_X=\gamma\Lambda_X$, where $\Lambda_X$ is the normalized covariance and γ represents the gain. The gain is computed during the post-filtering based on the already processed values as $=\hat{u}_{k,t}\hat{u}_{k,t}^H$, where $\hat{u}_{k,t}=[Y_{k,t}\ \hat{X}_{C_1}\ \hat{X}_{C_2}\ \hat{X}_{C_3} \ldots \hat{X}_{C_{10}}]$ is the context vector formed by the bin under processed and the already processed values of the context. The normalized covariances are calculated from the speech dataset as follows:

$$\Lambda_X = E\{ZZ^H\} = E\left\{\begin{bmatrix} z_{k,t} \\ z_{C_1} \\ \cdots \\ z_{C_{10}} \end{bmatrix}\begin{bmatrix} z_{k,t} \\ z_{C_1} \\ \cdots \\ z_{C_{10}} \end{bmatrix}^H\right\}, \tag{2.3}$$

From Eq. 2.3, we observe that this approach enables us to incorporate correlation from a neighborhood much larger than the context size and more information, consequently saving computational resources. The noise statistics is computed as follows:

$$\Lambda_N = E\{WW^H\}, \tag{2.4}$$

$$W = \begin{bmatrix} n_{k,t} \\ n_{C_1} \\ \cdots \\ n_{C_{10}} \end{bmatrix}.$$

where $n_{k,t}=[N_{k,t}\ N_{C_1}\ N_{C_2}\ N_{C_3} \ldots N_{C_{10}}]$ is the context noise vector defined at time instant t and frequency bin k. Note that, in Eq. 2.4, normalization is not necessary for the noise models. Finally, the equation for the estimated clean speech signal is:

$$\hat{x}=\gamma\Lambda_X[(\gamma\Lambda_X)+\Lambda_N]^{-1}y \tag{2.5}$$

Owing to the formulation, the complexity of the method is linearly proportional to the context size. The proposed method differs from the 2D Wiener filtering in [17], in that it operates using the complex magnitude spectrum, whereby there is no need to use the noisy phase to reconstruct the signal unlike conventional methods. Additionally, in contrast to 1D and 2D Wiener filters which apply a scaler gain to the noisy magnitude spectrum, the proposed filter incorporates information from the previous estimates to compute the vector gain. Therefore, with respect to previous work the novelty of this method lies in the way the contextual information is incorporated in the filter, thus making the system adaptive to the variations in speech signal.

4.1.2.3 Experiments and Results

Proposed method was evaluated using both objective and subjective tests. We used the perceptual SNR (pSNR) [3, 5] as the objective measure, because it approximates human perception and it is already available in a typical speech codec. For subjective evaluation, we conducted a MUSHRA listening test.

4.1.2.3.1 System Overview

A system structure is illustrated in FIG. 2.4 (in examples, it may be similar to the TCX mode in 3GPP EVS [3]). First, we apply STFT (block 241) to the incoming sound signal 240' to transform it to a signal in the frequency domain (242'). We may use here the STFT instead of the standard MDCT, so that the results are readily transferable to speech enhancement applications. Informal experiments verify that the choice of transform does not introduce unexpected problems in the results [8, 5].

To ensure that the coding noise has least perceptual effect, the frequency domain signal 241' is perceptually weighted at block 242 to obtain a weighted signal 242'. After a pre-process block 243, we compute the perceptual model at block 244, (e.g., as used in the EVS codec [3]), based on the linear prediction coefficients (LPCs). After weighting the signal with the perceptual envelope, the signal is normalized and entropy coded (not shown). For straightforward reproducibility, we simulated quantization noise at block 244 (which is not necessary part of a marketed product) by perceptually weighted Gaussian noise, following the discussion in Sec. 4.1.2.2. A codec 242" (which may be the bitstream 111) may therefore be generated.

Thus, the output 244' of the codec/quantization noise (QN) simulation block 244, in FIG. 2.4, is the corrupted decoded signal. The proposed filtering method is applied at this stage. The enhancement block 246 may acquire the off-line trained speech and noise models 245' from block 245 (which may contain a memory including the off-line models). The enhancement block 246 may comprise, for example, the estimators 115 and 119. The enhancement block may include, for example, the value estimator 116. Following the noise reduction process, the signal 246' (which may be an example of the signal 116') is weighted by the inverse perceptual envelope at block 247 and then, at block 248, transformed back to the time domain to obtain the enhanced, decoded speech signal 249, which may be, for example, a sound ouptut 249.

4.1.2.3.2 Objective Evaluation

Experimental Setup:

The process is divided into training and testing phases. In the training phase, we estimate the static normalized speech covariances for context sizes L∈{1, 2 . . . 14} from the speech data. For training, we chose 50 random samples from the training set of the TIMIT database [20]. All signals are resampled to 12.8 kHz, and a sine window is applied on frames of size 20 ms with 50% overlap. The windowed signals are then transformed to the frequency domain. Since the enhancement is applied in the perceptual domain, we also model the speech in the perceptual domain. For each bin sample in the perceptual domain, the context neighborhoods are composed into matrices, as described in section 4.1.2.2, and the covariances are computed. We similarly obtain the noise models using perceptually weighted Gaussian noise.

For testing, 105 speech samples are randomly selected from the database. The noisy samples are generated as the additive sum of the speech and the simulated noise. The levels of speech and noise are controlled such that we test the method for pSNR ranging from 0-20 dB with 5 samples for each pSNR level, to conform to the typical operating range of codecs. For each sample, 14 context sizes were tested. For reference, the noisy samples were enhanced using an oracle filter, wherein the conventional Wiener filter employs the true noise as the noise estimate, i.e., the optimal Wiener gain is known.

Evaluation Results:

The results are depicted in FIG. 2.5. The output pSNR of the conventional Wiener filter, the oracle filter, and noise attenuation using filters of context length L={1,14} are illustrated in FIG. 2.5(*a*). In FIG. 2.5(*b*), the differential output pSNR, which is the improvement in the output pSNR with respect to the pSNR of the signal corrupted by quantization noise, is plotted over a range of input pSNR for the different filtering approaches. These plots demonstrate that the conventional Wiener filter significantly improves the noisy signal, with 3 dB improvement at lower pSNRs and 1 dB improvement at higher pSNRs. Additionally, the contextual filter L=14 shows 6 dB improvement at higher pSNRs and around 2 dB improvement at a lower pSNR.

FIG. 2.5(*c*) demonstrates the effect of context size at different input pSNRs. It can be observed that at lower pSNRs the context size has significant impact on noise attenuation; the improvement in pSNR increases with increase in context size. However, the rate of improvement with respect to context size decreases as the context size increases, and tends towards saturation for L>10. At higher input pSNRs, the improvement reaches saturation at relatively smaller context size.

4.1.2.3.3 Subjective Evaluation

We evaluated the quality of the proposed method with a subjective MUSHRA listening test [16]. The test comprised of six items and each item consisted of 8 test conditions. Listeners, both experts and non-experts, between the age 20 to 43 participated. However, only the ratings of those participants who scored the hidden reference greater than 90 MUSHRA points were selected, resulting in 15 listeners whose scores were included for this evaluation.

Six sentences were randomly chosen from the TIMIT database to generate the test items. The items were generated by adding perceptual noise, to simulate coding noise, such that the resulting signals' pSNR were fixed at 2, 5 and 8 dB. For each pSNR, one male and one female item was generated. Each item consisted of 8 conditions: Noisy (no enhancement), ideal enhancement with the noise known (oracle), conventional Wiener filter, samples from the proposed method with context sizes one (L=1), six (L=6), fourteen (L=14), in addition to the 3.5 kHz low-pass signal as the lower anchor and the hidden reference, as per the MUSHRA standard.

The results are presented in FIG. 2.6. From FIG. 2.6(*a*), we observe that the proposed method, even with the smallest context of L=1, consistently shows an improvement over the corrupted signal, in most cases with no overlap between the confidence intervals. Between the conventional Wiener filter and the proposed method, mean of the condition L=1 is rated around 10 points higher on average. Similarly, L=14 is rated around 30 MUSHRA points higher than the Wiener filter. For all the items, the scores of L=14 do not overlap with the Wiener filter scores, and is close to the ideal condition, especially at higher pSNRs. These observations are further supported in the difference plot, illustrated in FIG. 2.6(*b*). The scores for each pSNR were averaged over the male and female items. The difference scores were obtained by keeping the scores of the Wiener condition as reference and obtaining the difference between the three context-size conditions and the no enhancement condition. From these results we can conclude that, in addition to dithering, which can improve the perceptual quality of the decoded signal [11], applying noise reduction at the decoder using conventional techniques and further, employing models incorporating correlation inherent in the complex speech spectrum can improve pSNR significantly.

4.1.2.4 Conclusion

We propose a time-frequency based filtering method for the attenuation of quantization noise in speech and audio coding, wherein the correlation is statistically modeled and used at the decoder. Therefore, the method does not require the transmission of any additional temporal information, thus eliminating chances of error propagation due to transmission loss. By incorporating the contextual information, we observe pSNR improvement of 6 dB in the best case and 2 dB in a typical application; subjectively, an improvement of 10 to 30 MUSHRA points is observed.

In this section, we fixed the choice of the context neighborhood for a certain context size. While this provides a baseline for the expected improvement based on context size, it is interesting to examine the impact of choosing an optimal context neighborhood. Additionally, since the MVDR filter showed significant improvement in background noise reduction, a comparison between MVDR and the proposed MMSE method should be considered for this application.

In summary, we have shown that the proposed method improves both subjective and objective quality, and it can be used to improve the quality of any speech and audio codecs.

4.1.2.5 References

[1] Y. Huang and J. Benesty, "A multi-frame approach to the frequency-domain single-channel noise reduction problem," *IEEE Transactions on Audio, Speech, and Language Processing*, vol. 20, no. 4, pp. 1256-1269, 2012.

[2] T. Bäckström, F. Ghido, and J. Fischer, "Blind recovery of perceptual models in distributed speech and audio coding," in *Interspeech.* 1 em plus 0.5 em minus 0.4 em ISCA, 2016, pp. 2483-2487.

[3] "EVS codec detailed algorithmic description; 3GPP technical specification," http://www.3gpp.org/DynaReport/26445.htm.

[4] T. Bäckström, "Estimation of the probability distribution of spectral fine structure in the speech source," in *Interspeech,* 2017.

[5] *Speech Coding with Code-Excited Linear Prediction.* 1 em plus 0.5 em minus 0.4 em Springer, 2017.

[6] T. Bäckström, J. Fischer, and S. Das, "Dithered quantization for frequency-domain speech and audio coding," in *Interspeech,* 2018.

[7] T. Bäckström and J. Fischer, "Coding of parametric models with randomized quantization in a distributed speech and audio codec," in *Proceedings of the* 12. *ITG Symposium on Speech Communication.* 1 em plus 0.5 em minus 0.4 em VDE, 2016, pp. 1-5.

[8] J. Benesty, M. M. Sondhi, and Y. Huang, *Springer handbook of speech processing.* 1 em plus 0.5 em minus 0.4 em Springer Science & Business Media, 2007.

[9] J. Benesty and Y. Huang, "A single-channel noise reduction MVDR filter," in *ICASSP.* 1 em plus 0.5 em minus 0.4 em IEEE, 2011, pp. 273-276.

[10] S. Das and T. Bäckström, "Postfiltering using log-magnitude spectrum for speech and audio coding," in *Interspeech,* 2018.

[11] R. W. Floyd and L. Steinberg, "An adaptive algorithm for spatial gray-scale," in *Proc. Soc. Inf. Disp.*, vol. 17, 1976, pp. 75-77.

[12] G. Fuchs, V. Subbaraman, and M. Multrus, "Efficient context adaptive entropy coding for real-time applications," in *ICASSP.* 1 em plus 0.5 em minus 0.4 em IEEE, 2011, pp. 493-496.

[13] H. Huang, L. Zhao, J. Chen, and J. Benesty, "A minimum variance distortionless response filter based on the bifrequency spectrum for single-channel noise reduction," *Digital Signal Processing*, vol. 33, pp. 169-179, 2014.

[14] M. Neuendorf, P. Gournay, M. Multrus, J. Lecomte, B. Bessette, R. Geiger, S. Bayer, G. Fuchs, J. Hilpert, N.

Rettelbach et al., "A novel scheme for low bitrate unified speech and audio coding-MPEG RM0," in *Audio Engineering Society Convention* 126. 1 em plus 0.5 em minus 0.4 em Audio Engineering Society, 2009.

[15] ______, "Unified speech and audio coding scheme for high quality at low bitrates," in *ICASSP.* 1 em plus 0.5 em minus 0.4 em IEEE, 2009, pp. 1-4.

[16] M. Schoeffler, F. R. Stôter, B. Edler, and J. Herre, "Towards the next generation of web-based experiments: a case study assessing basic audio quality following the ITU-R recommendation BS. 1534 (MUSHRA)," in 1*st Web Audio Conference.* 1 em plus 0.5 em minus 0.4 em Citeseer, 2015.

[17] Y. Soon and S. N. Koh, "Speech enhancement using 2-D Fourier transform," *IEEE Transactions on speech and audio processing*, vol. 11, no. 6, pp. 717-724, 2003.

[18] T. Bäckström and J. Fischer, "Fast randomization for distributed low-bitrate coding of speech and audio," *IEEE/ACM Trans. Audio, Speech, Lang. Process.,* 2017.

[19] J.-M. Valin, G. Maxwell, T. B. Terriberry, and K. Vos, "High-quality, low-delay music coding in the OPUS codec," in *Audio Engineering Society Convention* 135. 1 em plus 0.5 em minus 0.4 em Audio Engineering Society, 2013.

[20] V. Zue, S. Seneff, and J. Glass, "Speech database development at MIT: TIMIT and beyond," *Speech Communication*, vol. 9, no. 4, pp. 351-356, 1990.

4.1.3 Postfiltering, e.g. Using Log-Magnitude Spectrum for Speech and Audio Coding Examples in this section and in the subsections mainly refer to techniques for postfiltering using log-magnitude spectrum for speech and audio coding.

Examples in this section and in the subsections may better specify particular cases of FIGS. 1.1 and 1.2, for example.

In the present example, the following figures are mentioned:

FIG. 3.1: Context neighborhood of size C=10. The previous estimated bins are chosen and ordered based on the distance from the current sample.

FIG. 3.2: Histograms of speech magnitude in (a) Linear domain (b) Log domain, in an arbitrary frequency bin.

FIG. 3.3: Training of speech models.

FIG. 3.4: Histograms of Speech distribution (a) True (b) Estimated: ML (c) Estimated: EL.

FIG. 3.5: Plots representing the improvement of in SNR using the proposed method for different context sizes.

FIG. 3.6: Systems overview.

FIG. 3.7: Sample plots depicting the true, quantized and the estimated speech signal (i) in a fixed frequency band over all time frames (ii) in a fixed time frame over all frequency bands.

FIG. 3.8: Scatter plots of the true, quantized and estimated speech in zero-quantized bins for (a) C=1, (b) C=40. The plots demonstrate the correlation between the estimated and true speech.

Advanced coding algorithms yield high quality signals with good coding efficiency within their target bit-rate ranges, but their performance suffer outside the target range. At lower bitrates, the degradation in performance is because the decoded signals are sparse, which gives a perceptually muffled and distorted characteristic to the signal. Standard codecs reduce such distortions by applying noise filling and post-filtering methods. Here, we propose a post-processing method based on modeling the inherent time-frequency correlation in the log-magnitude spectrum. A goal is to improve the perceptual SNR of the decoded signals and, to reduce the distortions caused by signal sparsity. Objective measures show an average improvement of 1.5 dB for input perceptual SNR in range 4 to 18 dB. The improvement is especially prominent in components which had been quantized to zero.

4.1.3.1 Introduction

Speech and audio codecs are integral parts of most audio processing applications and recently we have seen rapid development in coding standards, such as MPEG USAC [18, 16], and 3GPP EVS [13]. These standards have moved towards unifying audio and speech coding, enabled the coding of super wide band and full band speech signals as well as added support of voice over IP. The core coding algorithms within these codecs, ACELP and TCX, yield perceptually transparent quality at moderate to high bitrates within their target bitrate ranges. However, the performance degrades when the codecs operate outside this range. Specifically, for low-bitrate coding in the frequency-domain, the decline in performance is because fewer bits are at disposal for encoding, whereby areas with lower energy are quantized to zero. Such spectral holes in the decoded signal renders a perceptually distorted and muffled characteristic to the signal, which can be annoying for the listener.

To obtain satisfactory performance outside target bitrate ranges, standard codecs like CELP employ pre- and post-processing methods, which are largely based on heuristics. In particular, to reduce the distortion caused by quantization-noise at low bitrates, codecs implement methods either in the coding process or strictly as a post-filter at the decoder. Formant enhancement and bass post-filters are common methods [9] which modify the decoded signal based on the knowledge of how and where quantization noise perceptually distorts the signal. Formant enhancement shapes the codebook to intrinsically have less energy in areas prone to noise and is applied both at the encoder and decoder. In contrast, bass post-filter removes the noise like component between harmonic lines and is implemented only in the decoder.

Another commonly used method is noise filling, where pseudo-random noise is added to the signal [16], since accurate encoding of noise-like components is not essential for perception. In addition, the approach aids in reducing the perceptual effect of distortions caused by sparsity on the signal. The quality of noise-filling can be improved by parameterizing the noise-like signal, for example, by its gain, at the encoder and transmitting the gain to the decoder.

The advantage of post-filtering methods over the other methods is that they are only implemented in the decoder, whereby they do not require any modifications to the encoder-decoder structure, nor do they need any side information to be transmitted. However, most of these methods focus on solving the effect of the problem, rather than address the cause.

Here, we propose a post-processing method to improve signal quality at low bitrates, by modeling the inherent time-frequency correlation in speech magnitude spectrum and, investigating the potential of using this information to reduce quantization noise. The advantages of this approach are that it does not require the transmission of any side information and operates using solely the quantized signal as the observation and the speech models trained offline; Since it is applied at the decoder after the decoding process, it does not require any changes to the core structure of the codec; The approach addresses the signal distortions by estimating the information lost during the coding process using a source model. The novelties of this work lies in (i) incorporating the formant information in speech signals using log-magnitude modeling, (ii) representing the inherent contextual information in the spectral magnitude of speech in the log-domain as a multivariate Gaussian distribution (iii) finding the optimum, for the estimation of true speech, as the expected likelihood of a truncated Gaussian distribution.

4.1.3.2 Speech Magnitude Spectrum Models

Formants are the fundamental indicator of linguistic content in speech and are manifested by the spectral magnitude envelope of speech, therefore the magnitude spectrum is an important part of source modeling [10, 21]. Prior research has shown that frequency coefficients of speech are best represented by a Laplacian or Gamma distribution [1, 4, 2, 3]. Hence, the magnitude-spectrum of speech is an exponential distribution, as shown in FIG. 3.2*a*. The figure demonstrates that the distribution is concentrated at low magnitude values. This is difficult to use as a model because of numerical accuracy issues. Furthermore, it is hard to ensure the estimates are positive just by using generic mathematical operations. We address this problem by transforming the spectrum to the log-magnitude domain. Since the logarithm is non-linear, it redistributes the magnitude-axis such that the distribution of a exponentially distributed magnitude resembles the normal distribution in the logarithmic representation (FIG. 3.2*b*). This enables us to approximate the distribution of the log-magnitude spectrum using a Gaussian probability density function (pdf).

In recent years, contextual information in speech has attracted a growing interest [11]. The inter-frame and inter-frequency correlation information have been explored previously in acoustic signal processing, for noise reduction [11, 5, 14]. The MVDR and Wiener filtering techniques employ the previous time- or frequency-frames to obtain an estimate of the signal in the current time-frequency bin. The results indicate a significant improvement in the quality of the output signal. In this work, we use similar contextual information to model speech. Specifically, we explore the plausibility of using the log-magnitude to model the context and, representing it using multivariate Gaussian distributions. The context neighborhood is chosen based on the distance of the context bin to the bin under consideration. FIG. 3.1 illustrates a context neighborhood of size 10 and indicates the order in which the previous estimates are assimilated into the context vectors.

The overview of the modeling (training) process 330 is presented in FIG. 3.3. The input speech signal 331 is transformed to a frequency domain signal 332' the frequency domain by windowing and then applying the short-time Fourier transform (STFT) at block 332. The frequency domain signal 332' is then pre-processed at block 333 to obtain a pre-processed signal 333'. The pre-processed signal 333' is used to derived a perceptual model by computing for example a perceptual envelope similar to CELP [7, 9]. The perceptual model is employed at block 334 for perceptually weight the frequency domain signal 332' to obtain a perceptually weighted signal 334'. Finally, the context vectors (e.g., the bins that will constitute the context for each bin to be processed) 335' are extracted for each sample frequency-bin at block 335, and then the covariance matrix 336' for each frequency band is estimated at block 336, thus providing the speech models that may be used.

In other words, the trained models 336' comprise:

- the rules for defining the context (e.g., on the basis of the frequency band k); and/or
- a model of the speech (e.g., values which will be used for the normalized covariance matrix $\Lambda_X$) used by the estimator 115 for generating statistical relationships and/or information 115' between and/or information regarding the bin under process and at least one additional bin forming the context; and/or
- a model of the noise (e.g., quantization noise), which will be used by the estimator 119 for generating the statistical relationships and/or information of the noise (e.g., values which will be used for defining the matrix $\Lambda_n$, for example).

We explored context sizes up to 40, which includes approximately four previous time frames, lower and upper frequency bins, each. Note that we operate with STFT instead of MDCT which is used in standard codecs, in order to keep this work extensible to enhancement applications. Expansion of this work to MDCT is ongoing and informal tests provide insights similar to this document.

4.1.3.3 Problem Formulation

Our objective is to estimate the clean speech signal from the observation of the noisy decoded signal using the statistical priors. To this end, we formulate the problem as the maximum likelihood (ML) of the current sample given the observation and the previous estimates. Assume a sample x has been quantized to a quantization level Q∈[l, u]. We can then express our optimization problem as:

$$\hat{x} = \underset{x}{\operatorname{argmax}} P(X \mid X_c = \hat{x}_c) \underset{l \le X \le u}{subjectto}, \tag{3.1}$$

where $\hat{x}$ is the estimate of the current sample, l and u are the lower and upper limits of the current quantization bins, respectively, and, $P(a_1|a_2)$ is the conditional probability of $a_1$, given $a_2$. $\hat{x}_c$ is the estimated context vector. FIG. 3.1 illustrates the construction of a context vector of size C=10, wherein the numbers represent the order in which the frequency bins are incorporated. We obtain the quantization levels from the decoded signal and from our knowledge of the quantization method used in the codec, we can define the quantization limits; the lower and upper limits of a specific quantization level is defined midway between previous and subsequent levels, respectively.

To illustrate the performance of Eq. 3.1, we solved it using generic numerical methods. FIG. 3.4 illustrates the results through distributions of the true speech (a) and estimated speech (b), in bins quantized to zero. We scale the bins such that the varying l and u are fixed to 0,1, respectively, in order to analyze and compare the relative distribution of the estimates within a quantization bin. In (b) we observe a high data density around 1, which implies that the estimates are biased towards the upper limits. We shall refer to this as the edge-problem. To mitigate this problem, we define the speech estimate as the expected likelihood (EL) [17, 8], as follows:

$$\hat{x} = E[P(X \mid X_c = \hat{x}_c)] \underset{l \le X \le u}{subjectto}. \tag{3.2}$$

The resulting speech distribution using EL is demonstrated in FIG. 3.4*c*, indicating a relatively better match between the estimated-speech and the true-speech distributions. Finally, to obtain an analytical solution, we incorporate the constraint condition into the modeling itself, whereby we model the distribution as a truncated Gaussian pdf [12]. In appendices A & B (4.1.3.6.1 and 4.1.3.6.2), we demonstrate how the solution can be obtained as a truncated Gaussian. The following algorithm presents an overview of the estimation method.

---

Require: Quantized signal Y , prior-models C
  function ESTIMATION(Y, C)
    for frame = 1 : N do
      for b = 1 : Length(Y (frame)) do
        $\mu_{up}, \sigma_{up} \leftarrow$ UpdateStatistics(C, $\hat{X}_{prev}$)
        pdf $\leftarrow$ TruncateGaussian($\mu_{up}$, $\sigma_{up}$, l(b), u(b)
        $\hat{X} \leftarrow$ Expectation(pdF)

---

4.1.3.4 Experiments and Results

Our objective is to evaluate the advantage of modeling the log-magnitude spectrum. Since envelope models are the main method for modeling the magnitude spectrum in conventional codecs, we evaluate the effect of statistical priors both in terms of the whole spectrum as well as only for the envelope. Therefore, besides evaluating the proposed method for the estimation of speech from the noisy magnitude spectrum of speech, we also test it for the estimation of the spectral envelope from an observation of the noisy envelope. To obtain the spectral envelope, after transforming the signal to the frequency domain, we compute the Cepstrum and retain the 20 lower coefficients and transform it back to the frequency domain. The next steps of envelope modeling are the same as spectral magnitude modeling presented in Sec. 4.1.3.2 and FIG. 3.3, i.e. obtaining the context vector and covariance estimation.

4.1.3.4.1 System Overview

A general block diagram of a system 360 is presented in FIG. 3.6. At the encoder 360*a*, signals 361 are divided into frames (e.g., of 20 ms with 50% overlap and Sine windowing, for example). The speech input 361 may then be transformed at block 362 to a frequency domain signal 362' using the STFT, for example. After pre-processing at block 363 and perceptually weighting at block 364 the signal by the spectral envelope, the magnitude spectrum is quantized at block 365 and entropy coded at block 366 using arithmetic coding [19], to obtain the encoded signal 366 (which may be an example of the bitstream 111).

At the decoder 360*b*, the reverse process is implemented at block 367 (which may be an example of the bitstream reader 113) to decode the encoded signal 366'. The decoded signal 366' may be corrupted by quantization noise and our purpose is to use the proposed post-processing method to improve output quality. Note that we apply the method in the perceptually weighted domain. A Log-transform block 368 is provided.

A post-filtering block 369 (which may implement the elements 114, 115, 119, 116, and/or 130 discussed above) permits to reduce the effects of the quantization noise as discussed above, on the basis of speech models which may be, for example, the trained models 336' and/or rules for defining the context (e.g., on the basis of the frequency band k) and/or statistical relationships and/or information 115' (e.g., normalized covariance matrix $\Lambda_X$) between and/or information regarding the bin under process and at least one additional bin forming the context and/or statistical relationships and/or information 119' (e.g., matrix $\Lambda_N$) regarding noise (e.g., quantization noise.

After post-processing, the estimated speech is transformed back to the temporal domain by applying the inverse perceptual weights at block 369*a* and the inverse frequency transform at block 369*b*. We use true phase to reconstruct the signal back to temporal domain.

4.1.3.4.2 Experimental Setup

For training we used 250 speech samples from the training set of the TIMIT database [22]. The block diagram of the training process is presented in FIG. 3.3. For testing, 10 speech samples were randomly chosen from the test set of the database. The codec is based on the EVS codec [6] in TCX mode and we chose the codec parameters such that the perceptual SNR (pSNR) [6, 9] is in the range typical to codecs. Therefore, we simulated coding at 12 different bitrates between 9.6 to 128 kbps, which gives pSNR values in the approximate range of 4 and 18 dB. Note that the TCX mode of EVS does not incorporate post-filtering. For each test case, we apply the post-filter to the decoded signal with context sizes $\in\{1,4,8,10,14,20,40\}$. The context vectors are obtained as per the description in Sec. 4.1.3.2 and illustration in FIG. 3.1. For tests using the magnitude spectrum, the pSNR of the post-processed signal is compared against the pSNR of the noisy quantized signal. For spectral envelope based tests, the signal-to-Noise Ratio (SNR) between the true and the estimated envelope is used as the quantitative measure.

4.1.3.4.3 Results and Analysis

The average of the qualitative measures over the 10 speech samples are plotted in FIG. 3.4. Plots (a) and (b) represent the evaluation results using the magnitude spectrum and, plots (c) and (d) correspond to the spectral envelope tests. For both, the spectrum and the envelope, incorporation of contextual information shows a consistent improvement in the SNR. The degree of improvement is illustrated in plots (b) and (d). For magnitude spectrum, the improvement ranges between 1.5 and 2.2 dB over all the context at low input pSNR, and from 0.2 to 1.2 dB higher input pSNR. For spectral envelopes, the trend is similar; the improvement over context is between 1.25 to 2.75 dB at lower input SNR, and from 0.5 to 2.25 at higher input SNR. At around 10 dB input SNR, the improvement peaks for all context sizes.

For the magnitude spectrum, the improvement in quality between context size 1 and 4 is significantly large, approximately 0.5 dB over all input pSNRs. By increasing the context size we can further improve the pSNR, but the rate of improvement is relatively lower for sizes from 4 to 40. Also, the improvement is considerably lower at higher input pSNRs. We conclude that a context size around 10 samples is a good compromise between accuracy and complexity. However, the choice of context size can also depend on the target device for processing. For instance, if the device has computational resources at disposal, a high context size can be employed for maximum improvement.

FIG. 3.7: Sample plots depicting the true, quantized and the estimated speech signal (i) in a fixed frequency band over all time frames (ii) in a fixed time frame over all frequency bands.

Performance of the proposed method is further illustrated in FIGS. 3.7-3.8, with an input pSNR of 8.2 dB. A prominent observation from all plots in FIG. 3.7 is that, particularly in bins quantized to zero the proposed method is able to estimate magnitude which is close to the true magnitude. Additionally from FIG. 3.7(*ii*), the estimates seem to follow the spectral envelope, whereby we can conclude that Gaussian distributions pre-dominantly incorporate spectral envelope information and not so much of pitch information. Hence, additional modeling methods for the pitch may also be addressed.

The scatter plots in FIG. 3.8 represent the correlation between the true, estimated and quantized speech magnitude in zero-quantized bins for C=1 and C=40. These plots further demonstrate that context is useful in estimating speech in bins where no information exists. Thus this method can be beneficial in estimating spectral magnitudes in noise-filling algorithms. In the scatter plots, the quantized, true and estimated speech magnitude spectrum are represented by red, black and blue points, respectively; We observe that while the correlation is positive for both sizes, the correlation is significantly higher and more defined for C=40.

4.1.3.5 Discussion and Conclusions

In this sections, we investigated the use of contextual information inherent in speech for the reduction of quantization noise. We propose a post-processing method with focus on estimating speech samples at the decoder, from the quantized signal using statistical priors. Results indicate that including speech correlation not only improves the pSNR, but also provide spectral magnitude estimates for noise filling algorithms. While a focus of this paper was modeling the spectral magnitude, a joint magnitude-phase modeling method, based on current insights and the results from an accompanying paper [20], is the natural next step.

This section also begins to tread on spectral envelope restoration from highly quantized noisy envelopes by incorporating information for the context neighborhood.

4.1.3.6 Appendices

4.1.3.6.1 Appendix A: Truncated Gaussian pdf

Let us define $$f_1(a) = e^{-\frac{(a-\mu)^2}{2\sigma^2}} \text{ and } f_2(a) = \mathrm{erf}\left(\frac{a-\mu}{\sigma\sqrt{2}}\right),$$

where μ, σ are the statistical parameters of the distribution and erf is the error function. Then, expectation of a univariate Gaussian random variable X is computed as:

$$[E(X)]_{-\infty}^{\infty} = \frac{1}{\sqrt{2\pi\sigma^2}}\int_{-\infty}^{\infty} x f_1(x)dx, \tag{3.3}$$

Conventionally, when $X\in[-\infty, \infty]$, solving Eq. 3.3 results in $E(X)=\mu$. However, for a truncated Gaussian random variable, with $l<X<u$, the relation is $$E(X \mid l < X < u) = \frac{[E(X)]_l^u}{\int_l^u P(x)dx} = \frac{\int_l^u x f_1(x)dx}{\int_l^u f_1(x)dx}, \tag{3.4}$$

which yields the following equation to compute the expectation of a truncated univariate Gaussian random variable:

$$E(X \mid l < X < u) = \mu - \sigma\sqrt{\frac{2}{\pi}}\left[\frac{f_1(u) - f_1(l)}{f_2(u) - f_2(l)}\right] \tag{3.5}$$

4.1.3.6.2 Appendix B: Conditional Gaussian Parameters

Let the context vector be defined as $x=[x_1,x_2]^T$, wherein $x_1\in\mathbb{R}^{1X1}$ represents the current bin under consideration, and $x_2\in\mathbb{R}^{CX1}$ is the context. Then, $x\in\mathbb{R}^{(C+1)X1}$, where C is the context size. The statistical models are represented by the mean vector $\mu\in\mathbb{R}^{(C+1)X1}$, and the covariance matrix $\Sigma\in\mathbb{R}^{(C+1)X(C+1)}$ such that $\mu=[\mu_1, \mu_2]^T$ with dimensions same as $x_1$ and $x_2$, and the covariance as $$\Sigma = \begin{bmatrix} \Sigma_{11} & \Sigma_{12} \\ \Sigma_{21} & \Sigma_{22} \end{bmatrix}. \tag{3.6}$$

$\Sigma_{ij}$ are partitions of Σ with dimensions $\Sigma_{11}\in\mathbb{R}^{1X1}$, $\Sigma_{22}\in\mathbb{R}^{CXC}$, $\Sigma_{12}\in\mathbb{R}^{1XC}$ and $\Sigma_{21}\in\mathbb{R}^{CX1}$. Thus, the updated statistics of the distribution of the current bin based on the estimated context is [15]:

$$\mu_{up}=\mu_1+\Sigma_{12}\Sigma_{22}^{-1}(\hat{x}_c-\mu_2) \tag{3.7}$$

$$\sigma_{up}=\Sigma_{11}-\Sigma_{12}\Sigma_{22}^{-1}\Sigma_{21}. \tag{3.8}$$

4.1.3.7 References

[1] J. Porter and S. Boll, "Optimal estimators for spectral restoration of noisy speech," in ICASSP, vol. 9, March 1984, pp. 53-56.

[2] C. Breithaupt and R. Martin, "MMSE estimation of magnitude-squared DFT coefficients with superGaussian priors," in ICASSP, vol. 1, April 2003, pp. I-896-I-899 vol. 1.

[3] T. H. Dat, K. Takeda, and F. Itakura, "Generalized gamma modeling of speech and its online estimation for speech enhancement," in ICASSP, vol. 4, March 2005, pp. iv/181-iv/184 Vol. 4.

[4] R. Martin, "Speech enhancement using MMSE short time spectral estimation with gamma distributed speech priors," in ICASSP, vol. 1, May 2002, pp. I-253-I-256.

[5] Y. Huang and J. Benesty, "A multi-frame approach to the frequency-domain single-channel noise reduction problem," IEEE Transactions on Audio, Speech, and Language Processing, vol. 20, no. 4, pp. 1256-1269, 2012.

[6] "EVS codec detailed algorithmic description; 3GPP technical specification," http://www.3gpp.org/DynaReport/26445.htm.
[7] T. Bäckström and C. R. Helmrich, "Arithmetic coding of speech and audio spectra using TCX based on linear predictive spectral envelopes," in ICASSP, April 2015, pp. 5127-5131.
[8] Y. I. Abramovich and O. Besson, "Regularized covariance matrix estimation in complex elliptically symmetric distributions using the expected likelihood approach part 1: The over-sampled case," IEEE Transactions on Signal Processing, vol. 61, no. 23, pp. 5807-5818, 2013.
[9] T. Bäckström, Speech Coding with Code-Excited Linear Prediction. 1 em plus 0.5 em minus 0.4 em Springer, 2017.
[10] J. Benesty, M. M. Sondhi, and Y. Huang, Springer handbook of speech processing. 1 em plus 0.5 em minus 0.4 em Springer Science & Business Media, 2007.
[11] J. Benesty and Y. Huang, "A single-channel noise reduction MVDR filter," in ICASSP. 1 em plus 0.5 em minus 0.4 em IEEE, 2011, pp. 273-276.
[12] N. Chopin, "Fast simulation of truncated Gaussian distributions," Statistics and Computing, vol. 21, no. 2, pp. 275-288, 2011.
[13] M. Dietz, M. Multrus, V. Eksler, V. Malenovsky, E. Norvell, H. Pobloth, L. Miao, Z. Wang, L. Laaksonen, A. Vasilache et al., "Overview of the EVS codec architecture," in ICASSP. 1 em plus 0.5 em minus 0.4 em IEEE, 2015, pp. 5698-5702.
[14] H. Huang, L. Zhao, J. Chen, and J. Benesty, "A minimum variance distortionless response filter based on the bifrequency spectrum for single-channel noise reduction," Digital Signal Processing, vol. 33, pp. 169-179, 2014.
[15] S. Korse, G. Fuchs, and T. Bäckström, "GMM-based iterative entropy coding for spectral envelopes of speech and audio," in ICASSP. 1 em plus 0.5 em minus 0.4 em IEEE, 2018.
[16] M. Neuendorf, P. Gournay, M. Multrus, J. Lecomte, B. Bessette, R. Geiger, S. Bayer, G. Fuchs, J. Hilpert, N. Rettelbach et al., "A novel scheme for low bitrate unified speech and audio coding-MPEG RM0," in Audio Engineering Society Convention 126. 1 em plus 0.5 em minus 0.4 em Audio Engineering Society, 2009.
[17] E. T. Northardt, I. Bilik, and Y. I. Abramovich, "Spatial compressive sensing for direction-of-arrival estimation with bias mitigation via expected likelihood," IEEE Transactions on Signal Processing, vol. 61, no. 5, pp. 1183-1195, 2013.
[18] S. Quackenbush, "MPEG unified speech and audio coding," IEEE MultiMedia, vol. 20, no. 2, pp. 72-78, 2013.
[19] J. Rissanen and G. G. Langdon, "Arithmetic coding," IBM Journal of research and development, vol. 23, no. 2, pp. 149-162, 1979.
[20] S. Das and T. Bäckström, "Postfiltering with complex spectral correlations for speech and audio coding," in Interspeech, 2018.
[21] T. Barker, "Non-negative factorisation techniques for sound source separation," Ph.D. dissertation, Tampere University of Technology, 2017.
[22] V. Zue, S. Seneff, and J. Glass, "Speech database development at MIT: TIMIT and beyond," Speech Communication, vol. 9, no. 4, pp. 351-356, 1990.

4.1.4 Further Examples

4.1.4.1 Systems Structure

The proposed method applies filtering in the time-frequency domain, to reduce noise. It is designed especially for attenuation of quantization noise of a speech and audio codec, but it is applicable to any noise reduction task. FIG. 1 illustrates a system's structure.

The noise attenuation algorithm is based on optimal filtering in a normalized time-frequency domain. This contains the following important details:

1. To reduce complexity while retaining performance, filtering is applied only to the immediate neighborhood of each time-frequency bin. This neighborhood is here called the context of the bin.
2. Filtering is recursive in the sense that the context contains estimates of the clean signal, when such are available. In other words, when we apply noise attenuation in iteration over each time-frequency bin, those bins which have already been processed, are fed back to the following iterations (see FIG. 2). This creates a feedback loop similar to autoregressive filtering.

The benefits are two-fold:

3. Since the previously estimated samples use a different context than the current sample, we are effectively using a larger context in the estimation of the current sample. By using more data, we are likely to obtain better quality.
4. The previously estimated samples are generally not perfect estimates, which means that the estimates have some error. By treating the previously estimated samples as if they were clean samples, we are biasing the current sample to similar errors as the previously estimated samples. Though this can increase the actual error, the error then better conforms to the source model, that is, the signal resembles more the statistics of the desired signal. In other words, for a speech signal, the filtered speech would better resemble speech, even if absolute error is not necessarily minimized.
5. The energy of the context has high variation both over time and frequency, yet the quantization noise energy is effectively constant, if we assume that the quantization accuracy is constant. Since optimal filters are based on covariance estimates, the amount of energy that the current context happens to have, thus has a large effect on the covariances and consequently, on the optimal filter. To take into account such variations in energy, we must apply normalization in some part of the process. In the current implementation, we normalize the covariance of the desired source to match the input context before processing by the norm of the context (see FIG. 4.3). Other implementations of the normalization are readily possible, depending on the requirements of the overall framework.
6. In the current work, we have used Wiener filtering since it is a well-known and -understood method for deriving optimal filters. It is clear that an engineer skilled in the art can choose any other filter design of his choice, such as the minimum variance distortionless response (MVDR) optimization criteria.

FIG. 4.2 is an illustration of the recursive nature of examples of a proposed estimation. For each sample, we extract the context which has samples from the noisy input frame, estimates of the previous clean frames and estimates of previous samples in the current frame. These contexts are then used to find an estimate of the current sample, which then jointly form the estimate of the clean current frame.

FIG. 4.3 shows an optimal filtering of a single sample from its context, including estimation of the gain (norm) of the current context, normalization (scaling) of the source covariance using that gain, calculation of the optimal filter using the scaled covariance of the desired source signal and the covariance of the quantization noise, and finally, applying the optimal filter to obtain an estimate of the output signal.

4.1.4.2 Benefit of Proposal in Comparison to Conventional Technology 4.4.4.2.1 Conventional Coding Approaches A central novelty of a proposed method is that it takes into account statistical properties of the speech signal, in a time-frequency representation over time. Conventional communication codecs, such 3GPP EVS, use statistics of the signal in the entropy coder and source modeling only over frequencies within the current frame [1]. Broadcast codecs such as MPEG USAC do use some time-frequency information in their entropy coders also over time, but only to a limited extent [2].

The reason for the aversion from using inter-frame information is that if information is lost in transmission, then we would be unable to correctly reconstruct the signal. Specifically, we do not loose only that frame which is lost, but because the following frames depend on the lost frame, also the following frames would be either incorrectly reconstructed or completely lost. Using inter-frame information in coding thus leads to significant error propagation in case of frameloss.

In contrast, the current proposal does not require transmission of inter-frame information. The statistics of the signal are determined off-line in the form of covariance matrices of the context for both the desired signal and the quantization noise. We can therefore use inter-frame information at the decoder, without risking error propagation, since the inter-frame statistics are estimated off-line.

The proposed method is applicable as a post-processing method for any codec. The main limitation is that if a conventional codec operates on a very low bitrate, then significant portions of the signal are quantized to zero, which reduces the efficiency of the proposed method considerably. At low rates, it is however possible to use randomized quantization methods to make the quantization error better resemble Gaussian noise [3,4]. That makes the proposed method applicable at least 1. at medium and high bitrates with conventional codec designs and
2. at low bitrates when using randomized quantization.

The proposed approach therefore uses statistical models of the signal in two ways; the intra-frame information is encoded using conventional entropy coding methods, and inter-frame information is used for noise attenuation in the decoder in a post-processing step. Such application of source modeling at the decoder side is familiar from distributed coding methods, where it has been demonstrated that it does not matter whether statistical modeling is applied at both the encoder and decoder, or only at the decoder [5]. As far as we know, our approach is the first application of this feature in speech and audio coding, outside the distributed coding applications.

4.1.4.2.2 Noise Attenuation

It has been demonstrated relatively recently that noise attenuation applications benefit greatly from incorporating statistical information over time in the time-frequency domain. Specifically, Benesty et al. have applied conventional optimal filters such as MVDR in the time-frequency domain to reduce background noises [6, 7]. While a primary application of the proposed method is attenuation of quantization noise, it can naturally also be applied to the generic noise attenuation problem like Benesty does. A difference is however that we have explicitly chosen those time-frequency bins into our context which have the highest correlation with the current bin. In difference, Benesty applies filtering over time only, but not neighbouring frequencies. By choosing more freely among the time-frequency bins, we can choose those frequency bins which give the highest improvement in quality, with the smallest context size, whereby the computational complexity is reduced.

4.1.4.3 Extensions

There are a number of natural extensions which follow naturally from the proposed method and which may be applied to the aspects and examples disclosed above and below:

1. Above, the context contains only the noisy current sample and past estimates of the clean signal. However, the context could include also time-frequency neighbours which have not yet been processed. That is, we could use a context where we include the most useful neighbours, and when available, we use the estimated clean samples, but otherwise the noisy ones. The noisy neighbours then naturally would have a similar covariance for the noise as the current sample.

2. Estimates of the clean signal are naturally not perfect, but also contain some error, but above, we assume that the estimates of the past signal do not have error. To improve quality, we could include an estimate of residual noise also for the past signal.

3. The current work focuses on attenuation of quantization noise, but clearly, we can include background noises as well. We would then only have to include the appropriate noise covariance in the minimization process [8].

4. The method was here presented applied on single-channel signals only, but clearly we can extend it to multi-channel signals using conventional methods [8].

5. The current implementation uses covariances which are estimated off-line and only scaling of the desired source covariance is adapted to the signal. It is clear that adaptive covariance models would be useful if we have further information about the signal. For example, if we have an indicator of the amount of voicing of a speech signal, or an estimate of the harmonics to noise ratio (HNR), we could adapt the desired source covariance to match the voicing or HNR, respectively. Similarly, if the quantizer type or mode changes frame to frame, we could use that to adapt the quantization noise covariance. By making sure that the covariances match the statistics of the observed signal, we obviously will obtain better estimates of the desired signal.

6. Context in the current implementation is chosen among the closest neighbours in the time-frequency grid. There is however no limitation to use only these samples; we are free to choose any useful information which is available. For example, we could use information about the harmonic structure of the signal to choose samples into the context which correspond to the comb structure of the harmonic signal. In addition, if we have access to an envelope model, we could use that to estimate the statistics of spectral frequency bins, similar to [9]. Generalizing, we can use any available information which is correlated with the current sample, to improve the estimate of the clean signal.

4.1.4.4 References

[1]3GPP, TS 26.445, EVS Codec Detailed Algorithmic Description; 3GPP Technical Specification (Release 12), 2014.
[2] ISO/IEC 23003-3:2012, "MPEG-D (MPEG audio technologies), Part 3: Unified speech and audio coding," 2012.
[3] T Bäckström, F Ghido, and J Fischer, "Blind recovery of perceptual models in distributed speech and audio coding," in Proc. Interspeech, 2016, pp. 2483-2487.
[4] T Bäckström and J Fischer, "Fast randomization for distributed low-bitrate coding of speech and audio," accepted to IEEE/ACM Trans. Audio, Speech, Lang. Process., 2017.
[5] R. Mudumbai, G. Barriac, and U. Madhow, "On the feasibility of distributed beamforming in wireless networks," Wireless Communications, IEEE Transactions on, vol. 6, no. 5, pp. 1754-1763, 2007.
[6] Y. A. Huang and J. Benesty, "A multi-frame approach to the frequency-domain single-channel noise reduction problem," IEEE Transactions on Audio, Speech, and Language Processing, vol. 20, no. 4, pp. 1256-1269, 2012.
[7] J. Benesty and Y. Huang, "A single-channel noise reduction MVDR filter," in ICASSP. IEEE, 2011, pp. 273-276.
[8] J Benesty, M Sondhi, and Y Huang, Springer Handbook of Speech Processing, Springer, 2008.
[9] T Bäckström and C R Helmrich, "Arithmetic coding of speech and audio spectra using TCX based on linear predictive spectral envelopes," in Proc. ICASSP, April 2015, pp. 5127-5131.

4.1.5 Additional Aspects 4.1.5.1 Additional Specifications and Further Details

In examples above, there is no need of inter-frame information encoded in the bitstream 111. Therefore, in examples, the at least one among the context definer 114, the statistical relationship and/or information estimator 115, the quantization noise relationship and/or information estimator 119, and the value estimator 116, exploits inter-frame information at the decoder . . . , hence reducing payload and the risk of error propagation in case packet or bit loss.

In examples above, reference has been mainly made to quantization noise. However, other kinds of noise may be coped with in other examples.

It has been noted that most of the techniques described above are particularly effective for low bitrates. Therefore, it may be possible to implement a technique of selecting between:

a lower-bitrate mode, wherein the techniques above are used; and a higher-bitrate mode, wherein the proposed post-filtering is bypassed.

FIG. 5.1 shows an example 510 that may be implemented by the decoder 110 in some examples. A determination 511 is carried out regarding the bitrate. If the bitrate is under a predetermined threshold, a context-based filtering as above is performed at 512. If the bitrate is over a predetermined threshold, the context-based filtering is skipped at 513.

In examples, the context definer 114 may form the context 114' using at least one non-processed bin 126. With reference to FIG. 1.5, is some examples, the context 114' may therefore comprise at least one of the circled bins 126. Hence, in some examples, the use of the processed bins storage unit 118 may be avoided, or complemented by a connection 113" (FIG. 1.1) which provides the context definer 114 with the at least one non-processed bin 126.

In examples above, the statistical relationship and/or information estimator 115 and/or the noise relationship and/or information estimator 119 may store a plurality of matrixes ($\Lambda_x$, $\Lambda_N$, for example). The choice of the matrix to be used may be performed on the basis of a metrics on the input signal (e.g., in the context 114' and/or in the bin 123 under process). Different harmonicities (e.g., determined with different harmonicity to noise ratio or other metrics) may therefore be associated to different matrices $\Lambda_x$, $\Lambda_N$, for example.

Alternatively, different norms of the context (e.g., determined with measuring the norm of the context of the unprocessed bin values or other metrics) may therefore be associated to different matrices $\Lambda_x$, $\Lambda_N$, for example.

4.1.5.2 Methods

Operations of the equipment disclosed above may be methods according to the present disclosure.

A general example of method is shown in FIG. 5.2, which refers to:

a first step 521 (e.g., performed by the context definer 114) in which there is defined a context (e.g. 114') for one bin (e.g. 123) under process of an input signal, the context (e.g. 114') including at least one additional bin (e.g. 118', 124) in a predetermined positional relationship, in a frequency/time space, with the bin (e.g. 123) under process;

a second step 522 (e.g., performed by at least one of the components 115, 119, 116) in which, on the basis of statistical relationships and/or information (e.g. 115') between and/or information regarding the bin (e.g. 123) under process and the at least one additional bin (e.g. 118', 124) and of statistical relationships and/or information (e.g. 119') regarding noise (e.g., quantization noise and/or other kinds of noise), estimate the value (e.g. 116') of the bin (e.g. 123) under process.

In examples, the method may be reiterated, e.g., after step 522, step 521 is newly invoked, e.g., by updating the bin under process and by choosing a new context.

Methods such as method 520 may be supplemented by operation discussed above.

4.1.5.3 Storage Unit

As show in FIG. 5.3, operations of the equipment (e.g., 113, 114, 116, 118, 115, 117, 119, etc.) and methods disclosed above may be implemented by a processor-based system 530. The latter may comprise a non-transitory storage unit 534 which, when executed by a processor 532, may operate to reduce the noise. An input/output (I/O) port 53 is shown, which may provide data (such as the input signal 111) to the processor 532, e.g., from a receiving antenna and/or a storage unit (e.g., in which the input signal 111 is stored).

4.1.5.4 System

FIG. 5.4 shows a system 540 comprising an encoder 542 and the decoder 130 (or another encoder as above). The encoder 542 is configured to provide the bitstream 111 with encoded the input signal, e.g., wirelessly (e.g., radio frequency and/or ultrasound and/or optical communications) or by storing the bitstream 111 in a storage support.

4.1.5.5 Further Examples

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine readable carrier.

In other words, an example of method is, therefore, a computer program having a program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example of the method is, therefore, a data stream or a sequence of signals representing the computer program for performing one of the methods described herein. The data stream or the sequence of signals may for example be transferred via a data communication connection, for example via the Internet.

A further example comprises a processing means, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Equal or equivalent elements or elements with equal or equivalent functionality are denoted in the following description by equal or equivalent reference numerals even if occurring in different figures.

The invention claimed is:

1. A decoder for decoding a frequency-domain input signal defined in a bitstream, the frequency-domain input signal being subjected to noise, the decoder comprising:

a bitstream reader to provide, from the bitstream, a version of the frequency-domain input signal as a sequence of frames, each frame being subdivided into a plurality of bins, each bin comprising a sampled value;

a context definer configured to define a context for one bin under process, the context comprising at least one additional bin in a predetermined positional relationship with the bin under process;

a statistical relationship and information estimator configured to provide:

statistical relationships between the bin under process and the at least one additional bin, the statistical relationships being provided in form of covariances or correlations; and information regarding the bin under process and the at least one additional bin, the information being provided in form of variances or autocorrelations, wherein the statistical relationship and information estimator comprises a noise relationship and information estimator configured to provide statistical relationships and information regarding noise, wherein the statistical relationships and information regarding noise comprise a noise matrix ($\Lambda_N$) estimating relationships among noise signals among the bin under process and the at least one additional bin;

a value estimator configured to process and acquire an estimate of the value of the bin under process on the basis of the estimated statistical relationships between the bin under process and the at least one additional bin and the information regarding the bin under process and the at least one additional bin, and the statistical relationships and information regarding noise, and a transformer to transform the estimate into a time-domain signal.

2. The decoder of claim 1, wherein noise is quantization noise.

3. The decoder according to claim 1, wherein noise is noise which is not quantization noise.

4. The decoder of claim 1, wherein the context definer is configured to choose the at least one additional bin among previously processed bins.

5. The decoder of claim 1, wherein the context definer is configured to choose the at least one additional bin based on the band of the bin.

6. The decoder of claim 1, wherein the context definer is configured to choose the at least one additional bin, within a predetermined position threshold, among those which have already been processed.

7. The decoder of claim 1, wherein the context definer is configured to choose different contexts for bins at different bands.

8. The decoder of claim 1, wherein the value estimator is configured to operate as a Wiener filter to provide an optimal estimation of the frequency-domain input signal.

9. The decoder of claim 1, wherein the value estimator is configured to acquire the estimate of the value of the bin under process from at least one sampled value of the at least one additional bin.

10. The decoder of claim 1, further comprising a measurer configured to provide a measured value associated to the previously performed estimate(s) of the least one additional bin of the context, wherein the value estimator is configured to acquire an estimate of the value of the bin under process on the basis of the measured value.

11. The decoder of claim 10, wherein the measured value is a value associated to the energy of the at least one additional bin of the context.

12. The decoder of claim 10, wherein the measured value is a gain (γ) associated to the at least one additional bin of the context.

13. The decoder of claim 12, wherein the measurer is configured to acquire the gain as the scalar product of vectors, wherein a first vector comprises value(s) of the at least one additional bin of the context, and the second vector is the transpose conjugate of the first vector.

14. The decoder of claim 1, wherein the statistical relationship and information estimator is configured to provide the statistical relationships and information as pre-defined estimates or expected statistical relationships between the bin under process and the at least one additional bin of the context.

15. The decoder of claim 1, wherein the statistical relationship and information estimator is configured to provide the statistical relationships and information as relationships based on positional relationships between the bin under process and the at least one additional bin of the context.

16. The decoder of claim 1, wherein the statistical relationship and information estimator is configured to provide the statistical relationships and information irrespective of the values of the bin under process or the at least one additional bin of the context.

17. The decoder of claim 1, wherein the statistical relationship and information estimator is configured to provide the statistical relationships and information in the form of a matrix establishing relationships of variance and covariance values, or correlation and autocorrelation values, between the bin under process and the at least one additional bin of the context.

18. The decoder of claim 1, wherein the statistical relationship and information estimator is configured to provide the statistical relationships and information in the form of a normalized matrix establishing relationships of variance and covariance values, or correlation and autocorrelation values, between the bin under process and the at least one additional bin of the context.

19. The decoder of claim 17, wherein the value estimator is configured to scale elements of the matrix by an energy-related or gain value, so as to keep into account the energy and gain variations of the bin under process and the at least one additional bin of the context.

20. The decoder of claim 1, wherein the value estimator is configured to acquire the estimate of the value of the bin under process on the basis of a relationship $$\hat{x}=\Lambda_X(\Lambda_X+\Lambda_N)^{-1}y,$$

where $\Lambda_X$, $\Lambda_N \in \mathbb{C}^{(C+1)\times(C+1)}$ are noise and covariance matrices, respectively, and $y \in \mathbb{C}^{c+1}$ is a noisy observation vector with c+1 dimensions, c being the context length.

21. The decoder of claim 1, wherein the statistical relationships between and information regarding the bin under process and the at least one additional bin comprises a normalized covariance matrix $\Lambda_X \in \mathbb{C}^{(C+1)\times(C+1)}$, wherein the statistical relationships and information regarding the noise comprises a noise matrix $\Lambda_N \in \mathbb{C}^{(C+1)\times(C+1)}$, wherein a noisy observation vector $y \in \mathbb{C}^{c+1}$ is defined with c+1 dimensions, c being the context length, wherein the noisy observation vector is $y=[y_{C_0}\ y_{C_1}\ y_{C_2}\ y_{C_3} \ldots y_{C_{10}}]$ and comprises a noisy input $y_{C_0}$ associated to the bin under process and $y_{C_1}\ y_{C_2}\ y_{C_3}, \ldots y_{C_{10}}$ being the at least one additional bin, wherein the value estimator is configured to acquire the estimate of the value of the bin under process on the basis of the relationship $$\hat{x}=\gamma\Lambda_X(\gamma\Lambda_X+\Lambda_N)^{-1}y,$$

γ being the gain.

22. The decoder of claim 1, wherein the value estimator is configured to acquire the estimate of the value of the bin under process provided that the sampled values of each of the additional bins of the context correspond to the estimated value of the additional bins of the context.

23. The decoder of claim 1, wherein the value estimator is configured to acquire the estimate of the value of the bin under process provided that the sampled value of the bin under process is expected to be between a ceiling value and a floor value.

24. The decoder of claim 1, wherein the value estimator is configured to acquire the estimate of the value of the bin under process on the basis of a maximum of a likelihood function.

25. The decoder of claim 1, wherein the value estimator is configured to acquire the estimate of the value of the bin under process on the basis of an expected value.

26. The decoder of claim 1, wherein the value estimator is configured to acquire the estimate of the value of the bin under process on the basis of the expectation of a multivariate Gaussian random variable.

27. The decoder of claim 1, wherein the value estimator is configured to acquire the estimate of the value of the bin under process on the basis of the expectation of a conditional multivariate Gaussian random variable.

28. The decoder of claim 1, wherein the sampled values are in the Log-magnitude domain.

29. The decoder of claim 1, wherein the sampled values are in the perceptual domain.

30. A decoder for decoding a frequency-domain input signal defined in a bitstream, the frequency-domain input signal being subjected to noise, the decoder comprising:

a bitstream reader to provide, from the bitstream, a version of the frequency-domain input signal as a sequence of frames, each frame being subdivided into a plurality of bins, each bin comprising a sampled value;

a context definer configured to define a context for one bin under process, the context comprising at least one additional bin in a predetermined positional relationship with the bin under process;

a statistical relationship and information estimator configured to provide statistical relationships between the bin under process and the at least one additional bin and information regarding the bin under process and the at least one additional bin, wherein the relationships and information comprise a variance-related and/or standard-deviation-value-related value on the basis of variance-related and covariance-related relationships between the bin under process and the at least one additional bin of the context to a value estimator, wherein the statistical relationship and information estimator comprises a noise relationship and information estimator configured to provide statistical relationships and information regarding noise, wherein the statistical relationships and information regarding noise comprise, for each bin, a ceiling value and a floor value for estimating the signal on the basis of the expectation of the signal to be between the ceiling value and the floor value;

the value estimator being configured to process and acquire an estimate of the value of the bin under process on the basis of the estimated statistical relationships between the bin under process and the at least one additional bin and the information regarding the bin under process and the at least one additional bin, and the statistical relationships and information regarding noise; and the decoder further comprising a transformer to transform the estimate into a time-domain signal.

31. The decoder of claim 30, wherein the statistical relationship and information estimator is configured to provide an average value of the signal to the value estimator.

32. The decoder of claim 30, wherein the statistical relationship and information estimator is configured to provide an average value of the clean signal on the basis of the variance-related and covariance-related relationships between the bin under process and at least one additional bin of the context.

33. The decoder of claim 30, wherein the statistical relationship and information estimator is configured to provide an average value of the clean signal on the basis of the expected value of the bin under process.

34. The decoder of claim 33, wherein the statistical relationship and information estimator is configured to update an average value of the signal based on the estimated context.

35. The decoder of claim 30, wherein the version of the frequency-domain input signal comprises a quantized value which is a quantization level, the quantization level being a value chosen from a discrete number of quantization levels.

36. The decoder of claim 35, wherein the number or values or scales of the quantization levels are signaled in the bitstream.

37. The decoder of claim 1, wherein the value estimator is configured to acquire the estimate of the value of the bin under process in terms of $$\hat{x} = E[P(X \mid X_c = \hat{x}_c)] \underset{l \le X \le u}{subjectto.}$$

where $\hat{x}$ is the estimate of the bin under process, l and u are the lower and upper limits of the current quantization bins, respectively, and $P(a_1|a_2)$ is the conditional probability of $a_1$, given $a_2$, $\hat{x}_c$ being an estimated context vector.

38. The decoder of claim 30, wherein the value estimator is configured to acquire the estimate of the value of the bin under process in terms of $$\hat{x} = E[P(X \mid X_c = \hat{x}_c)] \underset{l \le X \le u}{subjectto.}$$

where $\hat{x}$ is the estimate of the bin under process, l and u are the lower and upper limits of the current quantization bins, respectively, and $P(a_1|a_2)$ is the conditional probability of $a_1$, given $a_2$, $\hat{x}_c$ being an estimated context vector.

39. The decoder of claim 1, wherein the value estimator is configured to acquire the estimate of the value of the bin under process on the basis of the expectation $$E(X \mid l < X < u) = \mu - \sigma\sqrt{\frac{2}{\pi}}\left[\frac{f_1(u) - f_1(l)}{f_2(u) - f_2(l)}\right]$$

wherein X is a particular value of the bin under process expressed as a truncated Gaussian random variable, with l<X<u, where l is the floor value and u is the ceiling value, $$f_1(a) = e^{-\frac{(a-\mu)^2}{2\sigma^2}} \text{ and } f_2(a) = \text{erf}\left(\frac{a-\mu}{\sigma\sqrt{2}}\right),$$

μ=E(X), μ and σ are mean and variance of the distribution.

40. The decoder of claim 30, wherein the value estimator is configured to acquire the estimate of the value of the bin under process on the basis of the expectation $$E(X \mid l < X < u) = \mu - \sigma\sqrt{\frac{2}{\pi}}\left[\frac{f_1(u) - f_1(l)}{f_2(u) - f_2(l)}\right]$$

wherein X is a particular value of the bin under process expressed as a truncated Gaussian random variable, with l<X<u, where l is the floor value and u is the ceiling value, $$f_1(a) = e^{-\frac{(a-\mu)^2}{2\sigma^2}} \text{ and } f_2(a) = \text{erf}\left(\frac{a-\mu}{\sigma\sqrt{2}}\right),$$

μ=E(X), μ and σ are mean and variance of the distribution.

41. The decoder of claim 1, wherein the frequency-domain input signal is an audio signal.

42. The decoder of claim 30, wherein the frequency-domain input signal is an audio signal.

43. The decoder of claim 1, wherein at least one among the context definer, the statistical relationship and information estimator, the noise relationship and information estimator, and the value estimator is configured to perform a post-filtering operation to acquire a clean estimation of the frequency-domain input signal.

44. The decoder of claim 30, wherein at least one among the context definer, the statistical relationship and information estimator, the noise relationship and information estimator, and the value estimator is configured to perform a post-filtering operation to acquire a clean estimation of the frequency-domain input signal.

45. The decoder of claim 1, wherein the context definer is configured to define the context with a plurality of additional bins.

46. The decoder of claim 30, wherein the context definer is configured to define the context with a plurality of additional bins.

47. The decoder of claim 1, wherein the context definer is configured to define the context as a simply connected neighbourhood of bins in a frequency/time graph.

48. The decoder of claim 30, wherein the context definer is configured to define the context as a simply connected neighbourhood of bins in a frequency/time graph.

49. The decoder of claim 1, wherein the bitstream reader is configured to avoid the decoding of inter-frame information from the bitstream.

50. The decoder of claim 30, wherein the bitstream reader is configured to avoid the decoding of inter-frame information from the bitstream.

51. The decoder of claim 1, further comprising a processed bins storage unit storing information regarding the previously processed bins, the context definer being configured to define the context using at least one previously processed bin as at least one of the additional bins.

52. The decoder of claim 30, further comprising a processed bins storage unit storing information regarding the previously processed bins, the context definer being configured to define the context using at least one previously processed bin as at least one of the additional bins.

53. The decoder of claim 1, wherein the context definer is configured to define the context using at least one non-processed bin as at least one of the additional bins.

54. The decoder of claim 1, wherein the context definer is configured to define the context using at least one non-processed bin as at least one of the additional bins.

55. The decoder of claim 1, wherein the statistical relationship and information estimator is configured to provide the statistical relationships and information in the form of a matrix establishing relationships of variance and covariance values, or correlation and autocorrelation values, between the bin under process and the at least one additional bin of the context, wherein the statistical relationship and information estimator is configured to choose one matrix from a plurality of predefined matrixes on the basis of a metrics associated to the harmonicity of the frequency-domain input signal.

56. The decoder of claim 1, wherein the statistical relationship and information estimator is configured to choose one matrix from a plurality of predefined matrixes on the basis of a metrics associated to the harmonicity of the frequency-domain input signal.

57. A method for decoding a frequency-domain input signal defined in a bitstream, the frequency-domain input signal being subjected to noise, the method comprising:

providing, from a bitstream, a version of a frequency-domain input signal as a sequence of frames, each frame being subdivided into a plurality of bins, each bin comprising a sampled value;

defining a context for one bin under process of the frequency-domain input signal, the context comprising at least one additional bin in a predetermined positional relationship, in a frequency/time space, with the bin under process;

on the basis of statistical relationships between the bin under process and the at least one additional bin, information regarding the bin under process and the at least one additional bin, statistical relationships and information regarding noise, wherein the statistical relationships is provided in form of covariances or correlations and the information is provided in form of variances or autocorrelations, wherein the statistical relationships and information regarding noise comprise a noise matrix estimating relationships among noise signals among the bin under process and the at least one additional bin;

estimating the value of the bin under process; and transforming the estimate into a time-domain signal.

58. A method for decoding a frequency-domain input signal defined in a bitstream, the frequency-domain input signal being subjected to noise, the method comprising:

providing, from a bitstream, a version of a frequency-domain input signal as a sequence of frames, each frame being subdivided into a plurality of bins, each bin comprising a sampled value;

defining a context for one bin under process of the frequency-domain input signal, the context comprising at least one additional bin in a predetermined positional relationship, in a frequency/time space, with the bin under process;

on the basis of statistical relationships between the bin under process and the at least one additional bin, information regarding the bin under process and the at least one additional bin, statistical relationships and information regarding noise, wherein the statistical relationships and information comprise a variance-related and/or standard-deviation-value-related value provided on the basis of variance-related and covariance-related relationships between the bin under process and at least one additional bin of the context, wherein the statistical relationships and information regarding noise comprise, for each bin, a ceiling value and a floor value for estimating the signal on the basis of the expectation of the signal to be between the ceiling value and the floor value;

estimating the value of the bin under process; and transforming the estimate into a time-domain signal.

59. The method of claim 57, wherein noise is quantization noise.

60. The method of claim 58, wherein noise is quantization noise.

61. The method of claim 57, wherein noise is noise which is not quantization noise.

62. The method of claim 58, wherein noise is noise which is not quantization noise.

63. A non-transitory digital storage medium having a computer program stored thereon to perform the method for decoding a frequency-domain input signal defined in a bitstream, the frequency-domain input signal being subjected to noise, said method comprising:

providing, from a bitstream, a version of a frequency-domain input signal as a sequence of frames, each frame being subdivided into a plurality of bins, each bin comprising a sampled value;

defining a context for one bin under process of the frequency-domain input signal, the context comprising at least one additional bin in a predetermined positional relationship, in a frequency/time space, with the bin under process;

on the basis of statistical relationships between the bin under process and the at least one additional bin, information regarding the bin under process and the at least one additional bin, statistical relationships and information regarding noise, wherein the statistical relationships is provided in form of covariances or correlations and the information is provided in form of variances or autocorrelations, wherein the statistical relationships and information regarding noise comprise a noise matrix estimating relationships among noise signals among the bin under process and the at least one additional bin;

estimating the value of the bin under process; and transforming the estimate into a time-domain signal, when said computer program is run by a computer.

64. A non-transitory digital storage medium having a computer program stored thereon to perform the method for decoding a frequency-domain input signal defined in a bitstream, the frequency-domain input signal being subjected to noise, said method comprising:

providing, from a bitstream, a version of a frequency-domain input signal as a sequence of frames, each frame being subdivided into a plurality of bins, each bin comprising a sampled value;

defining a context for one bin under process of the frequency-domain input signal, the context comprising at least one additional bin in a predetermined positional relationship, in a frequency/time space, with the bin under process;

on the basis of statistical relationships between the bin under process and the at least one additional bin, information regarding the bin under process and the at least one additional bin, statistical relationships and information regarding noise, wherein the statistical relationships and information comprise a variance-related and/or standard-deviation-value-related value provided on the basis of variance-related and covariance-related relationships between the bin under process and at least one additional bin of the context, wherein the statistical relationships and information regarding noise comprise, for each bin, a ceiling value and a floor value for estimating the signal on the basis of the expectation of the signal to be between the ceiling value and the floor value;

estimating the value of the bin under process; and transforming the estimate into a time-domain signal, when said computer program is run by a computer.

* * * * *